(12) United States Patent
Ahammer et al.

(10) Patent No.: US 12,415,676 B2
(45) Date of Patent: *Sep. 16, 2025

(54) STORAGE AND PICKING SYSTEM AND PICKING METHOD FOR AUTOMATICALLY AND MANUALLY PICKING GOODS

(71) Applicant: TGW Logistics GmbH, Marchtrenk (AT)

(72) Inventors: Christian Ahammer, Gunskirchen (AT); Christoph Haslehner, Prambachkirchen (AT); Harald Schroepf, Wels (AT)

(73) Assignee: TGW Logistics GmbH, Marchtrenk (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,299

(22) Filed: Apr. 15, 2024

(65) Prior Publication Data

US 2024/0262618 A1  Aug. 8, 2024

Related U.S. Application Data

(63) Continuation of application No. 17/284,311, filed as application No. PCT/AT2019/060352 on Oct. 23, 2019, now Pat. No. 12,012,282.

(30) Foreign Application Priority Data

Oct. 23, 2018 (AT) .............................. A 50917/2018

(51) Int. Cl.
*B65G 1/04* (2006.01)
*B65G 1/137* (2006.01)

(52) U.S. Cl.
CPC ......... *B65G 1/0485* (2013.01); *B65G 1/1378* (2013.01)

(58) Field of Classification Search
CPC ........................... B65G 1/0485; B65G 1/1378
See application file for complete search history.

(56) References Cited

U.S. PATENT DOCUMENTS

| 6,061,607 A | * | 5/2000 | Bradley | ............... | B65G 1/1376 |
| | | | | | 414/280 |
| 8,494,673 B2 | * | 7/2013 | Miranda | .............. | B65G 1/1378 |
| | | | | | 700/214 |

(Continued)

FOREIGN PATENT DOCUMENTS

| EP | 2 297 005 B1 | 2/2013 |
| WO | 2012/069327 A1 | 5/2012 |

(Continued)

OTHER PUBLICATIONS

International Search Report in PCT/AT2019/060352, mailed Mar. 13, 2020.

*Primary Examiner* — Kyle O Logan
(74) *Attorney, Agent, or Firm* — Collard & Roe, P.C.

(57) ABSTRACT

In a method for order-picking articles from source loading aids into or onto target loading aids in a storage and order-picking system, the articles belong to a first group of types of article, whose types of article can be handled automatically, or a second group of types of article, whose types of article can be handled manually. A first order part with articles of the first group of types of article is transported to a first automatic order-picking station and order-picked there, and a second order part with articles of the second group of types of article is transported to a first manual order-picking station and order-picked there. Further, a storage and order-picking system executes the method.

57 Claims, 10 Drawing Sheets

(56) References Cited

U.S. PATENT DOCUMENTS

| | | | |
|---|---|---|---|
| 2013/0223959 A1* | 8/2013 | Koholka | B65G 1/137 |
| | | | 414/807 |
| 2016/0229633 A1* | 8/2016 | Yamashita | B65G 1/1378 |
| 2016/0347545 A1* | 12/2016 | Lindbo | B65G 1/1373 |
| 2020/0095063 A1* | 3/2020 | Liu | B25J 9/162 |
| 2020/0180874 A1* | 6/2020 | Mattern | B65G 47/905 |

FOREIGN PATENT DOCUMENTS

| | | |
|---|---|---|
| WO | 2015/118171 A1 | 8/2015 |
| WO | 2017/198280 A1 | 11/2017 |

* cited by examiner

STORAGE AND PICKING SYSTEM AND PICKING METHOD FOR AUTOMATICALLY AND MANUALLY PICKING GOODS

CROSS REFERENCE TO RELATED APPLICATIONS

This application is a continuation of and Applicant claims priority under 35 U.S.C. § 120 of U.S. patent application Ser. No. 17/284,311 filed on Apr. 9, 2021, which application is a national stage application under 35 U.S.C. § 371 of PCT Application No. PCT/AT2019/060352 filed on Oct. 23, 2019, which claims priority under 35 U.S.C. § 119 from Austrian Patent Application No. A 50917/2018 filed on Oct. 23, 2018, the disclosures of each of which are hereby incorporated by reference. A certified copy of priority Austrian Patent Application No. A 50917/2018 is contained in parent U.S. patent application Ser. No. 17/284,311. The International Application under PCT article 21(2) was not published in English.

BACKGROUND OF THE INVENTION

1. Field of the Invention

The invention relates to a method for order-picking articles from source loading aids into or onto target loading aids in a storage and order-picking system in which articles are provisioned in or on source loading aids in a storage zone and orders for order-picking articles are acquired. Further, the articles required for these orders are determined, wherein at least one order of the orders comprises multiple order lines and wherein each order line specifies at least one article according to its type of article and its number of pieces to be order-picked. Further, the invention relates to a storage and order-picking system for order-picking articles from source loading aids into or onto target loading aids having a storage zone for provisioning the articles in or on source loading aids and a control system for acquiring orders for order-picking articles and for determining the articles required for these orders, wherein at least one order of the orders comprises multiple order lines and wherein each order line specifies at least one article according to its type of article and its number of pieces to be order-picked.

2. Description of the Related Art

For example, EP 2 297 005 B1 discloses, in this context, a storage system and a method for operating same, wherein multiple different packing units are stored as storage units on inbound-delivery bundles in an article store. The properties of the packing units are acquired in a database, and the properties of the packing unit are used to determine a conveying property. A computer assigns the packing units to a classification group. The packing units are distributed in the storage system, interim-stored and loaded onto outbound-delivery bundles in accordance with the classification group.

Those properties of the types of packing units which have a substantial impact on their conveyance and storage method are acquired. The packing units can afterwards be distributed and stored in the storage system in a coordinated, fully or semi-automated manner on the basis of the classification group. The second classification group includes those packing units which can be distributed and stored in a semi-automated manner between a charging and a discharging station in the storage system. The packing units of the first classification group can be both distributed and stored in the storage system without an additional loading aid, whereas the packing units of the second classification group are manually reloaded from stock units into load carriers and distributed and stored by means of same.

The known system aims at improving the conveyance and storage of packing units in a storage system. However, the emergence of e-commerce and/or the direct delivery to end customers in the mail-order business-predominantly of articles with a low number of pieces—the order-picking zone of a storage and order-picking system has developed into a "hot spot," i.e. into a zone which is critical in terms of performance engineering. EP 2 297 005 B1, however, addresses this problem not at all or only insufficiently.

In this context, WO 2017/198280 A1 also discloses an order-picking system for the order-based picking of articles into target containers with a plurality of automated order-picking cells. In addition, the order-picking system comprises a conveying system for transporting source containers to and/or for transporting source containers away from the order-picking cells. Here, a first order-picking cell has article handling properties which are different from those of a second order-picking cell and is used for processing orders and/or partial orders which are different from those processed by the second order-picking cell.

SUMMARY OF THE INVENTION

It is therefore an object of the invention to specify an improved method for order-picking articles and/or an improved storage and order-picking system for order-picking articles. In particular, the processing of sales orders is to be made more efficient.

The object of the invention is achieved by a method for order-picking articles from source loading aids into or onto target loading aids in a storage and order-picking system, comprising the steps
  a) provisioning the articles in or on source loading aids in a storage zone,
  b) acquiring orders for order-picking articles and determining the articles required for these orders, wherein at least one order of the orders comprises multiple order lines and wherein each order line specifies at least one article according to its type of article and its number of pieces to be order-picked,
  c) ascertaining the classification of the articles required for the processing of said order in groups of types of article, each of which comprises multiple types of article, wherein a first group of types of article contains types of article which can be handled automatically and a second group of types of article contains types of article which cannot, or only to a limited extent, be handled automatically but can be handled manually,
  d) determining a first order part whose at least one article belongs to the first group of types of article and can accordingly be handled automatically and of a second order part whose at least one article belongs to the second group of types of article and can accordingly not, or only to a limited extent, be handled automatically but can be handled manually,
  e) retrieving a first source loading aid with the at least one article of the first order part from the storage zone of the storage and order-picking system, transporting the first source loading aid (directly) to a first automatic order-picking station, provisioning the first source loading aid at the first automatic order-picking station and removing automatically the at least one article of the first order part from the first source loading aid at the first automatic order-picking station, f) retrieving a second source loading aid with the at least one article of the second order part from the storage zone of the storage and order-picking system, transporting the second source loading aid (directly) to a first manual order-picking station, provisioning the second source loading aid at the first manual order-picking station and removing manually the at least one article of the second order part from the second source loading aid at the first manual order-picking station, and g) discharging (and/or loading) the at least one article of the first order part and the at least one article of the second order part into or onto a target loading aid.

Further, the object of the invention is achieved by a storage and order-picking system for order-picking articles from source loading aids into or onto target loading aids, comprising a storage zone for provisioning the articles in or on source loading aids, a control system for acquiring orders for order-picking articles and for determining the articles required for these orders, wherein at least one order of the orders comprises multiple order lines and wherein each order line specifies at least one article according to its type of article and its number of pieces to be order-picked, ascertaining the classification of the articles required for the processing of said order in groups of types of article, each of which comprises multiple types of article, wherein a first group of types of article contains types of article which can be handled automatically and a second group of types of article contains types of article which cannot, or only to a limited extent, be handled automatically but can be handled manually, and determining a first order part whose at least one article belongs to the first group of types of article and can accordingly be handled automatically and a second order part whose at least one article belongs to the second group of types of article and can accordingly not, or only to a limited extent, be handled automatically but can be handled manually, and a conveying system for retrieving a first source loading aid with the at least one article of the first order part from the storage zone of the storage and order-picking system, transporting the first source loading aid (directly) to a first automatic order-picking station and provisioning the first source loading aid at the first automatic order-picking station, at which the at least one article of the first order part is removable automatically from the first source loading aid, and retrieving a second source loading aid with the at least one article of the second order part from the storage zone of the storage and order-picking system, transporting the second source loading aid (directly) to a first manual order-picking station and provisioning the second source loading aid at the first manual order-picking station, at which the at least one article of the second order part is removable manually from the second source loading aid, wherein the first automatic order-picking station is configured for discharging (and/or loading) automatically the at least one article of the first order part and the first manual order-picking station is configured for discharging (and/or loading) manually the at least one article of the second order part into or onto a target loading aid.

The proposed measures ensure that the order-picking can take place essentially faultlessly with a high degree of automation. The execution of sales orders is thus improved considerably, in particular for a single-piece order-picking.

It is advantageous if types of article for which an error rate during automatic handling is smaller than or equal to a first threshold value are allocated to the first group of types of article and types of article for which an error rate during automatic handling is larger than the first threshold value are allocated to the second group of types of article, wherein the quotient of the erroneous handling operations occurring during the (automatic) order-picking divided by the total number of the (automatic) handling operations is provided as error rate.

The terms "handling (operation)" or "manipulation" comprise, in particular, the removal of (an) article(s) from a source loading aid, the discharging of (an) article(s) into or onto a target loading aid or the reloading of (an) article(s) from a source loading aid into or onto a target loading aid.

"Reloading" generally refers to the removing of (an) article(s) from a source loading aid and the discharging/loading of this/these article(s) into or onto a target loading aid.

"Automatic handling (operation)" accordingly comprises in particular the automatic removal of (an) article(s) from a source loading aid, the automatic discharging of (an) article(s) into or onto a target loading aid or the automatic reloading of (an) article(s) from a source loading aid into or onto a target loading aid. During the order-picking operation, the "automatic handling (operation)" comprises, in particular, the automatic removal of (an) article(s) of the first order part from a first source loading aid, the automatic discharging of (an) article(s) of the first order part into or onto a first target loading aid or the automatic reloading of (an) article(s) of the first order part from a first source loading aid into or onto a first target loading aid. Articles "can be handled automatically" whenever they are suited for an "automatic handling (operation)" and/or whenever a particular error rate is not exceeded during "automatic handling."

"Manual handling (operation)" accordingly comprises, in particular, the manual removal of (an) article(s) from a source loading aid, the manual discharging of (an) article(s) into or onto a target loading aid or the manual reloading of (an) article(s) from a source loading aid into or onto a target loading aid. During the order-picking operation, the "manual handling (operation)" comprises, in particular, the manual removal of (an) article(s) of the second order part from a second source loading aid, the manual discharging of (an) article(s) of the second order part into or onto a first or second target loading aid or the manual reloading of (an) article(s) of the second order part from a second source loading aid into or onto a first or second target loading aid. Articles "can be handled manually" in particular whenever they cannot be handled automatically, or can be handled automatically only with difficulty.

An "erroneous handling (operation)" is a handling operation (i.e. a removal of (an) article(s) from a source loading aid, a discharging of (an) article(s) into or onto a target loading aid or a reloading of (an) article(s) from a source loading aid into or onto a target loading aid) which is not executed in the expected or planned manner or is aborted.

In particular, the following measures can be provided as error rate:

the quotient of the number of the failed automatic removals of articles from a first source loading aid divided by the total number of (failed and successful) automatic removals of articles from a first source loading aid, or the quotient of the number of the failed automatic discharging operations of articles into or onto a target loading aid divided by the total number of (failed and successful) automatic discharging operations of articles into or onto a target loading aid, or the quotient of the number of the failed automatic reloading operations of articles from a source loading aid into or onto a target loading aid divided by the total number of (failed and successful) automatic reloading operations of articles from a source loading aid into or onto a target loading aid, or a measure derived from the above quotients.

During the order-picking operation, in particular, the quotient of the number of the automatic removals of articles of the first order part from a first source loading aid failed at the first automatic order-picking station divided by the total number of the automatic removals of articles of the first order part from a first source loading aid (failed and successful) at the first automatic order-picking station, or the quotient of the number of the automatic discharging operations of articles of the first order part into or onto a first target loading aid failed at the first automatic order-picking station divided by the total number of the automatic discharging operations of articles of the first order part into or onto a first target loading aid (failed and successful) at the first automatic order-picking station, or the quotient of the number of the automatic reloading operations of articles of the first order part from a first source loading aid into or onto a first target loading aid failed at the first automatic order-picking station divided by the total number of the automatic reloading operations of the first order part from a first source loading aid into or onto a first target loading aid (failed and successful) at the first automatic order-picking station, or a measure derived from the above quotients is provided as error rate.

Generally, within the scope of this disclosure, a "measure derived from a quotient (defining the error rate)" can be understood to mean a mathematical term which contains said quotient, for example.

The first threshold value may be 10%, for example. Accordingly, "can be handled automatically," within the scope of the invention, does not necessarily mean that all articles of the first group of types of article can be manipulated by a robot in an error-free manner. Rather, a low error rate is admissible under certain circumstances. As a rule, articles which can be handled automatically can also be handled manually. However, exceptions are conceivable, for example if (an) article(s), due to its/their weight and/or its/their size, cannot be manipulated by a person and/or (an) article(s) is/are not to be manipulated for ergonomic reasons.

Similarly, "cannot be handled automatically" or "can only be handled manually," within the scope of the invention, does also not necessarily mean that the articles of the second group of types of article cannot be handled automatically at all. Rather, an automatic handling is possible, for example by a robot, but an increased error rate is to be expected. For example, the suitability of whether or not a type of article can be handled automatically can be empirically established and recorded so as to be retrievable in a database, for example via a flag which shows the classification a type of article in a group of types of article.

Ultimately, articles of the first group of types of article can most likely be handled automatically in an error-free manner, or only with a low error rate, whereas articles of the second group of types of article could most likely not be handled automatically in an error-free manner, or only with a very high error rate, and are therefore order-picked manually.

Advantageously, the procedures at the first automatic order-picking station are monitored by a checking system, and a handling (in particular executed in the course of the order-picking operation, or even independent of same) is classified as erroneous handling by the checking system whenever the handling is executed in an unplanned manner or is aborted and fails.

The monitoring system can in particular have optical sensors (e.g. a camera), tactile sensors (e.g. pressure sensors on a robotic gripper) and an evaluation unit connected to the sensors (e.g. a microcontroller), wherein the latter evaluates the sensor signals and carries out the actual classification of the handling operations.

A failed handling has occurred, for example, whenever (an) article(s) is/are to be removed from a source loading aid, but it/they fall(s) back into the source loading aid or on the floor unplanned. An operation may also be erroneous whenever (an) article(s) of the desired type of article, but not the desired article(s) (i.e. specifically the desired article(s)) and/or the desired number of articles, is/are removed from the source loading aid.

An erroneous handling operation has also occurred, for example, whenever (an) article(s) is/are to be discharged into or onto a target loading aid but does not reach the target loading aid. An operation may also be erroneous whenever the article(s), while being discharged into the target loading aid, end(s) up at an undesired location and/or in an undesired position.

An erroneous handling has occurred during reloading whenever the removal of (an) article(s) from the source loading aid or the discharging of the article(s) into the target loading aid fails.

It is also advantageous if a third group of types of article is provided and types of article in which an error rate during automatic handling (i.e. during the automatic removal of (an) article(s) from a first source loading aid, the automatic discharging of (an) article(s) into or onto a first target loading aid or during the automatic reloading of (an) article(s) from a first source loading aid into or onto a first target loading aid), in particular at the first automatic order-picking station, is smaller than a first threshold value are allocated to the first group of types of article, types of article in which an error rate during automatic handling (i.e. during the automatic removal of (an) article(s) from a first source loading aid, the automatic discharging of (an) article(s) into or onto a first target loading aid or during the automatic reloading of (an) article(s) from a first source loading aid into or onto a first target loading aid), in particular at the first automatic order-picking station, is larger than a second threshold value are allocated to the second group of types of article, and the remaining types of article, in which the error rate is larger than or equal to the first threshold value and smaller than or equal to the second threshold value, are allocated to a third group of types of article, wherein articles of the third group of types of article in an order can be assigned optionally to the first order part or to the second order part.

In this variant embodiment, it is taken into account that articles can be order-picked automatically or also manually with an acceptable error rate. These articles of the third group of types of article are assigned to the first order part or to the second order part as and when needed, for example in order to be able to have a targeted effect on the capacity utilization of the first automatic order-picking station(s) and the first manual order-picking station(s). This is of advantage in particular whenever an order has a disproportionately large number of articles of the first group of types of article but very few articles of the second group of types of article, or a disproportionately small number of articles of the first group of types of article but a very large number of articles of the second group of types of article. The proposed measures ensure that an uneven load of the first automatic order-picking station(s) and of the first manual order-picking station(s), which would be expected due to the imbalance mentioned of the first and second groups of types of article, can be balanced, entirely or at least in part, by a corresponding allocation of the articles of the third group of types of article. The first threshold value may for example be 5% and the second threshold value for example 15%.

In a favorable variant of the method, an error rate is assigned to a type of article. In this way, the planning of the method for order-picking articles can take place in an even more differentiated manner. In particular, order lines can advantageously be sorted on the basis of their error rate.

In a "storage and order-picking system," articles can for example be delivered to and taken over at an article receiving area and then be repacked, if applicable, and stored in a storage area. The articles can also be order-picked in accordance with an order, i.e. be retrieved from the storage area, compiled into an order and provisioned for outbound transport at the article issue area. In contrast to a manufacturing process, the articles are not substantially changed between the article receiving area and the article issue area. However, a slight change in shape is possible, in particular in case of non-rigid bodies such as pouches or bags, for example, or also in case of other pliant packaging, for instance made of cardboard or plastic. A storage and order-picking system can also have one or multiple sorting means, with which articles can be put into a specified or specifiable sequence.

"Articles" are generally objects of the trade in articles and are inbound-delivered at the article takeover zone and outbound-transported to a customer in accordance with an order at the article handover zone. The assignment to an order can take place for articles already in storage or, in principle, even before. Within the scope of the invention, (an) "article(s)" is/are in particular understood to mean an object that can be handled individually and/or a group of objects that can be handled individually.

A "type of article" specifies the kind of (an) article(s). For example: "tagliatelle, 1 kg" or "mineral water 11" can be provided as type of article. The type of article can in particular also comprise items of clothing. For example: "shirt, white, size 42" or "jeans, size 34/34" or "sock, black, size 43" can be provided as type of article.

The "range of articles" specifies the entirety of the types of article stored in the storage and order-picking system. The range of articles can be divided into groups of types of article with the help of threshold values of an error rate. The first group of types of article can furthermore be divided into further subgroups of types of article with the help of "subgroup threshold values."

A "group of types of article" is a group of multiple types of article. Here, a "first group of types of article" groups those types of article which can be handled automatically and a "second group of types of article" contains types of article which cannot, or only to a limited extent, be handled automatically but can be handled manually. A "third group of types of article"-if applicable-contains types of article which can be handled both automatically and manually.

A "subgroup of types of article" subdivides the first group of types of article, wherein a "first subgroup of types of article" groups those types of article which can be handled automatically using a gripper of a first kind and a "second subgroup of types of article" groups those types of article which can be handled automatically using a gripper of a second kind. A "third subgroup of types of article"-if applicable-contains types of article which can be handled automatically both using the gripper of the first kind and using the gripper of the second kind. For example, the gripper of the first kind can be configured as a suction gripper, and a gripper of the second kind can be configured as a mechanical gripper (e.g. as gripping pliers or as a robotic hand).

An "order line" specifies (an) article(s) (at least) according to its/their type(s) of article and its/their number of pieces to be order-picked. For example, an order line may comprise: "1 piece, tagliatelle, 1 kg" or "10 pieces, mineral water 11." The article(s) can in general be of different kinds and in particular also comprise items of clothing. For example, an order line may therefore also comprise: "1 piece, shirt, white, size 42" or "3 pieces, jeans, size 34/34" or "10 pieces, sock, black, size 43."

Within the scope of the invention, at least one "order for order-picking articles" ("picking order" in short) comprises multiple order lines, whose assigned (various) articles are stored in a storage zone. For example, socks may be stored in first loading aids which are configured as containers. Shirts, in contrast, may be stored in second loading aids which are configured as hanging bags. An order can in general be fulfilled by retrieving even only a single container if this container contains the first and second order parts. In the order-picking operation, in addition to orders with two order parts and thus at least two order lines, furthermore also orders which comprise a single order line can be acquired and processed.

At least one order generally contains a "first order part," whose articles are manipulated automatically and a "second order part," whose articles are manipulated manually. The first order part can be subdivided into a "first order subpart" and a "second order subpart." The articles of the first order subpart are manipulated automatically with the help of a gripper of the first kind, the articles of the second order subpart are manipulated with the help of a gripper of the second kind. The first order part and the second order part can each comprise one article or multiple articles. Also the first order subpart and the second order subpart can each comprise one article or multiple articles.

Within the scope of the invention, "order-picking" is to be understood to mean the compiling of articles for a picking order, in the narrower sense the loading of a target loading aid with the article(s) of the first order line and/or the article(s) of the second order line.

"Homogeneous" means that the articles stored in a source loading aid have the same type of article. For example, a first loading aid contains the article(s) "A" and a second loading aid contains the article(s) "B" etc. On the other hand, the loading aids can be subdivided into multiple receiving compartments by separating walls and receive different types of article, wherein (an) article(s) "A" can be received in the first receiving compartment and (an) article(s) "B" can be received in the second receiving compartment. The articles stored in a storage zone or in a loading aid so as to be "mixed" or "non-homogeneous," in contrast, have different types of article.

A "storage location" is an area in the storage and order-picking system in which (an) article(s) can be stored. A "storage zone" is accordingly an area in the storage and order-picking system which has a plurality of storage locations for storing the articles. For example, the storage zone may be configured as a stationary or mobile storage rack which provisions a plurality of storage locations next to one another and on top of one another. Yet it is also conceivable that the storage zone is an area on the floor of the storage and order-picking system which is provided and/or reserved for depositing and storing (an) article(s). Walking and traveling zones are accordingly not storage zones but may adjoin same.

An "article takeover zone" is to be understood to be that area in which the storage and order-picking system is supplied with articles, i.e. in particular an article receiving area. In particular, inbound-delivered article carriers (e.g. pallets, cardboard boxes, etc.) can be separated in a manual or automated manner. This operation is also referred to as "depalletizing."

An "article handover zone" is to be understood to be that area in which articles are discharged from the storage and order-picking system, i.e. in particular an article issue area.

A "loading aid" generally serves the storage and the transport of articles in the storage and order-picking system and can in particular be configured as a container, cardboard box, tray, pallet, bag (in particular as a "polybag"), pouch, sack, hanging bag or rack. It should be noted in this context that not all loading aids in the storage and order-picking system must have the same properties, but the loading aids may also be configured differently. In addition, the loading aids can have multiple receiving zones/receiving compartments.

A "source loading aid" is a loading aid which serves the reception of the articles during the storing operation (i.e. in an article takeover zone), the storage the articles in the storage zone, as well as the transport of the articles to an order-picking station. The source loading aid can in particular be configured as a container, cardboard box, tray, pallet, bag (in particular as a "polybag"), pouch, sack, hanging bag or rack.

A "target loading aid" serves the reception of the articles during the order-picking operation and can equally be configured as a container, cardboard box, tray, pallet, bag (in particular as a "polybag"), pouch, sack, hanging bag or rack. The target loading aid can in particular function as a "dispatch loading aid" and serve the outbound transport of articles from the storage and order-picking system. Yet the target loading aid may also function as an "interim loading aid," in which articles which have been order-picked and are intended for dispatching are interim-stored before they are reloaded into a dispatch loading aid. Generally, it should also be noted that the first target loading aid is not necessarily assigned to the first order part and the second target loading aid is not necessarily assigned to the second order part. Yet such an assignment can be done.

The transporting of source and target loading aids within the storage and order-picking system is done by "a conveying system," which may have "(a) stationary conveying device(s)" and/or "conveying vehicles operated in an automated manner."

For transporting articles, "(a) stationary conveying device(s)" require(s) permanently-arranged devices. For example, a lift requires a frame on which a lifting platform is moved. The lifting platform alone, in contrast, is not functional. (A) stationary conveying device(s) is/are in particular characterized in that it/they cannot be removed from the storage and order-picking system without loosening fastenings. (A) stationary conveying device(s) is/are in particular understood to mean roller conveyors, band conveyors, belt conveyors, chain conveyors and suchlike. An autonomous industrial truck, in contrast, can be removed from the storage and order-picking system without loosening fastenings. (A) stationary conveying device(s) can in particular also comprise an "overhead conveyor," on which the hanging bags can be stored and/or transported in a suspended state.

Within the scope of the invention, "conveying vehicles operated in an automated manner" are to be understood to mean self-propelled and/or driverless conveying vehicles for transporting articles which travel along permanently-specified paths or which are freely guided, i.e. without fixed track guidance. A fixed track guidance can be specified on the floor of the travel surface, for instance with the help of optical color stripes, with magnetic strips, with marker tags or also with rails. A conveying vehicle operated in an automated manner comprises, in particular, a transport platform on which the articles to be transported are received temporarily. Instead of the transport platform or in addition to it, the conveying vehicle operated in an automated manner may also have a (telescopable) hanger rod and/or overhead conveyor for the reception of hanging bags. For example, the transport platform/hanger rod can be permanently affixed to the conveying vehicle, yet the transport platform/hanger rod can also be vertically and/or laterally movable relative to an underframe of the conveying vehicle, for example in order to be able to store articles into a storage rack and retrieve them from the storage rack. Wheels, at least one of which is driven, are arranged on the underframe. Further, a conveying vehicle operated in an automated manner also comprises an electronic control for the reception of commands from a superordinate (central) control and for controlling/regulating the movements of the conveying vehicle operated in an automated manner.

A "storage and retrieval unit" is a conveying vehicle operated in an automated manner which travels on rails and can be configured as a single-level storage and retrieval unit (also referred to as "shuttle") or as a multi-level storage and retrieval unit. For their operation, storage and retrieval units require elements of (a) stationary conveying device(s) (namely the rails). For this reason, within the scope of the invention, storage and retrieval units are counted among the stationary conveying device(s).

An "autonomous industrial truck" is a non-guided conveying vehicle operated in an automated manner (driverless). At least one of the wheels is steerable, unless the autonomous conveying vehicle has wheels with which also a lateral movement can be executed (e.g. Mecanum wheels). An autonomous industrial truck also comprises sensors for capturing the environment of the industrial truck and for spatial orientation. Such autonomous industrial trucks are known to the person skilled in the art as "Autonomous Guided Vehicles," "AGVs" in short.

An "order-picking station" is a station and/or an area or location at or in which articles can be loaded into a target loading aid. For the control of the order-picking operation of the articles, the order-picking station may comprise an order-picking-station control. Yet it would also be conceivable that the order-picking operation is alternatively or additionally controlled by a central control of the storage and order-picking system.

An "automatic order-picking station" is an order-picking station at which the order-picking operation, i.e. the reloading of articles from a source loading aid into a target loading aid, is executed automatically by a robot. Here, human assistance is limited essentially to the programming and monitoring of the robot. The robot can be controlled by its own robot control or by an order-picking-station control of the automatic order-picking station. Yet it would also be conceivable that the order-picking operation is alternatively or additionally controlled by a central control of the storage and order-picking system.

An "automatic order-picking substation" is an automatic order-picking station whose robot is equipped with a gripper of a particular kind. For example, a "first automatic order-picking substation" is equipped with a gripper of a first kind, a "second automatic order-picking substation" with a gripper of a second kind.

A "manual order-picking station" is an order-picking station at which the order-picking operation, i.e. the reloading of articles from a source loading aid into a target loading aid, is executed manually by a worker. This manual order-picking operation may, however, be computer-aided. For example, the worker can be instructed, with the help of an output unit (e.g. a display or a voice output unit), to execute a particular operation. The worker can provide a feedback via an input unit (e.g. a keyboard, a touch display or a voice input unit) and/or a capturing unit (e.g. a scanner). Any combination of said functional units is possible, of course. Said functional units can be controlled by an order-picking-station control of the manual order-picking station. Yet it would also be conceivable that said functional units are alternatively or additionally controlled by a central control of the storage and order-picking system.

Generally, a storage and order-picking system may comprise one (single) automatic order-picking station and one (single) manual order-picking station, or the storage and order-picking system has multiple automatic order-picking stations and multiple manual order-picking stations. In the same way, a storage and order-picking system can comprise one (single) first automatic order-picking substation or multiple first automatic order-picking substations as well as one (single) second automatic order-picking substation or multiple second automatic order-picking substations.

A "supply position" is generally a position at which a loading aid is provisioned. At this position, a removal of (an) article(s) from a source loading aid and/or a discharging of (an) article(s) into a target loading aid is possible. For example, the supply position may be formed by a stopping position for a loading aid on a conveying system.

A "mobile rack" is a movable rack which is not fixed at a particular location. A mobile rack can in particular comprise wheels for easier transport. A mobile rack can in particular also be configured for the transport of hanging bags and have a "mobile overhead storage conveyor," i.e. a movable overhead conveyor which is not fixed at a particular location.

A "control system" generally serves the control of the elements of the storage and order-picking system, in particular of the conveying system of the storage and order-picking system. The control system may comprise multiple control components which are interconnected and, if applicable, structured hierarchically. For example, the control system may comprise an order-processing computer, which serves the acquiring of an order and the preparation of same. In particular, the control system also comprises the controls of the order-picking stations.

Further advantageous designs and further advancements of the invention result from the sub claims as well as from the description in combination with the figures.

In the disclosed storage and order-picking system, it is favorable if the conveying system is configured
  for the transport of the first source loading aids between the storage zone and the first automatic order-picking station, and/or
  for the transport of the second source loading aids between the storage zone and the first manual order-picking station, and/or
  for the transport of the first target loading aids between the first automatic order-picking station and the first manual order-picking station or between the first automatic order-picking station and the second automatic or manual order-picking station, and/or
  for the transport of the second target loading aids between the first manual order-picking station and the second automatic or manual order-picking station, and/or
  for the transport of the first target loading aids from the first automatic order-picking station, from the first manual order-picking station or from the second automatic or manual order-picking station, and/or
  for the transport of the second target loading aids from the second automatic or manual order-picking station, and/or
  for the transport of the third target loading aids from the second automatic or manual order-picking station.

In more general terms, this means that the conveying system is configured for the inbound and outbound transport of source loading aids to and from the automatic/manual order-picking stations and for the inbound and outbound transport of target loading aids to and from the automatic/manual order-picking stations. In this way, the source loading aids and the target loading aids can be transported automatically to and from the automatic/manual order-picking stations. This increases the degree of automation in the storage and order-picking system.

Advantageously, the conveying system is also configured for the transport of third source loading aids between the storage zone and the first automatic order-picking station if a first order-picking substation and a second order-picking substation of the first automatic order-picking station are provided.

Further, a jointed-arm robot or a gantry robot with a gripper is advantageously provided at the first automatic order-picking station. In this way, articles of the first order part can be removed from a source loading aid in a highly targeted manner. This variant is therefore particularly well-suited whenever a large number of articles is stored in the source loading aid.

It is further favorable if the ratio between the number of the first automatic order-picking stations and the number of the first manual order-picking stations is smaller than or equal to 1. In this way, a plurality of different articles can be order-picked, as the first manual order-picking stations are able to respond well to changes. This means that this variant is particularly suited whenever a large number of different types of article is stored in the storage zone.

Yet it is also favorable if the ratio between the number of the first automatic order-picking stations and the number of the first manual order-picking stations is larger than or equal to 1. In this way, the order-picking operation can take place in a highly-automated manner, as a plurality of first automatic order-picking stations is available. This variant is particularly suited whenever a rather small number of different types of article is stored in the storage zone.

In the disclosed method, it is favorable if the at least one article of the first order part, in the step g), is loaded automatically into or onto a first target loading aid at the first automatic order-picking station, the first target loading aid loaded with the at least one article of the first order part is transported to the first manual order-picking station and the at least one article of the second order part is additionally loaded manually into the first target loading aid at the first manual order-picking station. In this way, a particularly high packing density can be achieved in the first target loading aid, as a human order-picker usually has more comprehensive skills in loading a loading aid than a robot. In particular, a human order-picker is able to repack articles in the first target loading aid, wherein he particularly benefits from the fact that he has two hands.

It is also favorable if the at least one article of the second order part, in the step g), is loaded manually into or onto a first target loading aid at the first manual order-picking station, the first target loading aid loaded with the at least one article of the second order part is transported to the first automatic order-picking station and the at least one article of the first order part is additionally loaded automatically into the first target loading aid at the first automatic order-picking station. In this way, a high degree of automation in the storage and order-picking system can be achieved, as the additional loading of the at least one article of the second order part into the first loading aid takes place automatically.

It is furthermore favorable if the at least one article of the first order part, in the step g), is loaded automatically into or onto a first target loading aid at the first automatic order-picking station, the at least one article of the second order part is loaded manually into or onto a second target loading aid at the first manual order-picking station, the first target loading aid loaded with the at least one article of the first order part and the second target loading aid loaded with the at least one article of the second order part are transported either to a second automatic order-picking station or to a second manual order-picking station and
  i) the at least one article of the second order part is loaded automatically/manually into the first target loading aid at the second automatic/manual order-picking station, or
  ii) the at least one article of the first order part is loaded automatically/manually into the second target loading aid at the second automatic/manual order-picking station.

In these variants, both the first and the second order part are first loaded into or onto a first and/or second target loading aid. In another step, the at least one article of the second order part is then additionally loaded to the first target loading aid (case i), or the at least one article of the first order part is additionally loaded to the second target loading aid (case ii). This joining of flows of articles is also known as "consolidating."

In the above context, it is of advantage in the method presented if,
  in the case i), all articles of the second order part loaded in or on the second target loading aid are discharged automatically and all at once (i.e. in one step) into or onto the first target loading aid at the second automatic order-picking station, or
  in the case ii), all articles of the first order part loaded in or on the first target loading aid are discharged automatically and all at once (i.e. in one step) into or onto the second target loading aid at the second automatic order-picking station.

Accordingly, it is of advantage in the storage and order-picking system presented if a mechanical device for the automatic discharging of the entire content
  of the first target loading aid into the second target loading aid, and/or
  of the second target loading aid into the first target loading aid,
all at once (i.e. in one step) is provided at the second automatic order-picking station.

For example, a mechanical tilting device, mechanical dropping device or mechanical scraper device can be used to that end.

The at least one article of the second order part is then, in the case i), tilted from the second target loading aid into the first target loading aid with the help of a mechanical tilting device or dropped from the second target loading aid into or onto the first target loading aid with the help of a mechanical dropping device or scraped from the second target loading aid into or onto the first target loading aid with the help of a mechanical scraper device at the second automatic order-picking station.

The at least one article of the first order part is then, in the case ii), tilted from the first target loading aid into the second target loading aid with the help of a mechanical tilting device or dropped from the first target loading aid into the second target loading aid with the help of a mechanical dropping device or scraped from the first target loading aid into or onto the second target loading aid with the help of a mechanical scraper device at the second automatic order-picking station.

In this way, a particularly high degree of automation can be attained in the order-picking method, as the loading of the first or second target loading aid with the articles of the first or second order part at the second automatic order-picking station takes place automatically and in one step (in contrast to a gripping robot, which, as a rule, removes the articles from a source loading aid piece by piece and places them into or onto the target loading aid piece by piece). Thus, even those articles of the second order part which, strictly speaking, can only be order-picked manually are order-picked automatically at the second automatic order-picking station. This variant embodiment is suited in particular for robust articles, for example articles packaged in foil bags, in particular in the form of so-called "polybags."

Even if a gripping robot, as a rule, order-picks articles piece by piece, it may nevertheless be provided that it seizes a source loading aid as a whole and tilts its content into a target loading aid. It may likewise be provided that a robot scrapes multiple articles all at once from a source loading aid into a target loading aid with its arm. It is also conceivable that the robot seizes a source loading aid as a whole, moves it above the target loading aid and drops the content of the source loading aid into the target loading aid by actuation of a bottom opening. In this way, (a) mechanical tilting device(s), mechanical scraper device(s) or mechanical dropping device(s) can equally be realized.

It is further favorable if the at least one article of the first order part, in the step g), is loaded automatically into or onto a first target loading aid at the first automatic order-picking station, the at least one article of the second order part is loaded manually into or onto a second target loading aid at the first manual order-picking station, the first target loading aid loaded with the at least one article of the first order part and the second target loading aid loaded with the at least one article of the second order part are transported either to a second automatic order-picking station or to a second manual order-picking station and the at least one article of the first order part as well as the at least one article of the second order part are loaded automatically/manually into or onto a third target loading aid at the second automatic/manual order-picking station. In these variants, both the first and the second order part are first loaded, once again, into or onto a first and/or second target loading aid. In another step, the articles of the first and second order part are then loaded into or onto a third target loading aid. Also this operation can, once again, be referred to as "consolidating."

It is of advantage if
all articles of the second order part loaded in or on the second target loading aid are discharged automatically and all at once (i.e. in one step) into or onto the third target loading aid at the second automatic order-picking station, and/or
all articles of the first order part loaded in or on the first target loading aid are discharged automatically and all at once (i.e. in one step) into or onto the third target loading aid at the second automatic order-picking station.

Accordingly, it is of advantage in the storage and order-picking system presented if a mechanical device for the automatic discharging of the entire content
of the first target loading aid into the third target loading aid, and/or
of the second target loading aid into the third target loading aid all at once (i.e. in one step) is provided at the second automatic order-picking station.

For example, a mechanical tilting device, mechanical dropping device or mechanical scraper device-can, once again, be used to that end.

The at least one article of the second order part is then, at the second automatic order-picking station, tilted from the second target loading aid into the third target loading aid with the help of a mechanical tilting device or dropped from the second target loading aid into or onto the third target loading aid with the help of a mechanical dropping device or scraped from the second target loading aid into or onto the third target loading aid with the help of a mechanical scraper device.

The at least one article of the first order part is then, at the second automatic order-picking station, tilted from the first target loading aid into the third target loading aid with the help of a mechanical tilting device or dropped from the first target loading aid into the third target loading aid with the help of a mechanical dropping device or scraped from the first target loading aid into or onto the third target loading aid with the help of a mechanical scraper device.

In this way, a particularly high degree of automation can, once again, be attained in the order-picking method, as the loading of the first or second target loading aid with the articles of the first or second order part at the second automatic order-picking station takes place automatically and in one step (in contrast to a gripping robot, which, as a rule, removes the articles from a source loading aid piece by piece and places them into or onto the target loading aid piece by piece). Thus, even those articles of the second order part which, strictly speaking, can only be order-picked manually are order-picked automatically at the second automatic order-picking station. This variant embodiment is suited, once again, in particular for robust articles, for example articles packaged in foil bags, in particular in the form of so-called "polybags."

Even if a gripping robot, as a rule, order-picks articles piece by piece, it may be provided, also in this case, that it seizes a source loading aid as a whole and tilts its content into a target loading aid. It may likewise be provided that a robot scrapes multiple articles all at once from a source loading aid into a target loading aid with its arm. It is also conceivable that the robot seizes a source loading aid as a whole, moves it above the target loading aid and drops the content of the source loading aid into the target loading aid by actuation of a bottom opening. In this way, (a) mechanical tilting device(s), mechanical scraper device(s) or mechanical dropping device(s) may equally be realized.

Advantageously, an allocation of the types of article to the first group of types of article and to the second group of types of article takes place I) before or during the executing of the step a), and/or
II) during the executing of one of the steps e) or f) or g), and/or
III) independent of the steps b) to g).

In accordance with the first variant embodiment I), the allocation of a type of article to a group of types of article therefore takes place before or during the storing of (an) article(s) of this type of article, and in any case before the ascertaining of the classification of the articles required for the processing of an order in groups of types of article in the step c). In this case, the allocation of a type of article to a group of types of article thus takes place initially and before the actual order-picking operation, for example with the help of empirical trials, by experience with similar types of article or also by the supplier of (an) article(s) providing information on the ability of this/these article(s) to be handled automatically.

In accordance with the second variant embodiment II), the allocation of a type of article to a group of types of article takes place during the order-picking operation, i.e. "online." In this case, the allocation of a type of article to a group of types of article thus takes place adaptively, i.e. a type of article which was originally able to be handled manually can be classified as being able to be handled automatically, and vice versa.

In accordance with the third variant embodiment III), the allocation of a type of article to a group of types of article takes place in parallel to an order-picking operation, i.e. "offline." Also in this case, the allocation of a type of article to a group of types of article thus takes place adaptively, i.e. a type of article which was originally able to be handled manually can be classified as being able to be handled automatically, and vice versa. For example, automatic order-picking stations which are only used for testing purposes can be installed to that end. Yet it is also conceivable that (first) automatic order-picking stations which are currently not needed for the order-picking are used, for example in times of low performance requirement (for instance during the night).

It is favorable in the above context if a type of article of at least one article of the first order part which is first allocated to the first group of types of article, in the case II), is reallocated to the second group of types of article if the error rate during the automatic handling of this at least one article at the first automatic order-picking station (i.e. during the automatic removal of (an) article(s) of the first order part from a first source loading aid, the automatic discharging of (an) article(s) of the first order part into or onto a first target loading aid or during the automatic reloading of (an) article(s) of the first order part from a first source loading aid into or onto a first target loading aid) exceeds the first threshold value. In this variant embodiment, types of article which are originally allocated to the first group of types of article but which turn out to be unable, or able only with difficulty, to be handled automatically, are retrospectively allocated to the second group of types of article. The order-picking method is therefore adaptive, i.e. it is adapted to existing realities.

Advantageously, an allocation of the types of article to the first group of types of article and to the second group of types of article and to the third group of types of article takes place I) before or during the executing of the step a), and/or II) during the executing of one of the steps e) or f) or g), and/or III) independent of the steps b) to g).

In accordance with the first variant embodiment I), the allocation of a type of article to a group of types of article, once again, takes place before or during the storing of (an) article(s) of this type of article, and in any case before the ascertaining of the classification of the articles required for the processing of an order in groups of types of article in the step c). In this case, the allocation of a type of article to a group of types of article thus, once again, takes place initially and before the actual order-picking operation, for example with the help of empirical trials, by experience with similar types of article or also by the supplier of (an) article(s) providing information on the ability of this/these article(s) to be handled automatically.

In accordance with the second variant embodiment II), the allocation of a type of article to a group of types of article takes place, once again, during the order-picking operation, i.e. "online." In this case, the allocation of a type of article to a group of types of article thus takes place adaptively, i.e. a type of article which was originally able to be handled manually can be classified as being able to be handled automatically, and vice versa.

In accordance with the third variant embodiment III), the allocation of a type of article to a group of types of article takes place, once again, in parallel to an order-picking operation, i.e. "offline." Also in this case, the allocation of a type of article to a group of types of article thus takes place adaptively, i.e. a type of article which was originally able to be handled manually can be classified as being able to be handled automatically, and vice versa. For example, automatic order-picking stations which are only used for testing purposes can be installed to that end. Yet it is also conceivable that (first) automatic order-picking stations which are currently not needed for the order-picking are used, for example in times of low performance requirement (for instance during the night).

It is favorable in the above context if a type of article of at least one article of the first order part which is first allocated to the first group of types of article, in the case II), is reallocated to the second group of types of article if the error rate during the automatic handling of this at least one article at the first automatic order-picking station (i.e. during the automatic removal of (an) article(s) of the first order part from a first source loading aid, the automatic discharging of (an) article(s) of the first order part into or onto a first target loading aid or during the automatic reloading of (an) article(s) of the first order part from a first source loading aid into or onto a first target loading aid) exceeds the second threshold value and is reallocated to the third group of types of article if the error rate during the automatic handling of this at least one article at the first automatic order-picking station (i.e. during the automatic removal of (an) article(s) of the first order part from a first source loading aid, the automatic discharging of (an) article(s) of the first order part into or onto a first target loading aid or during the automatic reloading of (an) article(s) of the first order part from a first source loading aid into or onto a first target loading aid) exceeds the first threshold value but not the second threshold value. In this variant embodiment, types of article which are originally allocated to the first group of types of article, yet which turn out to be unable, or able only with difficulty, to be handled automatically are retrospectively allocated to the second or third group of types of article, depending on what the error rate during the (automatic) handling of the respective type of article of the first group of types of article is. The order-picking method is therefore, once again, adaptive, i.e. it is adapted to existing realities.

In another favorable variant of the method, the at least one article of the first order part which causes the reallocation of the type of article of this/these article(s) to the second group of types of article remains with the first order part. In this variant, the reallocation of a type of article of (an) article(s) of the first order part to the second group of types of article, therefore, has no effect on the current order-picking operation. The reallocation of the type of article of the article(s) of the first order part to the second group of types of article leads to a change in the procedure of the order-picking method only once the step c) (ascertaining the classification of the articles required for the processing of an order in groups of types of article) is executed the next time after said reallocation. Advantageously, the current order-picking operation is not disrupted by said reallocation. In particular, such a procedure is favorable whenever a rerouting of the article(s) of the first order part which causes said reallocation of the type of article to the second group of types of article to a first manual order-picking station is not possible or has considerable disadvantages.

Yet it is also favorable if the at least one article of the first order part which causes the reallocation of the type of article of this/these article(s) to the second group of types of article is allocated to the second order part and is order-picked accordingly. In this variant, the reallocation of a type of article of (an) article(s) of the first order part to the second group of types of article, therefore, has a direct effect on the current order-picking operation. The reallocation of the type of article of the article(s) of the first order part to the second group of types of article leads immediately also to a reallocation of the respective article(s) to the second order part. Advantageously, said reallocation takes immediate effect. In particular, such a procedure is favorable whenever those article(s) which cause(s) said reallocation of the type of article to the second group of types of article would lead to a considerable disruption of the procedure of the current order-picking operation if it were to still remain with the first order part.

It is therefore advantageous if (an) article(s) of the first order part is assigned to the second order part and conveyed to a first manual order-picking station (and the type of article of this/these article(s) in particular remains with the first group of types of article) if the number of erroneous handling operations of (exactly) this/these article(s) exceeds an erroneous-handling threshold value at the first automatic order-picking station. In this way, it is avoided that articles of the first order part which, in exceptional cases, cannot be handled automatically in an adequate time at the first automatic order-picking station block the respective first automatic order-picking station. Instead, these articles of the first order part are conveyed to a first manual order-picking station. In this variant embodiment, an allocation of this/these article(s) to the second or third group of types of article is basically not provided, as this is the response to an exceptional situation. However, it may happen that this/these article(s) also cause(s) the exceeding of the first threshold value (for example if a large number of other borderline handling operations has already taken place during an observation time period) and therefore a reassignment of the type of article of the respective article(s) occurs.

Advantageously, the first threshold value is ascertained on the basis of an (available) capacity of a group of order-picking stations which comprises at least one first automatic order-picking station and at least one first manual order-picking station and which is available for the execution of multiple orders in a specifiable time period.

In this variant, a first threshold value is sought which is adapted to the capacities of the first automatic and manual order-picking stations of the group, so that a load unbalance in the storage and order-picking system, i.e. an imbalance of the (percentage) capacity utilization of the first automatic and manual order-picking stations of the group, is avoided wherever possible.

The "capacity" (more precisely the "available capacity") is the quantity of handling operations that can be executed in a specifiable time period. A "required capacity," in contrast, is that quantity of handling operations that is required in a specifiable time period for the execution of a particular quantity of orders.

The capacity on which the ascertainment of the first threshold value is based may be the maximum quantity of handling operations which can be executed in a specifiable time period. Yet, in general, it can also be fixed to a lower value, for example 90% (relative capacity utilization) of said maximum quantity of handling operations. The capacities of the first automatic order-picking stations and of the first manual order-picking stations can also be fixed to different relative capacity utilizations. Also a segmentation based on a relative value which specifies the distribution of the absolute or relative capacity to the first automatic order-picking stations and to the first manual order-picking stations would be possible, e.g. 30% manual handling operations and 70% automatic handling operations.

In the above context, it is particularly advantageous if
multiple orders for order-picking articles are acquired and the articles required for these orders are determined (and advantageously sorted on the basis of their error rate),
for the execution of these orders in a specifiable time period, a first required capacity of the first automatic order-picking stations of the group for the order-picking of the articles of the first group of types of article and a second required capacity of the first manual order-picking stations of the group for the order-picking of the articles of the second group of types of article required in this time period is computed for various first threshold values,
a first available capacity of the first automatic order-picking stations of the group available in this time period and a second available capacity of the first manual order-picking stations of the group available in this time period is ascertained, and
that first threshold value is selected for the execution of said orders for which the lowest deviation between the first required capacity and the first available capacity as well as between the second required capacity and the second available capacity is ascertained.

For example, for the ascertainment of the smallest deviation, the sum of the deviation between the first available capacity and the first required capacity and the deviation between the second available capacity and the second required capacity can be computed. The smallest deviation is then the smallest of said sums which have been computed for various first threshold values. The following is then true:

Smallest deviation=minimum(first available capacity−first required capacity+second available capacity−second required capacity)

For the ascertainment of the smallest deviation, also the product, for example, of the deviation between the first available capacity and the first required capacity and the deviation between the second available capacity and the second required capacity can be computed. The smallest deviation is then the smallest of said products which have been computed for various first threshold values. The following is then true:

Smallest deviation=minimum((first available capacity−first required capacity)×(second available capacity−second required capacity))

It is further advantageous if the first threshold value and the second threshold value are ascertained on the basis of a capacity of a group of order-picking stations which comprises at least one first automatic order-picking station and at least one first manual order-picking station and which is available in a specifiable time period for the execution of multiple orders.

In this variant, not only a first threshold value is sought which is adapted to the capacities of the first automatic and manual order-picking stations of the group, but in addition also a second threshold value. Wherever possible, a load unbalance in the storage and order-picking system, i.e. an imbalance of the (percentage) capacity utilization of the first automatic and manual order-picking stations of the group, is to be avoided here.

Once again, the "capacity" (more precisely the "available capacity") is the quantity of handling operations that can be executed in a specifiable time period. Once again, a "required capacity," in contrast, is that quantity of handling operations that is required in a specifiable time period for the execution of a particular quantity of orders.

The capacity on which the ascertainment of the two threshold values is based may be, once again, be the maximum quantity of handling operations which can be executed in a specifiable time period. Yet, in general, it can also be fixed to a lower value, for example 90% (relative capacity utilization) of said maximum quantity of handling operations. The capacities of the first automatic order-picking stations and the first manual order-picking stations can also be fixed to different relative capacity utilizations. Also a segmentation based on a relative value which specifies the distribution of the absolute or relative capacity to the first automatic order-picking stations and to the first manual order-picking stations would be possible once again, e.g. 30% manual handling operations and 70% automatic handling operations.

It is particularly advantageous in the above context if
multiple orders for order-picking articles are acquired and the articles required for these orders are determined (and advantageously sorted on the basis of their error rate),
the third group of types of article (advantageously sorted according to its error rate), at a third threshold value, is segmented into articles with an error rate smaller than or equal to the third threshold value expected to be order-picked automatically and articles with an error rate larger than the third threshold value expected to be order-picked manually,
for the execution of these orders in a specifiable time period, a first required capacity of the first automatic order-picking stations of the group for the order-picking of the articles of the first group of types of article, including the articles of the third group of types of article expected to be order-picked automatically, and a second required capacity of the first manual order-picking stations of the group for the order-picking of the articles of the second group of types of article, including the articles of the third group of types of article expected to be order-picked manually, in this time period is computed for various third threshold values (i.e. for various segmentations of the third group of types of article), a first available capacity of the first automatic order-picking stations of the group available in this time period and a second available capacity of the first manual order-picking stations of the group available in this time period is ascertained, that third threshold value (i.e. that segmentation of the third group of types of article) is selected for the execution of said orders for which the smallest deviation between the first required capacity and the first available capacity as well as between the second required capacity and the second available capacity is ascertained, and the first threshold value is set in a selected first reserve distance below the third threshold value and the second threshold value is set in a selected second reserve distance above the third threshold value.

For the ascertainment of the smallest deviation, the sum, for example, of the deviation between the first available capacity and the first required capacity and the deviation between the second available capacity and the second required capacity can be computed once again. The smallest deviation is then the smallest of said sums which have been computed for various third threshold values. The following is then true:

Smallest deviation=minimum(first available capacity−first required capacity+second available capacity−second required capacity)

For the ascertainment of the smallest deviation, also the product, for example, of the deviation between the first available capacity and the first required capacity and the deviation between the second available capacity and the second required capacity can be computed once again. The smallest deviation is then the smallest of said products which have been computed for various third threshold values. The following is then true:

Smallest deviation=minimum((first available capacity−first required capacity)×(second available capacity−second required capacity))

The first reserve distance defines the size of the part of the third group of types of article which comprises the articles expected to be order-picked automatically and thus the reserve in order to be able to respond to unplanned and unexpected deviations of the actual running of the execution of said orders at the first automatic order-picking stations from the computation.

The second reserve distance defines the size of the part of the third group of types of article which comprises the articles expected to be order-picked manually and thus the reserve in order to be able to respond to unplanned and unexpected deviations of the actual running of the execution of said orders at the first manual order-picking stations from the computation.

It is also particularly advantageous if a partial quantity of orders to be executed is ascertained on the basis of a capacity of a group of order-picking stations which comprises at least one first automatic order-picking station and at least one first manual order-picking station and which is available in a specifiable time period for the execution of this partial quantity of orders to be executed. In this variant, a matching partial quantity of orders is sought which is selected from the entirety of the orders pending and to be processed and is expected to, or can substantially, be processed by the group of order-picking stations in a specifiable time period.

In the above context, it is further of advantage if multiple orders for order-picking articles are acquired and the articles required for these orders are determined, for the execution of these orders, a first required capacity of the first automatic order-picking stations of the group for the order-picking of the articles of the first group of types of article (including, if applicable, the articles of the third group of types of article with an error rate smaller than or equal to the third threshold value expected to be order-picked automatically) and a second required capacity of the first manual order-picking stations of the group for the order-picking of the articles of the second group of types of article (including, if applicable, the articles of the third group of types of article with an error rate larger than the third threshold value expected to be order-picked manually) required in this time period is computed for various partial quantities of said orders (in particular with a specified first or third threshold value), a first available capacity of the first automatic order-picking stations of the group available in a specifiable time period and a second available capacity of the first manual order-picking stations of the group available in this time period is ascertained, and that partial quantity of said orders is executed in the selected time period for which the smallest deviation between the first required capacity and the first available capacity as well as between the second required capacity and the second available capacity is ascertained.

For the ascertainment of the smallest deviation, the sum, for example, of the deviation between the first available capacity and the first required capacity and the deviation between the second available capacity and the second required capacity can be computed once again. The smallest deviation is then the smallest of said sums which have been computed for various partial quantities. The following is then true:

Smallest deviation=minimum(first available capacity−first required capacity+second available capacity−second required capacity)

For the ascertainment of the smallest deviation, also the product, for example, of the deviation between the first available capacity and the first required capacity and the deviation between the second available capacity and the second required capacity can be computed again. The smallest deviation is then the smallest of said products which have been computed for various partial quantities. The following is then true:

Smallest deviation=minimum((first available capacity−first required capacity)×(second available capacity−second required capacity))

It is favorable if the partial quantity of orders to be executed is ascertained with a specified first (or third) threshold value. This ensures that, beyond the determination of the partial quantity of orders, no substantial planning steps as such are required anymore, and the execution of the orders of said partial quantity can be started immediately.

It is also particularly advantageous if the first threshold value is ascertained on the basis of a capacity of a group of first automatic and manual order-picking stations for a partial quantity of orders to be executed, wherein said partial quantity of orders to be executed has previously been ascertained on the basis of the capacity of the group of the first automatic and manual order-picking stations. In this variant, in a first step, a matching partial quantity of orders is sought which is selected from the entirety of the orders pending and to be processed and is expected to, or can substantially, be processed by the group of first automatic and manual order-picking stations in a specifiable time period. In a second step, a first threshold value is sought which is adapted to the capacities of the first automatic and manual order-picking stations of the group.

Specifically, it may therefore be provided that
a partial quantity of orders to be executed is ascertained on the basis of a capacity of a group of order-picking stations which comprises at least one first automatic order-picking station and at least one first manual order-picking station and which is available in a specifiable time period for the execution of this partial quantity of orders to be executed, and
the first threshold value for this partial quantity of orders to be executed is ascertained on the basis of the capacity of the group of order-picking stations.

It is also conceivable that
multiple orders for order-picking articles are acquired and the articles required for these orders are determined,
for the execution of these orders in a specifiable time period, a first required capacity of the first automatic order-picking stations of the group for the order-picking of the articles of the first group of types of article and a second required capacity of the first manual order-picking stations of the group for the order-picking of the articles of the second group of types of article required in this time period is computed for various partial quantities of said orders,
a first available capacity of the first automatic order-picking stations of the group available in a specifiable time period and a second available capacity of the first manual order-picking stations of the group available in this time period is ascertained,
that partial quantity of said orders is executed in the selected time period for which the smallest deviation between the first required capacity and the first available capacity as well as between the second required capacity and the second available capacity is ascertained, wherein
a first required capacity of the first automatic order-picking stations of the group for the order-picking of the articles of the first group of types of article for the execution of the ascertained partial quantity of orders to be executed in the selected time period and a second required capacity of the first manual order-picking stations of the group for the order-picking of the articles of the second group of types of article required in this time period is computed for various first threshold values,
a first available capacity of the first automatic order-picking stations of the group available in this time period and a second available capacity of the first manual order-picking stations of the group available in this time period is ascertained, and
that first threshold value is selected for the execution of the ascertained partial quantity of orders to be executed for which the smallest deviation between the first required capacity and the first available capacity as well as between the second required capacity and the second available capacity is ascertained.

It is particularly advantageous in addition if the first threshold value and the second threshold value is ascertained on the basis of a capacity of a group of first automatic and manual order-picking stations for a partial quantity of orders to be executed, wherein said partial quantity of orders to be executed has previously been ascertained on the basis of the capacity of the group of the first automatic and manual order-picking stations. In this variant, in a first step, a matching partial quantity of orders is sought, once again, which is selected from the entirety of the orders pending and to be processed and is expected to, or can substantially, be processed by the group of first automatic and manual order-picking stations in a specifiable time period. In a second step, a first threshold value and a second threshold value is sought which is adapted to the capacities of the first automatic and manual order-picking stations of the group.

Specifically, it may therefore be provided that
a partial quantity of orders to be executed is ascertained on the basis of a capacity of a group of order-picking stations which comprises at least one first automatic order-picking station and at least one first manual order-picking station and which is available in a specifiable time period for the execution of this partial quantity of orders to be executed, and
the first threshold value and the second threshold value for this partial quantity of orders to be executed are ascertained on the basis of the capacity of the group of order-picking stations.

It is also conceivable that
multiple orders for order-picking articles are acquired and the articles required for these orders are determined,
for the execution of these orders in a specifiable time period, a first required capacity of the first automatic order-picking stations of the group for the order-picking of the articles of the first group of types of article and a second required capacity of the first manual order-picking stations of the group for the order-picking of the articles of the second group of types of article required in this time period is computed for various partial quantities of said orders,
a first available capacity of the first automatic order-picking stations of the group available in a specifiable time period and a second available capacity of the first manual order-picking stations of the group available in this time period is ascertained, and
that partial quantity of said orders is executed in the selected time period for which the smallest deviation between the first required capacity and the first available capacity as well as between the second required capacity and the second available capacity is ascertained, wherein
the third group of types of article, at a third threshold value, is segmented into articles with an error rate smaller than or equal to the third threshold value expected to be order-picked automatically and articles with an error rate larger than the third threshold value expected to be order-picked manually,
a first required capacity of the first automatic order-picking stations of the group for the order-picking of the articles of the first group of types of article, including the articles of the third group of types of article expected to be order-picked automatically, for the execution of the ascertained partial quantity of orders to be executed in the selected time period and a second required capacity of the first manual order-picking stations of the group for the order-picking of the articles of the second group of types of article, including the articles of the third group of types of article expected to be order-picked manually, in this time period is computed for various third threshold values, a first available capacity of the first automatic order-picking stations of the group available in this time period and a second available capacity of the first manual order-picking stations of the group available in this time period is ascertained, that third threshold value is selected for the execution of the ascertained partial quantity of orders to be executed for which the smallest deviation between the first required capacity and the first available capacity as well as between the second required capacity and the second available capacity is ascertained, and the first threshold value is set in a selected first reserve distance below the third threshold value and the second threshold value is set in a selected second reserve distance above the third threshold value.

It is further advantageous if a partial quantity of said orders is determined by random selection of some of the multiple orders. This is to avoid that only orders with a large portion of articles to be order-picked automatically or only orders with a large portion of articles to be order-picked manually are selected for the partial quantities and that it might then come to a load unbalance in the storage and order-picking system. Instead, the orders are selected randomly and thus in a more or less evenly distributed manner with regard to the kind of the order-picking (automatically or manually).

Yet it is also of advantage if an availability portion of the first available capacity (i.e. the capacity of the first automatic order-picking stations) is computed by division of the first available capacity by the sum of the first and the second available capacity (i.e. by the sum of the capacity of the first automatic order-picking stations and the first manual order-picking stations), a need portion for the first required capacity (i.e. the required capacity of the first automatic order-picking stations) is computed for each of the multiple orders by division of the first required capacity by the sum of the first and the second required capacity (i.e. by the sum of the required capacity of the first automatic order-picking stations and of the first manual order-picking stations), and the portion of orders with a need portion above the availability portion deviates by a maximum of 10% from the portion of orders with a need portion below the availability portion.

This is to ensure that as fitting a selection of orders as possible is achieved. In particular, an inequality between the first available capacity of the first automatic order-picking stations and the second available capacity of the first manual order-picking stations can easily be taken into account in this way. This means that, with the help of the variant embodiment proposed, the need for the orders of the partial quantity is well-adapted to the availability in the storage and order-picking system.

It is also of advantage in addition if said multiple orders are sorted on the basis of a sorting parameter and an even distribution with regard to the sorting parameter is aimed at when determining a partial quantity, wherein a number of pieces of articles of the first group of types of article in an order (including, if applicable, the articles of the third group of types of article with an error rate smaller than or equal to the third threshold value expected to be order-picked automatically) is provided as sorting parameter, or a relative portion of articles of the first group of types of article in an order (including, if applicable, the articles of the third group of types of article with an error rate smaller than or equal to the third threshold value expected to be order-picked automatically) is provided as sorting parameter, which is computed by division of the number of pieces of articles of the first group of types of article of an order by the number of pieces of all articles of this order.

This is to avoid that only orders with a high number of pieces or only orders with a low number of pieces are selected for the partial quantities and that it might then come to an unfavorable capacity utilization in the storage and order-picking system. During the order-picking operation, human order-pickers often manipulate multiple articles at the same time, i.e. reload multiple articles in one step from a source loading aid into or onto a target loading aid, whereas robots can often manipulate and/or reload only one or only a few articles at the same time. In this respect, an uneven distribution of the orders with regard to the number of pieces is unfavorable, which is why the orders in this variant embodiment are selected in an evenly distributed manner with regard to the number of pieces.

It is furthermore favorable if orders with a higher priority are selected preferentially for a partial quantity, wherein, to that end, the orders are advantageously sorted according to a priority according to which the orders are to be executed. This is to avoid that orders which must be executed swiftly will be order-picked with a delay due to other selection criteria.

It is also particularly advantageous if the first source loading aid with the at least one article of the first order part is allocated to the second order part, transported to a first manual order-picking station and provisioned there and then said at least one article of the second order part is loaded manually into or onto a first or second target loading aid if the discharging of multiple articles of the second group of types of article of the second order part into the first or second target loading aid at the first manual order-picking station takes place more swiftly than the discharging of the same number of articles of the first order part into the first target loading aid at the first automatic order-picking station, or if all articles of the second group of types of article of the second order part have already been loaded into first or second target loading aids at the first manual order-picking station.

In this way, the time required for the processing of a picking order can be kept short, as articles of the first order part which can be order-picked not only automatically but in general also manually are order-picked via the first manual order-picking station if the order-picking of the second order part takes place more swiftly than the order-picking of the first order part or the second order part has finished being order-picked altogether.

Furthermore, it is particularly advantageous if at least one article of the third group of types of article is allocated to the first order part, transported to a first automatic order-picking station and loaded automatically into first target loading aids there if the loading of the first target loading aids with multiple articles of the first group of types of article of the first order part at the first automatic order-picking station takes place more swiftly than the loading of the first or second target loading aids with the same number of articles of the second order part at the first manual order-picking station, or if all articles of the first group of types of article of the first order part have already been loaded into first target loading aids at the first automatic order-picking station.

In this way, the time required for the processing of a picking order is equally kept short, as articles of the third group of types of article which have not yet been order-picked are counted among the first order part if the order-picking of the articles of the first group of types of article takes place more swiftly than the order-picking of the articles of the second group of types of article or all articles of the first group of types of article have already been order-picked. This relieves the load on first manual order-picking stations, as articles of the third group of types of article at these first manual order-picking stations do not have to be order-picked, or have to be order-picked only in small part.

Yet it is also particularly advantageous if at least one article of the third group of types of article is allocated to the second order part, this at least one article is transported to a first manual order-picking station and provisioned there and then said at least one article of the second order part is loaded manually into first or second target loading aids if the loading of the first or second target loading aids with multiple articles of the second group of types of article of the second order part at the first manual order-picking station takes place more swiftly than the loading of the first target loading aids with the same number of articles of the first order part at the first automatic order-picking station, or if all articles of the second group of types of article of the second order part have already been loaded into first or second target loading aids at the first manual order-picking station.

In this way, the time required for the processing of a picking order is equally kept short, as articles of the third group of types of article which have not yet been order-picked are counted among the second order part if the order-picking of the articles of the second group of types of article takes place more swiftly than the order-picking of the articles of the first group of types of article or all articles of the second group of types of article have already been order-picked. This relieves the load on first automatic order-picking stations, as articles of the third group of types of article do not have to be order-picked, or have to be order-picked only in small part, at these first automatic order-picking stations.

Moreover, it is very advantageous if at least one article of the third group of types of article is allocated to the second order part, this at least one article is transported to a first manual order-picking station and provisioned there and then said at least one article of the second order part is loaded manually into first or second target loading aids as long as articles of the third group of types of article are available and if the loading of the first or second target loading aids with multiple articles of the second group of types of article of the second order part at the first manual order-picking station takes place more swiftly than the loading of the first target loading aids with the same number of articles of the first order part at the first automatic order-picking station or if all articles of the second group of types of article of the second order part have already been loaded into first or second target loading aids at the first manual order-picking station and then at least one article of the first order part is allocated to the second order part, transported to a first manual order-picking station and provisioned there and then said at least one article of the second order part is loaded manually into first or second target loading aids if the loading of the first or second target loading aids with multiple articles of the second group of types of article of the second order part at the first manual order-picking station takes place more swiftly than the loading of the first target loading aids with the same number of articles of the first order part at the first automatic order-picking station or if all articles of the second group of types of article of the second order part have already been loaded into first or second target loading aids at the first manual order-picking station.

In this way, the load on first automatic order-picking stations can be relieved particularly easily, provided that the processing of the picking order at the first manual order-picking station takes place particularly swiftly. Moreover, the time required for the processing of a picking order can be kept short even if the picking order contains particularly few articles of the first group of types of article relative to the articles of the second group of types of article.

Conversely, it is also advantageous if at least one article of the third group of types of article is allocated to the first order part, this at least one article is transported to a first automatic order-picking station and provisioned there and then said at least one article of the first order part is loaded automatically into a first target loading aid as long as articles of the third group of types of article are available and if the loading of the first target loading aids with multiple articles of the first group of types of article of the first order part at the first automatic order-picking station takes place more swiftly than the loading of the first or second target loading aids with the same number of articles of the second order part at the first manual order-picking station or if all articles of the first group of types of article of the first order part have already been loaded into first target loading aids at the first automatic order-picking station and then at least one article of the second order part is allocated to the first order part, transported to a first automatic order-picking station and provisioned there and then said at least one article of the first order part is loaded automatically into a first target loading aid if the loading of the first target loading aids with multiple articles of the first group of types of article of the first order part at the first automatic order-picking station takes place more swiftly than the loading of the first or second target loading aids with the same number of articles of the second order part at the first manual order-picking station or if all articles of the first group of types of article of the first order part have already been loaded into first target loading aids at the first automatic order-picking station.

In this way, the load on first manual order-picking stations can be relieved particularly easily, provided that the processing of the picking order at the first automatic order-picking station takes place particularly swiftly. Moreover, the time required for the processing of a picking order can be kept short even if the picking order contains particularly few articles of the second group of types of article relative to the articles of the first group of types of article. During the allocation of articles of the second order part to the first order part, it is to be ensured that said articles can, in general, be order-picked automatically. Specifically, this is the case if the error rate of the type of article of the respective articles is below an allocation threshold value, in particular below the first threshold value.

It is further particularly advantageous if the first source loading aid with the at least one article of the first order part is allocated to the second order part, transported to a first manual order-picking station and provisioned there and then said at least one article of the second order part is loaded manually into or onto a first or second target loading aid if a number of pieces is specified for the at least one article of the first order part in the respective order line which exceeds a number-of-pieces threshold value.

In this way, it is avoided that articles of an order line with a high number of pieces, which can, in general, be order-picked automatically and therefore belong to the first order part but whose automatic order-picking is unfavorable due to the high number of pieces, are transported to a first automatic order-picking station and provisioned there. These articles are assigned to the second order part and then order-picked manually.

In this variant, the circumstance that human order-pickers during the order-picking operation often manipulate multiple articles at the same time, i.e. reload them from a source loading aid into or onto a target loading aid, whereas robots can often manipulate and/or reload only one or only a few articles at the same time is taken advantage of. Here, humans benefit not only from the fact that they have two hands and two arms whereas robots often have only one arm and/or gripper but also from the fact that humans are able to stack articles on top of one another during the reloading operation and thus accelerate the order-picking operation.

This constitutes a departure from that principle according to which a robot is to order-pick numbers of pieces which are as large as possible. Overall, however, the time required for the processing of a picking order can be kept short, with only a low error rate, in this way.

Alternatively or additionally, it is also of advantage if the provisioning of multiple articles of the first order part at the first automatic order-picking station (and the retrieving and the transporting of said articles) takes place in a manner sorted according to the number of pieces specified in the order lines for the articles of the first order part, wherein the provisioning (and the retrieving and the transporting) of the articles of the first order part takes place from low toward ascending numbers of pieces, and the provisioning of multiple articles of the second order part at the first manual order-picking station (and the retrieving and the transporting of said articles) takes place in a manner sorted according to the number of pieces specified in the order lines for the articles of the second order part, wherein the provisioning (and the retrieving and the transporting) of the articles of the second order part takes place from high toward descending numbers of pieces.

In this variant, the order-picking method runs in an optimized manner with regard to the number of pieces contained in the order lines. If the order-picking runs faster than expected at the first manual order-picking stations, "leftover" articles of the first order part can be assigned to the second order part and then be order-picked manually. This means that there will be a rerouting of the flows of articles from a first automatic to a first manual order-picking station. Due to the particular procedure, the reassignment concerns order lines with rather higher numbers of pieces, which are favorable for the manual order-picking, whereas order lines with a lower number of pieces per type of article have advantageously already been processed at the first automatic order-picking station. Conversely, "leftover" articles of the second order part can be assigned to the first order part and then be order-picked automatically if the order-picking at the first manual order-picking stations runs more slowly than expected. Due to the particular procedure, the reassignment then concerns order lines with rather low numbers of pieces, which are favorable for the automatic order-picking.

This equally constitutes a departure from that principle according to which a robot is to order-pick numbers of pieces which are as large as possible. Overall, however, the time required for the processing of a picking order can be kept short, with only a low error rate, in this way.

During the allocation of articles of the second order part to the first order part, it is to be ensured that said articles can, in general, be order-picked automatically. Specifically, this is the case if the error rate of the type of article of the respective articles is below an allocation threshold value, in particular below the first threshold value.

In the context of a planning of the order-picking method, the optimized procedure of the order-picking method can, in general, take place without the determination of a number-of-pieces threshold value. Nevertheless, the determination of a number-of-pieces threshold value disclosed further above can be of advantage also in combination with this variant of the order-picking method. In this case, the segmentation of the articles in the context of a planning takes place on the basis of a number-of-pieces threshold value, and, during the execution of the plan, the provisioning of articles takes place in a manner sorted according to numbers of pieces. This ensures that the order-picking method can keep running in an optimal manner even if a deviation from the plan occurs during the execution of the order-picking method.

In a particular variant embodiment, the order lines are sorted in subsequent (deeper) sorting levels according to an additional, different sorting criterion than according to the number of pieces, for example according to their error rate, according to the weight of (an) article(s) or according to the size or the volume of (an) article(s). If multiple order lines have the same number of pieces, these order lines may be sorted according to the weight of (an) article(s), for example, multiple articles with the same number of pieces and the same weight according to the volume of (an) article(s) and multiple articles with the same number of pieces, the same weight and the same volume according to their error rate. This means that the sorting takes place according to the pattern number of pieces→weight→volume→error rate. Evidently, also a different segmentation of the sorting levels is possible, for example number of pieces→error rate→weight→volume.

The proposed measures ensure that heavy, large and/or voluminous articles are placed in the target loading aid first and are therefore located further toward the bottom in the target loading aid, which is of advantage for the conveyance of the target loading aid.

Said sorting may generally refer to a (single) order or to a group of orders. If the sorting refers to a group of orders, the sorted provisioning can take place across boundaries of individual orders and/or without taking boundaries of individual orders into account. This means that the orders are not processed sequentially but in a quasi-parallel manner in accordance with the sorting of the order lines at a first automatic or manual order-picking station.

It is also advantageous if
the removing of multiple articles of the first order part from at least one first source loading aid and the discharging of these articles into or onto at least one first target loading aid (i.e. the reloading of multiple articles of the first order part from at least one first source loading aid into or onto at least one first target loading aid) takes place in a manner sorted according to the number of pieces specified in the order lines for the articles of the first order part, wherein the removing and discharging (and/or the reloading) takes place from low toward ascending numbers of pieces, and
the removing of multiple articles of the second order part from at least one second source loading aid and the discharging of these articles into or onto at least one first or second target loading aid (i.e. the reloading of multiple articles of the second order part from at least one second source loading aid into or onto at least one first or second target loading aid) takes place in a manner sorted according to the number of pieces specified in the order lines for the articles of the second order part, wherein the removing and discharging (and/or the reloading) takes place from high toward descending numbers of pieces.

In this variant, reference is made not to the provisioning of a source loading aid but to the discharging of the articles as such contained in a source loading aid. This variant embodiment is in particular of relevance whenever a source loading aid contains articles of different types of article.

Furthermore, it is of advantage if the allocation of multiple articles of the third group of types of article to the first order part or to the second order part takes place in a manner sorted according to the number of pieces specified in the order lines for these articles, wherein the allocation of articles of the third group of types of article to the first order part takes place from low toward ascending numbers of pieces and the allocation of articles of the third group of types of article to the second order part takes place from high toward descending numbers of pieces. In this variant, the circumstance that human order-pickers, during the order-picking operation, often manipulate multiple articles at the same time whereas robots can often manipulate only one or only a few articles at the same time is taken advantage of once again. To that end, order lines of the third group of types of article with a comparatively low number of pieces per order line are preferably assigned to the first order part whereas order lines of the third group of types of article with a comparatively high number of pieces per order line are preferably assigned to the second order part. The proposed measures ensure, once again, that an advantageous operation of the first automatic and manual order-picking stations is achieved if there is a rerouting of the flows of articles from a first automatic to a first manual order-picking station, or vice versa. This means that, if it turns out that the order-picking of the second order part takes place more swiftly than the order-picking of the first order part, order lines with a higher number of pieces per type of article, which are of advantage for the manual order-picking, are assigned to the second order part. If it turns out, in contrast, that the order-picking of the first order part takes place more swiftly than the order-picking of the second order part, order lines with a comparatively low number of pieces per type of article, which are of advantage for the automatic order-picking, are assigned to the first order part. This constitutes a departure from that principle according to which a robot is to order-pick numbers of pieces as large as possible. Overall, however, the time required for the processing of a picking order can be kept short, with only a low error rate, in this way.

Further, it is of advantage if
an error rate is assigned to a type of article,
the provisioning of multiple articles of the first order part at the first automatic order-picking station (and the retrieving and the transporting of said articles) takes place in a manner sorted according to the error rate specified in the order lines for the articles of the first order part or sorted according to a parameter which is derived from said error rate and the number of pieces specified in the order lines for the articles of the first order part, wherein the provisioning (and the retrieving and the transporting) of the articles of the first order part, in case of a sorting according to the error rate, takes place from low toward ascending error rates or, in case of a sorting according to said parameter, takes place from low toward ascending parameters, and
the provisioning of multiple articles of the second order part at the first manual order-picking station (and the retrieving and the transporting of said articles) takes place in a manner sorted according to the error rate specified in the order lines for the articles of the second order part or sorted according to a parameter which is derived from said error rate and the number of pieces specified in the order lines for the articles of the second order part, wherein the provisioning (and the retrieving and the transporting) of the articles of the second order part, in case of a sorting according to the error rate, takes place from high toward descending error rates or, in case of a sorting according to the parameter, takes place from high toward descending parameters.

In this variant, the order-picking of the articles of the first order part at the first automatic order-picking station is started with a low error rate, or a low parameter derived from the error rate and the number of pieces. At the first manual order-picking station, the order-picking of the articles of the second order part, in contrast, is started with a high error rate, or a high parameter derived from the error rate and the number of pieces. The proposed measures now ensure that an advantageous operation of the first manual order-picking stations is achieved, among other things, whenever there is a rerouting of the flows of articles from a first automatic order-picking station to a first manual order-picking station. This means that, if it turns out that the order-picking of the second order part takes place more swiftly than the order-picking of the first order part and articles of the first order part are routed to a first manual order-picking station, then there is a strong likelihood that order lines with a higher error rate, which are disadvantageous for the automatic order-picking, are to be processed at the first manual order-picking station, whereas order lines with a low error rate have advantageously already been processed at the first automatic order-picking station. Of course, it is also conceivable that articles of the second order part are routed to a first automatic order-picking station if the order-picking of the first order part takes place more swiftly than the order-picking of the second order part. In this case, order lines with a lower error rate, which are of advantage for the automatic order-picking, are to be processed at the first automatic order-picking station, whereas order lines with a higher error rate have advantageously already been processed at the first manual order-picking station. Overall, the time required for the processing of a picking order can be kept short, with only a low error rate, in this way.

A parameter which is derived from said error rate and the number of pieces stored in the order lines for the articles can generally be understood as a mathematical term which contains the error rate and the number of pieces and may be the product of the number of pieces and the error rate, for example, or the (weighted) sum of number of pieces and error rate, for example $$\text{error rate} \times \text{number of pieces}$$

or $$0.5 \times \text{error rate} + 1.0 \times \text{number of pieces}.$$

Other sorting parameters which may be taken into account in said weighted sum are the weight, the size and/or the volume of (an) article(s). In order to obtain non-dimensional indicators, standardized values, i.e. the volume of (an) article(s) referring to a standardized volume or the weight of (an) article(s) referring to a standardized weight, can be used. The sorting may be based on the weighted sum 1.0×error rate+0.4×number of pieces+0.2×standardized volume+0.2×standardized weight, for example.

In a particular variant embodiment, the order lines are sorted in subsequent (deeper) sorting levels according to an additional, different sorting criterion than according to the error rate or said derived parameter, for example according to the weight of (an) article(s) or according to the size or the volume of (an) article(s). If multiple order lines have the same error rate, these order lines may be sorted according to the weight of (an) article(s), for example, multiple articles with the same number of pieces and the same weight according to the volume of (an) article(s). This means that the sorting takes place according to the pattern error rate→weight→volume. Evidently, also a different segmentation of the sorting levels is possible, for example error rate→volume→weight.

The proposed measures ensure, once again, that heavy, large and/or voluminous articles are placed in the target loading aid first and are therefore located further toward the bottom in the target loading aid, which is of advantage for the conveyance of the target loading aid.

The sorting can generally refer to a (single) order or to a group of orders. If the sorting refers to a group of orders, the sorted provisioning can take place across boundaries of individual orders and/or without taking boundaries of individual orders into account. This means that the orders are not dealt with sequentially but in a quasi-parallel manner in accordance with the sorting of the order lines at a first automatic or manual order-picking station.

Furthermore, it is particularly advantageous if
an error rate is assigned to a type of article,
the removing of multiple articles of the first order part from at least one first source loading aid and the discharging of these articles into or onto at least one first target loading aid (i.e. the reloading of multiple articles of the first order part from at least one first source loading aid into or onto at least one first target loading aid) takes place in a manner sorted according to the error rate specified in the order lines for the articles of the first order part or sorted according to a parameter derived from said error rate and the number of pieces specified in the order lines for the articles of the first order part, wherein the removing and discharging (and/or the reloading), in case of a sorting according to the error rate, takes place from low toward ascending error rates or, in case of a sorting according to said parameter, takes place from low toward ascending parameters, and
the removing of multiple articles of the second order part from at least one second source loading aid and the discharging of these articles into or onto at least one first or second target loading aid (i.e. the reloading of multiple articles of the second order part from at least one second source loading aid into or onto at least one first or second target loading aid) takes place in a manner sorted according to the error rate specified in the order lines for the articles of the second order part or sorted according to a parameter derived from said error rate and the number of pieces specified in the order lines for the articles of the second order part, wherein the removing and discharging (and/or the reloading), in case of a sorting according to the error rate, takes place from high toward descending error rates or, in case of a sorting according to the parameter, takes place from high toward descending parameters.

In this variant, reference is equally made not to the provisioning of a source loading aid but to the discharging of the articles as such contained in a source loading aid. This variant embodiment is therefore in particular of relevance, once again, whenever a source loading aid contains articles of different types of article.

It is also particularly advantageous if
an error rate is assigned to a type of article, and
the allocation of multiple articles of the third group of types of article for the first order part or for the second order part takes place in a manner sorted according to the error rate specified in the order lines for these articles or sorted according to a parameter derived from said error rate and the number of pieces specified in the order lines for these articles, wherein the allocation of articles of the third group of types of article to the first order part, in case of a sorting according to the error rate, takes place from low toward ascending error rates or, in case of a sorting according to said parameter, takes place from low toward ascending parameters and the allocation of articles of the third group of types of article to the second order part, in case of a sorting according to the error rate, takes place from high toward descending error rates or, in case of a sorting according to said parameter, takes place from high toward descending parameters.

In this variant, reference is, once again, made not to the provisioning of a source loading aid but to the discharging of the articles as such contained in a source loading aid. This variant embodiment is therefore in particular of relevance, once again, whenever a source loading aid contains articles of different types of article.

It is further favorable if the articles of the first group of types of article are stored in the first source loading aids so that the first source loading aid contains articles of only one identical type, which means homogeneous. In this way, the automatic order-picking can take place with a particularly low error rate, as a robot, for example, can remove random articles from the first source loading aid and does not have to remove one article of a demanded type of article in a targeted manner.

It is furthermore particularly advantageous in the method presented if
the first group of types of article comprises a first subgroup of types of article which contains types of article which can be handled automatically with a gripper of a first kind and comprises a second subgroup of types of article which contains types of article which cannot, or only to a limited extent, be handled automatically with the gripper of the first kind but can be handled automatically with a gripper of a different, second kind, in the step c), additionally, the classification of the articles required for the processing of said order in the first subgroup of types of article and in the second subgroup of types of article is ascertained, and in the step d), additionally, a first order subpart of the first order part is determined whose at least one article belongs to the first subgroup of types of article and can accordingly be handled automatically with a gripper of the first kind and a second order subpart of the first order part is determined whose at least one article belongs to the second subgroup of types of article and can accordingly not, or only to a limited extent, be handled automatically with the gripper of the first kind but can be handled automatically with the gripper of the second kind.

Accordingly, it is also of advantage in the disclosed storage and order-picking system if the first group of types of article comprises a first subgroup of types of article which contains types of article which can be handled automatically with a gripper of a first kind and comprises a second subgroup of types of article which contains types of article which cannot, or only to a limited extent, be handled automatically with the gripper of the first kind but can be handled automatically with a gripper of a different, second kind, and the control system is additionally configured for ascertaining the classification of the articles required for the processing of said order in the first subgroup of types of article and in the second group of types of article, determining a first order subpart of the first order part whose at least one article belongs to the first subgroup of types of article and can accordingly be handled automatically with a gripper of the first kind, and determining a second order subpart of the first order part whose at least one article belongs to the second subgroup of types of article and can accordingly not, or only to a limited extent, be handled automatically with the gripper of the first kind but can be handled automatically with the gripper of the second kind.

In this variant embodiment, the first group of types of article and the first order part (i.e. the types of article or the articles which can be handled automatically) are subdivided into subgroups of types of article and order subparts. Here, types of article of a first subgroup of types of article and articles of a first order subpart can be handled automatically with a gripper of a first kind. Types of article of a second subgroup of types of article and articles of a second order subpart can equally be handled automatically, but with a gripper of a second kind. For example, the gripper of the first kind may be configured as a suction gripper and a gripper of the second kind as a mechanical gripper (e.g. as gripping pliers or as a robotic hand). It is further conceivable that a third subgroup of types of article is provided whose types of article can be handled automatically both with the gripper of the first kind and with the gripper of the second kind. The articles of the third subgroup of types of article in an order can then be assigned optionally to the first order subpart or to the second order subpart. Here, both order subparts, once again, belong to the first order part.

In the method presented, it is favorable in the above context if the first automatic order-picking station is equipped with the gripper of the first kind and the gripper of the second kind, instead of the step e), a first source loading aid with the at least one article of the first order subpart is retrieved from the storage zone of the storage and order-picking system, the first source loading aid is transported to the first automatic order-picking station, the first source loading aid is provisioned at the first automatic order-picking station and the at least one article of the first order subpart is removed automatically from the first source loading aid at the first automatic order-picking station with the gripper of the first kind, moreover, a third source loading aid with the at least one article of the second order subpart is retrieved from the storage zone of the storage and order-picking system, the third source loading aid is transported to the first automatic order-picking station, the third source loading aid is provisioned at the first automatic order-picking station and the at least one article of the second order subpart is removed automatically from the third source loading aid at the first automatic order-picking station with the gripper of the second kind, and the at least one article of the first order subpart and the at least one article of the second order subpart is discharged (and/or loaded) into or onto a target loading aid.

Accordingly, it is also of advantage in the disclosed storage and order-picking system if the first automatic order-picking station is equipped with the gripper of the first kind and the gripper of the second kind, and the conveying system is configured for retrieving a first source loading aid with the at least one article of the first order subpart from the storage zone of the storage and order-picking system, transporting the first source loading aid to the first automatic order-picking station and provisioning the first source loading aid at the first automatic order-picking station, at which the at least one article of the first order subpart is removable automatically from the first source loading aid with the gripper of the first kind, and retrieving a third source loading aid with the at least one article of the second order subpart from the storage zone of the storage and order-picking system, transporting the third source loading aid to the first automatic order-picking station and provisioning the third source loading aid at the first automatic order-picking station, at which the at least one article of the second order subpart is removable automatically from the third source loading aid with the gripper of the second kind, wherein the first automatic order-picking station is configured for discharging (and/or loading) automatically the at least one article of the first order subpart into or onto a target loading aid with the gripper of the first kind and for discharging (and/or loading) automatically the at least one article of the second order subpart into or onto a target loading aid with the gripper of the second kind.

In this variant, the first automatic order-picking station comprises (at least) two different grippers, which can be used as and when needed. For example, the first automatic order-picking station can have a suction gripper and a mechanical gripper (e.g. a pair of gripping pliers or a robotic hand). The gripper of the first kind is used for handling the articles of the first order subpart and/or for handling types of article of the first subgroup of types of article. The gripper of the second kind, in contrast, is used for handling the articles of the second order subpart and/or for handling types of article of the second subgroup of types of article.

Yet it is also favorable in the method presented if
the first automatic order-picking station comprises a first automatic order-picking substation and a second automatic order-picking substation, wherein the first automatic order-picking substation is equipped with a gripper of a first kind and the second automatic order-picking substation is equipped with a gripper of a different, second kind, instead of the step e), a first source loading aid with the at least one article of the first order subpart is retrieved from the storage zone of the storage and order-picking system, the first source loading aid is transported to the first automatic order-picking substation, the first source loading aid is provisioned at the first automatic order-picking substation and the at least one article of the first order subpart is removed automatically from the first source loading aid at the first automatic order-picking substation with the gripper of the first kind, moreover, a third source loading aid with the at least one article of the second order subpart is retrieved from the storage zone of the storage and order-picking system, the third source loading aid is transported to the second automatic order-picking substation, the third source loading aid is provisioned at the second automatic order-picking substation and the at least one article of the second order subpart is removed automatically from the third source loading aid at the second automatic order-picking substation with the gripper of the second kind, and the at least one article of the first order subpart and the at least one article of the second order subpart is discharged (and/or loaded) into or onto a target loading aid.

Accordingly, it is also of advantage in the disclosed storage and order-picking system if
the first automatic order-picking station comprises a first automatic order-picking substation and a second automatic order-picking substation, wherein the first automatic order-picking substation is equipped with a gripper of a first kind and the second automatic order-picking substation is equipped with a gripper of a different, second kind, and the conveying system is configured for retrieving a first source loading aid with the at least one article of the first order subpart from the storage zone of the storage and order-picking system, transporting the first source loading aid to the first automatic order-picking substation and provisioning the first source loading aid at the first automatic order-picking substation, at which the at least one article of the first order subpart is removable automatically from the first source loading aid with the gripper of the first kind, and retrieving a third source loading aid with the at least one article of the second order subpart from the storage zone of the storage and order-picking system, transporting the third source loading aid to the second automatic order-picking substation and provisioning the third source loading aid at the second automatic order-picking substation, at which the at least one article of the second order subpart is removable automatically from the third source loading aid with the gripper of the second kind, wherein the first automatic order-picking substation is configured for discharging (and/or loading) automatically the at least one article of the first order subpart into or onto a target loading aid with the gripper of the first kind and the second automatic order-picking substation is configured for discharging (and/or loading) automatically the at least one article of the second order subpart into or onto a target loading aid with the gripper of the second kind.

The first automatic order-picking station can therefore have automatic order-picking substations which are equipped with grippers of different kinds. For example, the first automatic order-picking substation can have a suction gripper and the second automatic order-picking substation can have a mechanical gripper (e.g. a pair of gripping pliers or a robotic hand). The gripper of the first kind, once again, is used for handling the articles of the first order subpart and/or for handling types of article of the first subgroup of types of article, the gripper of the second kind, once again, is used for handling the articles of the second order subpart and/or for handling types of article of the second subgroup of types of article.

If there are subgroups of types of article, it is advantageous if one of the methods specified for the groups of types of article is executed recursively, wherein
the first automatic order-picking substation takes the place of the first automatic order-picking station,
the second automatic order-picking substation takes the place of the first manual order-picking station,
an automatic handling of the articles with the gripper of the first kind (at the first automatic order-picking substation) takes the place of an automatic handling of the articles at the first automatic order-picking station,
an automatic handling of the articles with the gripper of the second kind (at the second automatic order-picking substation) takes the place of a manual handling of the articles at the first manual order-picking station,
the first order subpart takes the place of the first order part,
the second order subpart takes the place of the second order part,
the first subgroup of types of article takes the place of the first group of types of article,
the second subgroup of types of article takes the place of the second group of types of article,
the third subgroup of types of article takes the place of the third group of types of article,
a first subgroup threshold value takes the place of the first threshold value,
a second subgroup threshold value takes the place of the second threshold value,
a third subgroup threshold value takes the place of the third threshold value,
an error rate for the handling of articles with the gripper of the first kind takes the place of the error rate for the handling of articles at the first automatic order-picking station, and
the third source loading aid takes the place of the second source loading aid.

The different handling of the first and second order parts, the different supply and different operation of the first automatic order-picking station and the first manual order-picking station, the different computation and use of the first to third threshold values and the different determination and use of the first to third groups of types of article, in this variant, is therefore recursively applied to the different handling of the first and second order subparts, the different supply and different operation of the first automatic order-picking substation and the second automatic order-picking substation, the different computation and use of the first to third subgroup threshold values and the different determination and use of the first to third subgroups of types of article. In other words, the respective variant methods are executed once for the first and the second order part, the first automatic order-picking station and the first manual order-picking station, for the first to third threshold values and for the first to third groups of types of article and once for the first and the second order subpart, the first automatic order-picking substation and the second automatic order-picking substation, for the first to third subgroup threshold values and for the first to third subgroups of types of article. This ensures that the processes running in the storage and order-picking system can be used in a particularly economic manner.

It is thus possible that the at least one article of the first order subpart, in the step g), is loaded automatically into or onto a first target loading aid with the gripper of the first kind and the at least one article of the second order subpart is additionally loaded automatically into the first target loading aid with the gripper of the second kind.

In particular, it is possible, in this case, that the at least one article of the first order subpart, in the step g), is loaded automatically into or onto a first target loading aid at the first automatic order-picking substation with the gripper of the first kind, the first target loading aid loaded with the at least one article of the first order subpart is transported to the second automatic order-picking substation and the at least one article of the second order subpart is additionally loaded automatically into the first target loading aid at the second automatic order-picking substation with the gripper of the second kind.

It is further possible that the at least one article of the second order subpart, in the step g), is loaded automatically into or onto a first target loading aid with the gripper of the second kind and the at least one article of the first order subpart is additionally loaded automatically into the first target loading aid with the gripper of the first kind.

In particular, it is possible, in this case, that the at least one article of the second order subpart, in the step g), is loaded automatically into or onto a first target loading aid at the second automatic order-picking substation with the gripper of the second kind, the first target loading aid loaded with the at least one article of the second order subpart is transported to the first automatic order-picking substation and the at least one article of the first order subpart is additionally loaded automatically into the first target loading aid at the first automatic order-picking substation with the gripper of the first kind.

Further, it is possible that the at least one article of the first order subpart, in the step g), is loaded automatically into or onto a first target loading aid with the gripper of the first kind (in particular at the first automatic order-picking substation), the at least one article of the second order subpart is loaded automatically into or onto a second target loading aid with the gripper of the second kind (in particular at the second automatic order-picking substation), the first target loading aid loaded with the at least one article of the first order subpart and the second target loading aid loaded with the at least one article of the second order subpart are transported either to a second automatic order-picking station or to a second manual order-picking station and i) the at least one article of the second order subpart is loaded automatically/manually into the first target loading aid at the second automatic/manual order-picking station, or ii) the at least one article of the first order subpart is loaded automatically/manually into the second target loading aids at the second automatic/manual order-picking station.

In particular, it is possible here that,
in the case i), all articles of the second order subpart loaded in or on the second target loading aid are discharged automatically and all at once (i.e. in one step) into or onto the first target loading aid at the second automatic order-picking station, or in the case ii), all articles of the first order subpart loaded in or on the first target loading aid are discharged automatically and all at once (i.e. in one step) into or onto the second target loading aid at the second automatic order-picking station.

Further, it is possible that the at least one article of the first order subpart, in the step g), is loaded automatically into or onto a first target loading aid with the gripper of the first kind (in particular at the first automatic order-picking substation), the at least one article of the second order subpart is loaded automatically into or onto a second target loading aid with the gripper of the second kind (in particular at the second automatic order-picking substation), the first target loading aid loaded with the at least one article of the first order subpart and the second target loading aid loaded with the at least one article of the second order subpart are transported either to a second automatic order-picking station or to a second manual order-picking station and the at least one article of the first order subpart as well as the at least one article of the second order subpart are loaded automatically/manually into or onto a third target loading aid at the second automatic/manual order-picking station.

In particular, it is possible here that
all articles of the second order subpart loaded in or on the second target loading aid are discharged automatically and all at once (i.e. in one step) into or onto the third target loading aid at the second automatic order-picking station, and/or all articles of the first order subpart loaded in or on the first target loading aid are discharged automatically and all at once (i.e. in one step) into or onto the third target loading aid at the second automatic order-picking station.

Further, it is possible that types of article in which an error rate during automatic handling with the gripper of the first kind is smaller than or equal to a first subgroup threshold value are allocated to the first subgroup of types of article and types of article in which an error rate during automatic handling with the gripper of the first kind is larger than the first subgroup threshold value are allocated to the second subgroup of types of article, wherein the quotient of the erroneous handling operations occurring during the order-picking with the gripper of the first kind divided by the total number of the handling operations with the gripper of the first kind is provided as error rate.

Further, it is possible that an error rate for an automatic handling with the gripper of the first kind is assigned to a type of article.

Further, it is possible that an allocation of the types of article to the first subgroup of types of article and to the second subgroup of types of article I) takes place before or during the executing of the step a), and/or II) takes place during the executing of one of the steps e) or f) or g), and/or III) takes place independent of the steps b) to g).

In particular, it is possible here that a type of article of at least one article of the first order subpart, which is first allocated to the first subgroup of types of article, in the case II), is reallocated to the second subgroup of types of article if the error rate during the automatic handling of this at least one article with the gripper of the first kind (i.e. during the automatic removal of (an) article(s) of the first order subpart from a first source loading aid, the automatic discharging of (an) article(s) of the first order subpart into or onto a first target loading aid or during the automatic reloading of (an) article(s) of the first order subpart from a first source loading aid into or onto a first target loading aid) exceeds the first subgroup threshold value.

Further, it is possible that a third subgroup of types of article is provided and that types of article in which an error rate during automatic handling with the gripper of the first kind (i.e. during the automatic removal of (an) article(s) of the first order subpart from a first source loading aid, the automatic discharging of (an) article(s) of the first order subpart into or onto a first target loading aid or during the automatic reloading of (an) article(s) of the first order subpart from a first source loading aid into or onto a first target loading aid) is smaller than a first subgroup threshold value are allocated to the first subgroup of types of article, types of article in which an error rate during automatic handling with the gripper of the first kind (i.e. during the automatic removal of (an) article(s) of the first order subpart from a first source loading aid, the automatic discharging of (an) article(s) of the first order subpart into or onto a first target loading aid or during the automatic reloading of (an) article(s) of the first order subpart from a first source loading aid into or onto a first target loading aid) is larger than a second subgroup threshold value are allocated to the second subgroup of types of article and the remaining types of article, in which the error rate during automatic handling with the gripper of the first kind is larger than or equal to the first subgroup threshold value and smaller than or equal to the second subgroup threshold value, are allocated to a third subgroup of types of article, wherein articles of the third subgroup of types of article in an order can be assigned optionally to the first order subpart or the second order subpart.

Further, it is possible that an allocation of the types of article to the first subgroup of types of article and to the second subgroup of types of article and to the third subgroup of types of article I) takes place before or during the executing of the step a), and/or II) takes place during the executing of one of the steps e) or f) or g), and/or III) takes place independent of the steps b) to g).

In particular, it is possible that a type of article of at least one article of the first order subpart which is first allocated to the first subgroup of types of article, in the case II), is reallocated to the second subgroup of types of article if the error rate during the automatic handling of this at least one article with the gripper of the first kind (i.e. during the automatic removal of (an) article(s) of the first order subpart from a first source loading aid, the automatic discharging of (an) article(s) of the first order subpart into or onto a first target loading aid or during the automatic reloading of (an) article(s) of the first order subpart from a first source loading aid into or onto a first target loading aid) exceeds the second subgroup threshold value and is reallocated to the third subgroup of types of article if the error rate during the automatic handling of this at least one article with the gripper of the first kind (i.e. during the automatic removal of (an) article(s) of the first order subpart from a first source loading aid, the automatic discharging of (an) article(s) of the first order subpart into or onto a first target loading aid or during the automatic reloading of (an) article(s) of the first order subpart from a first source loading aid into or onto a first target loading aid) exceeds the first subgroup threshold value but not the second subgroup threshold value.

In particular, it is possible that the at least one article of the first order subpart which causes the reallocation of the type of article of this/these article(s) to the second subgroup of types of article remains with the first order subpart.

Yet it is also possible, in particular, that the at least one article of the first order subpart which causes the reallocation of the type of article of this/these article(s) to the second subgroup of types of article is allocated to the second order subpart and is order-picked accordingly.

Further, it is possible that (an) article(s) of the first order subpart is/are assigned to the second order subpart and manipulated with the gripper of the second kind (and the type of article of this/these article(s), in particular, remains with the first subgroup of types of article) if the number of erroneous handling operations of (exactly) this/these article(s) with the gripper of the first kind exceeds an erroneous-handling subgroup threshold value.

Further, it is possible that the quotient of the number of the failed automatic removals of articles from a first source loading aid with the gripper of the first kind divided by the total number of (failed and successful) automatic removals of articles from a first source loading aid with the gripper of the first kind, or the quotient of the number of the failed automatic discharging operations of articles into or onto a target loading aid with the gripper of the first kind divided by the total number of (failed and successful) automatic discharging operations of articles into or onto a target loading aid with the gripper of the first kind, or the quotient of the number of the failed automatic reloading operations of articles from a source loading aid into or onto a target loading aid with the gripper of the first kind divided by the total number of (failed and successful) automatic reloading operations of articles from a source loading aid into or onto a target loading aid with the gripper of the first kind, or a measure derived from the above quotients is provided as error rate.

Further, it is possible that procedures at the first automatic order-picking station or at the first automatic order-picking substation are monitored by a checking system and a handling (in particular executed in the course of the order-picking operation or also independent of same) with the gripper of the first kind is classified by the checking system as erroneous handling if the handling with the gripper of the first kind is executed in an unplanned manner or is aborted and fails.

Further, it is possible that the first subgroup threshold value is ascertained on the basis of a capacity of a group of first automatic order-picking stations or of first and second automatic order-picking substations which is available in a specifiable time period for the execution of multiple orders with the gripper of the first kind and with the gripper of the second kind.

In particular, it is possible that
multiple orders for order-picking articles are acquired and the articles required for these orders are determined (and advantageously sorted on the basis of their error rate during the handling with the gripper of the first kind), for the execution of these orders in a specifiable time period, a first required capacity of the grippers of the first kind for the order-picking of the articles of the first subgroup of types of article and a second required capacity of the grippers of the first kind for the order-picking of the articles of the second subgroup of types of article required in this time period is computed for various first subgroup threshold values, a first available capacity of the grippers of the first kind in this time period and a second available capacity of the grippers of the second kind in this time period is ascertained, and that first subgroup threshold value is selected for the execution of said orders for which the lowest deviation between the first required capacity and the first available capacity as well as between the second required capacity and the second available capacity is ascertained.

Further, it is possible that the first subgroup threshold value and the second subgroup threshold value are ascertained on the basis of a capacity of a group of first automatic order-picking stations or of first and second automatic order-picking substations which is available in a specifiable time period for the execution of multiple orders with the gripper of the first kind and with the gripper of the second kind.

It is possible in particular that
multiple orders for order-picking articles are acquired and the articles required for these orders are determined (and advantageously sorted on the basis of their error rate during handling with the gripper of the first kind), the third subgroup of types of article (advantageously sorted according to said error rate), at a third subgroup threshold value, is segmented into articles with the error rate smaller than or equal to the third subgroup threshold value expected to be order-picked automatically with the gripper of the first kind and articles with the error rate larger than the third subgroup threshold value expected to be order-picked automatically with a gripper of the second kind, for the execution of these orders in a specifiable time period, a first required capacity of the grippers of the first kind for the order-picking of the articles of the first subgroup of types of article, including the articles of the third subgroup of types of article expected to be order-picked automatically with the gripper of the first kind, and a second required capacity of the grippers of the second kind for the order-picking of the articles of the second subgroup of types of article, including the articles of the third subgroup of types of article expected to be order-picked automatically with the gripper of the second kind, in this time period is computed for various third subgroup threshold values (i.e. for various segmentations of the third subgroup of types of article), a first available capacity of the grippers of the first kind in this time period and a second available capacity of the grippers of the second kind in this time period is ascertained, that third subgroup threshold value (i.e. that segmentation of the third subgroup of types of article) for the execution of said orders is selected for which the smallest deviation between the first required capacity and the first available capacity as well as between the second required capacity and the second available capacity is ascertained, and the first subgroup threshold value is set in a selected first reserve distance below the third subgroup threshold value and the second subgroup threshold value is set in a selected second reserve distance above the third subgroup threshold value.

Further, it is possible that a first partial quantity of orders to be executed is ascertained on the basis of a capacity of a group of first automatic order-picking stations or of first and second automatic order-picking substations which is available in a specifiable time period for the execution of this partial quantity of orders to be executed with the gripper of the first kind and with the gripper of the second kind.

In particular, it is possible that the partial quantity of orders to be executed is ascertained with a specified first subgroup threshold value.

It is particularly advantageous if the first subgroup threshold value (and, if applicable, the second subgroup threshold value) is ascertained for a partial quantity of orders to be executed on the basis of a capacity of a group of first automatic order-picking stations or of first and second automatic order-picking substations, wherein said partial quantity of orders to be executed has previously been ascertained on the basis of the capacity of the group of the first automatic order-picking stations or of the first and second automatic order-picking substations.

Further, it is possible that
multiple orders for order-picking articles are acquired and the articles required for these orders are determined, for the execution of these orders, a first required capacity of the grippers of the first kind for the order-picking of the articles of the first subgroup of types of article (including, if applicable, the articles of the third subgroup of types of article with an error rate for the handling of the articles with the gripper of the first kind smaller than or equal to the third subgroup threshold value expected to be order-picked automatically with the gripper of the first kind) and a second required capacity of the grippers of the second kind for the order-picking of the articles of the second subgroup of types of article (including, if applicable, the articles of the third subgroup of types of article with an error rate for the handling of the articles with the gripper of the first kind larger than the third subgroup threshold value expected to be order-picked automatically with the gripper of the second kind) in this time period is computed for various partial quantities of said orders (in particular with a specified first or third subgroup threshold value), a first available capacity of the grippers of the first kind in a specifiable time period and a second available capacity of the grippers of the second kind in this time period is ascertained, and that partial quantity of said orders is executed in the selected time period for which the smallest deviation between the first required capacity and the first available capacity as well as between the second required capacity and the second available capacity is ascertained.

In particular, it is possible that the first subgroup threshold value (and, if applicable, the second subgroup threshold value) is ascertained for a partial quantity of orders to be executed on the basis of a capacity of a group of first automatic order-picking stations or of first and second automatic order-picking substations, wherein said partial quantity of orders to be executed has previously been ascertained on the basis of the capacity of the group of the first automatic order-picking stations or of the first and second automatic order-picking substations.

Further, it is possible that a partial quantity of said orders is determined by random selection of some of the multiple orders.

Further, it is possible that
an availability portion of the first available capacity is computed by division of the first available capacity by the sum of the first and the second available capacity,
a need portion for the first required capacity for each of the multiple orders is computed by division of the first required capacity by the sum of the first and the second required capacity, and
the portion of orders with a need portion above the availability portion deviates by a maximum of 10% from the portion of orders with a need portion below the availability portion.

Further, it is possible that said multiple orders are sorted on the basis of a sorting parameter and an even distribution with regard to the sorting parameter is aimed at when determining a partial quantity, wherein
a number of pieces of articles of the first subgroup of types of article in an order (including, if applicable, the articles of the third subgroup of types of article with an error rate for the handling of the articles with the gripper of the first kind smaller than or equal to the third subgroup threshold value expected to be order-picked automatically) is provided as sorting parameter, or
a relative portion of articles of the first subgroup of types of article in an order (including, if applicable, the articles of the third subgroup of types of with an error rate for the handling of the articles with the gripper of the first kind smaller than or equal to the third subgroup threshold value article expected to be order-picked automatically) is provided as sorting parameter, which is computed by division of the number of pieces of articles of the first subgroup of types of article of an order by the number of pieces of all articles of this order.

Further, it is possible that (orders are sorted according to a priority according to which the orders are to be executed and), for a partial quantity, orders with a higher priority are selected preferentially.

Further, it is possible that the first source loading aid with the at least one article of the first order subpart is allocated to the second order subpart and then said at least one article of the second order subpart is loaded automatically into or onto a first or second target loading aid with the gripper of the second kind if
the discharging of multiple articles of the second subgroup of types of article of the second order subpart into the first or second target loading aid takes place more swiftly than the discharging of the same number of articles of the first order subpart into the first target loading aid, or
all articles of the second subgroup of types of article of the second order subpart have already been loaded into first or second target loading aids.

In particular, it is possible that the first source loading aid with the at least one article of the first order subpart is allocated to the second order subpart and then said at least one article of the second order subpart is loaded automatically into or onto a first or second target loading aid with the gripper of the second kind if
the discharging of multiple articles of the second subgroup of types of article of the second order subpart into the first or second target loading aid with the gripper of the second kind takes place more swiftly than the discharging of the same number of articles of the first order subpart into the first target loading aid with the gripper of the first kind, or
all articles of the second subgroup of types of article of the second order subpart have already been loaded into first or second target loading aids with the gripper of the second kind.

Further, it is possible that at least one article of the third subgroup of types of article is allocated to the first order subpart and loaded automatically into first target loading aids with the gripper of the first kind if
the loading of the first target loading aids with multiple articles of the first subgroup of types of article of the first order subpart with the gripper of the first kind takes place more swiftly than the loading of the first or second target loading aids with the same number of articles of the second order subpart with the gripper of the second kind, or
all articles of the first subgroup of types of article of the first order subpart have already been loaded into first target loading aids with the gripper of the first kind.

In particular, it is possible that at least one article of the third subgroup of types of article is allocated to the first order subpart and loaded automatically into first target loading aids with the gripper of the first kind if
the loading of the first target loading aids with multiple articles of the first subgroup of types of article of the first order subpart with the gripper of the first kind takes place more swiftly than the loading of the first or second target loading aids with the same number of articles of the second order subpart with the gripper of the second kind, or
all articles of the first subgroup of types of article of the first order subpart have already been loaded into first target loading aids with the gripper of the first kind.

Further, it is possible that at least one article of the third subgroup of types of article is allocated to the second order subpart and then said at least one article of the second order subpart is loaded automatically into first or second target loading aids with the gripper of the second kind if
the loading of the first or second target loading aids with multiple articles of the second subgroup of types of article of the second order subpart with the gripper of the second kind takes place more swiftly than the loading of the first target loading aids with the same number of articles of the first order subpart with the gripper of the first kind, or
all articles of the second subgroup of types of article of the second order subpart have already been loaded into first or second target loading aids with the gripper of the second kind.

In particular, it is possible that at least one article of the third subgroup of types of article is allocated to the second order subpart and then said at least one article of the second order subpart is loaded automatically into first or second target loading aids with the gripper of the second kind if
the loading of the first or second target loading aids with multiple articles of the second subgroup of types of article of the second order subpart with the gripper of the second kind takes place more swiftly than the loading of the first target loading aids with the same number of articles of the first order subpart with the gripper of the first kind, or all articles of the second subgroup of types of article of the second order subpart have already been loaded into first or second target loading aids with the gripper of the second kind.

Further, it is possible that at least one article of the third subgroup of types of article is allocated to the second order subpart and then said at least one article of the second order subpart is loaded automatically into first or second target loading aids with the gripper of the second kind as long as articles of the third subgroup of types of article are available and if the loading of the first or second target loading aids with multiple articles of the second subgroup of types of article of the second order subpart with the gripper of the second kind takes place more swiftly than the loading of the first target loading aids with the same number of articles of the first order subpart with the gripper of the first kind or if all articles of the second subgroup of types of article of the second order subpart have already been loaded into first or second target loading aids with the gripper of the second kind and then at least one article of the first order subpart is allocated to the second order subpart and then said at least one article of the second order subpart is loaded automatically into first or second target loading aids with the gripper of the second kind if the loading of the first or second target loading aids with multiple articles of the second subgroup of types of article of the second order subpart with the gripper of the second kind takes place more swiftly than the loading of the first target loading aids with the same number of articles of the first order subpart with the gripper of the first kind or if all articles of the second subgroup of types of article of the second order subpart have already been loaded into first or second target loading aids with the gripper of the second kind.

Further, it is possible that at least one article of the third subgroup of types of article is allocated to the first order subpart and then said at least one article of the first order subpart is loaded automatically into first target loading aids with the gripper of the first kind as long as articles of the third subgroup of types of article are available and if the loading of the first target loading aids with multiple articles of the first subgroup of types of article of the first order subpart with the gripper of the first kind takes place more swiftly than the loading of the first or second target loading aids with the same number of articles of the second order subpart with the gripper of the second kind or if all articles of the first subgroup of types of article of the first order subpart have already been loaded into first target loading aids with the gripper of the first kind and then at least one article of the second order subpart is allocated to the first order subpart and then said at least one article of the first order subpart is loaded automatically into first target loading aids with the gripper of the first kind if the loading of the first target loading aids with multiple articles of the first subgroup of types of article of the first order subpart with the gripper of the first kind takes place more swiftly than the loading of the first or second target loading aids with the same number of articles of the second order subpart with the gripper of the second kind or if all articles of the first subgroup of types of article of the first order subpart have already been loaded into first target loading aids with the gripper of the first kind.

Further, it is possible that the first source loading aid with the at least one article of the first order subpart is allocated to the second order subpart and said at least one article of the second order subpart is loaded automatically into or onto a first or second target loading aid with the gripper of the second kind if a number of pieces is specified for the at least one article of the first order subpart in the respective order line which exceeds a number-of-pieces subgroup threshold value.

Further, it is possible that the provisioning of multiple articles of the first order subpart at the first automatic order-picking station or at the first automatic order-picking substation (and the retrieving and the transporting of said articles) takes place in a manner sorted according to the number of pieces specified in the order lines for the articles of the first order subpart, wherein the provisioning (and the retrieving and the transporting) of the articles of the first order subpart takes place from low toward ascending numbers of pieces, and the provisioning of multiple articles of the second order subpart at the first automatic order-picking station or at the second automatic order-picking substation (and the retrieving and the transporting of said articles) takes place in a manner sorted according to the number of pieces specified in the order lines for the articles of the second order subpart, wherein the provisioning (and the retrieving and the transporting) of the articles of the second order subpart takes place from high toward descending numbers of pieces.

Further, it is possible that the removing of multiple articles of the first order subpart from at least one first source loading aid and the discharging of these articles into or onto at least one first target loading aid (i.e. the reloading of multiple articles of the first order subpart from at least one first source loading aid into or onto at least one first target loading aid) takes place in a manner sorted according to the number of pieces specified in the order lines for the articles of the first order subpart, wherein the removing and discharging (and/or the reloading) takes place from low toward ascending numbers of pieces, and the removing of multiple articles of the second order subpart from at least one third source loading aid and the discharging of these articles into or onto at least one first or second target loading aid (i.e. the reloading of multiple articles of the second order subpart from at least one third source loading aid into or onto at least one first or second target loading aid) takes place in a manner sorted according to the number of pieces specified in the order lines for the articles of the second order subpart, wherein the removing and discharging (and/or the reloading) takes place from high toward descending numbers of pieces.

Further, it is possible that the allocation of multiple articles of the third subgroup of types of article to the first order subpart or to the second order subpart takes place in a manner sorted according to the number of pieces specified in the order lines for these articles, wherein the allocation of articles of the third subgroup of types of article to the first order subpart takes place from low toward ascending numbers of pieces and the allocation of articles of the third subgroup of types of article to the second order subpart takes place from high toward descending numbers of pieces.

Further, it is possible that an error rate for the automatic handling of the articles with the gripper of the first kind is assigned to a type of article, the provisioning of multiple articles of the first order subpart at the first automatic order-picking station or at the first automatic order-picking substation (and the retrieving and the transporting of said articles) takes place in a manner sorted according to the error rate for the automatic handling of the articles with the gripper of the first kind specified in the order lines for the articles of the first order subpart or sorted according to a parameter which is derived from said error rate and the number of pieces specified in the order lines for the articles of the first order subpart, wherein the provisioning (and the retrieving and the transporting) of the articles of the first order subpart, in case of a sorting according to said error rate, takes place from low toward ascending error rates or, in case of a sorting according to said parameter, takes place from low toward ascending parameters, and the provisioning of multiple articles of the second order subpart at the first automatic order-picking station or at the second automatic order-picking substation (and the retrieving and the transporting of said articles) takes place in a manner sorted according to the error rate for the automatic handling of the articles with the gripper of the first kind specified in the order lines for the articles of the second order subpart or sorted according to a parameter which is derived from said error rate and the number of pieces specified in the order lines for the articles of the second order subpart, wherein the provisioning (and the retrieving and the transporting) of the articles of the second order subpart, in case of a sorting according to said error rate, takes place from high toward descending error rates or, in case of a sorting according to the parameter, takes place from high toward descending parameters.

Further, it is possible that an error rate for the automatic handling of the articles with the gripper of the first kind is assigned to a type of article, the removing of multiple articles of the first order subpart from at least one first source loading aid and the discharging of these articles into or onto at least one first target loading aid (i.e. the reloading of multiple articles of the first order subpart from at least one first source loading aid into or onto at least one first target loading aid) takes place in a manner sorted according to the error rate for the automatic handling of the articles with the gripper of the first kind specified in the order lines for the articles of the first order subpart or sorted according to a parameter derived from said error rate and the number of pieces specified in the order lines for the articles of the first order subpart, wherein the removing and discharging (and/or the reloading), in case of a sorting according to said error rate, takes place from low toward ascending error rates or, in case of a sorting according to said parameter, takes place from low toward ascending parameters, and the removing of multiple articles of the second order subpart from at least one third source loading aid and the discharging of these articles into or onto at least one first or second target loading aid (i.e. the reloading of multiple articles of the second order subpart from at least one third source loading aid into or onto at least one first or second target loading aid) takes place in a manner sorted according to the error rate for the automatic handling of the articles with the gripper of the first kind specified in the order lines for the articles of the second order subpart or sorted according to a parameter derived from said error rate and the number of pieces specified in the order lines for the articles of the second order subpart, wherein the removing and discharging (and/or the reloading), in case of a sorting according to said error rate, takes place from high toward descending error rates or, in case of a sorting according to the parameter, takes place from high toward descending parameters.

Further, it is possible that an error rate for the automatic handling of the articles with the gripper of the first kind is assigned to a type of article, and the allocation of multiple articles of the third subgroup of types of article to the first order subpart or to the second order subpart takes place in a manner sorted according to the error rate for the automatic handling of the articles with the gripper of the first kind specified in the order lines for these articles or sorted according to a parameter derived from said error rate and the number of pieces specified in the order lines for these articles, wherein the allocation of articles of the third subgroup of types of article to the first order subpart, in case of a sorting according to said error rate, takes place from low toward ascending error rates or, in case of a sorting according to said parameter, takes place from low toward ascending parameters and the allocation of articles of the third subgroup of types of article to the second order subpart, in case of a sorting according to said error rate, takes place from high toward descending error rates or, in case of a sorting according to said parameter, takes place from high toward descending parameters.

Further, it is possible that the articles of the first subgroup of types of article are stored in the first source loading aids so as to be homogeneous and/or the articles of the second subgroup of types of article are stored in the third source loading aids so as to be homogeneous.

It should be noted in this context that the variants and advantages disclosed in relation to the storage and order-picking system presented equally relate to the method presented, and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF PREFERRED EMBODIMENTS

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
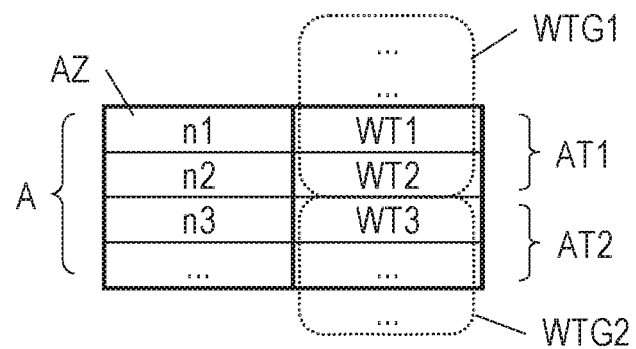
FIG. 1 the basic connection between groups of types of article and order parts.

FIG. 1 shows the basic connection between groups of types of article and order parts. Specifically, an order A, which contains multiple order lines AZ, is depicted in FIG. 1. In each order line AZ, the (ordered) article(s) is/are specified according to its/their number of pieces n1 ... n3 and its/their type of article WT1 .... WT3. Specifically, n1 pieces of articles of the type of article WT1, n2 pieces of articles of the type of article WT2, n3 pieces of articles of the type of article WT3 etc. are specified in the order lines AZ. The types of article WT1 and WT2 (and other types of article), once again, are assigned to a first group of types of article WT1, the type of article WT3 (and other types of article) to the second group of types of article WT2. The two groups of types of article WT1 and WT2 form a range of articles. It can also be gleaned from FIG. 1 that a first order part AT1 comprises those articles of the order A which are assigned to the first group of types of article WT1 and that a second order part AT2 comprises those articles of the order A which are assigned to the second group of types of article WT2.

Figure 2:
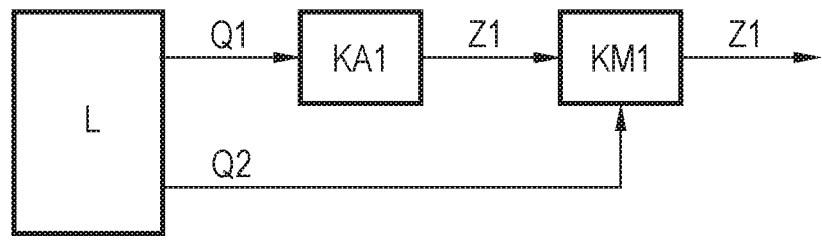
FIG. 2 schematically the procedure during the order-picking of articles in accordance with a first variant embodiment, in which a target loading aid is first loaded with articles of the first order part and then with articles of the second order part.

FIG. 2 schematically shows the procedure during the order-picking of articles in accordance with a first variant embodiment. Here, a first source loading aid Q1 with (an) article(s) of the first order part AT1 is retrieved from a storage zone L of a storage and order-picking system and the first source loading aid Q1 is transported to a first automatic order-picking station KA1 and provisioned there. Then, the article(s) of the first order part AT1 is/are removed automatically from the first source loading aid Q1 and discharged into or onto a first target loading aid Z1 at the first automatic order-picking station KA1. Then, the first target loading aid Z1 loaded with the article(s) of the first order part AT1 is transported to the first manual order-picking station KM1 and provisioned there. Then, the article(s) of the second order part AT2 is/are additionally loaded manually into the first target loading aid Z1 at the first manual order-picking station KM1. In this way, a particularly high packing density can be achieved in the first target loading aid Z1, as a human order-picker usually has more comprehensive skills in loading a loading aid than a robot. In particular, a human order-picker is able to repack articles in the first target loading aid Z1. The first target loading aid Z1 can finally be transported to a dispatch zone of the storage and order-picking system and be dispatched. Alternatively, the order-picked content of the first target loading aid Z1 can be reloaded into a (different) dispatch loading aid.

In summary, the following steps are executed during the order-picking of articles:

a) provisioning the articles in or on source loading aids Q1, Q2 in the storage zone L,
b) acquiring orders A for order-picking articles and determining the articles required for these orders A, wherein at least one order A of the orders A comprises multiple order lines AZ and wherein each order line AZ specifies at least one article according to its type of article WT1 . . . . WT3 and its number of pieces n1 . . . n3 to be order-picked,
c) ascertaining the classification of the articles required for the processing of said order in groups of types of article WTG1, WTG2, each of which comprises multiple types of article WT1 . . . . WT3, wherein a first group of types of article WTG1 contains types of article WT1 . . . . WT3 which can be handled automatically and a second group of types of article WTG2 contains types of article WT1 . . . . WT3 which cannot, or only to a limited extent, be handled automatically but can be handled manually,
d) determining a first order part AT1 whose at least one article belongs to the first group of types of article WTG1 and can accordingly be handled automatically and a second order part AT2 whose at least one article belongs to the second group of types of article WTG2 and can accordingly not, or only to a limited extent, be handled automatically but can be handled manually,
e) retrieving a first source loading aid Q1 with the at least one article of the first order part AT1 from the storage zone L of the storage and order-picking system, transporting the first source loading aid Q1 to a first automatic order-picking station KA1, provisioning the first source loading aid Q1 at the first automatic order-picking station KA1 and removing automatically the at least one article of the first order part AT1 from the first source loading aid Q1 at the first automatic order-picking station KA1,
f) retrieving a second source loading aid Q2 with the at least one article of the second order part AT2 from the storage zone L of the storage and order-picking system, transporting the second source loading aid Q2 to a first manual order-picking station KM1, provisioning the second source loading aid Q2 at the first manual order-picking station KM1 and removing manually the at least one article of the second order part AT2 from the second source loading aid Q2 at the first manual order-picking station KM1, and
g) discharging the at least one article of the first order part AT1 and the at least one article of the second order part AT2 into or onto a target loading aid Z1.

For the step a), a storage zone L of the storage and order-picking system is provided. For the execution of the steps b) to d), in particular, a control system of the storage and order-picking system is provided, and, for the steps e) and f), a conveying system of the storage and order-picking system is provided. The execution of the steps e) to g), in addition, involves the first automatic order-picking station KA1 and the first manual order-picking station KM1.

Figure 3:
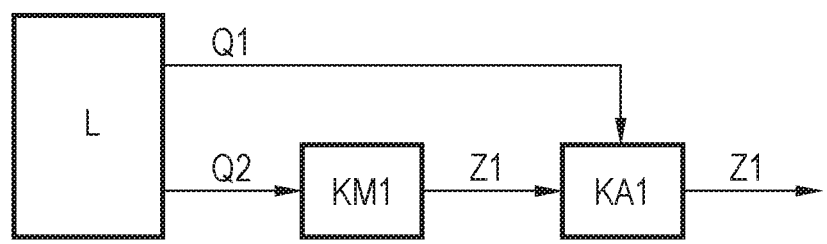
FIG. 3 schematically the procedure during the order-picking of articles in accordance with a second variant embodiment, in which a target loading aid is first loaded with articles of the second order part and then with articles of the first order part.

FIG. 3 schematically shows the procedure during the order-picking of articles in accordance with a second variant embodiment, which is very similar to the procedure depicted in FIG. 2.

Here, a second source loading aid Q2 with (an) article(s) of the second order part AT2 is first retrieved from the storage zone L of a storage and order-picking system and the second source loading aid Q2 is transported to a first manual order-picking station KM1 and provisioned there. Then, the article(s) of the second order part AT2 is/are removed manually from the second source loading aid Q2 and discharged into or onto a first target loading aid Z1 at the first manual order-picking station KM1. Then, the first target loading aid Z1 loaded with the article(s) of the second order part AT2 is transported to the first automatic order-picking station KA1 and provisioned there. Then, the article(s) of the first order part AT1 is/are additionally loaded automatically into the first target loading aid Z1 at the first automatic order-picking station KA1. In this way, a high degree of automation in the storage and order-picking system can be achieved, as the additional loading of the article(s) of the second order part AT2 into the first loading aid Z1 takes place automatically.

Figure 4:
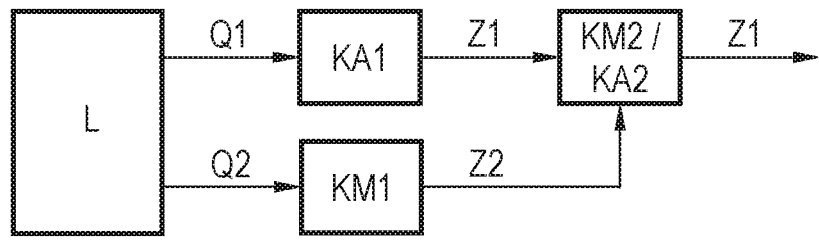
FIG. 4 schematically the procedure during the order-picking of articles in accordance with another variant embodiment, in which a first target loading aid is loaded with articles of the first order part and a second target loading aid is loaded with articles of the second order part and the articles are subsequently consolidated into the first target loading aid.

FIG. 4 schematically shows the procedure during the order-picking of articles in accordance with a third variant embodiment. Here, a first source loading aid Q1 with (an) article(s) of the first order part AT1 is retrieved from a storage zone L of a storage and order-picking system and transported to a first automatic order-picking station KA1 and provisioned there. Then, the article(s) of the first order part AT1 is/are removed automatically from the first source loading aid Q1 and discharged into or onto a first target loading aid Z1 at the first automatic order-picking station KA1. Further, a second source loading aid Q2 with (an) article(s) of the second order part AT2 is retrieved from the storage zone L of a storage and order-picking system and transported to a first automatic order-picking station KM1 and provisioned there. Then, the article(s) of the second order part AT2 is/are removed manually from the second source loading aid Q2 and discharged into or onto a second target loading aid Z2 at the first manual order-picking station KM1. Then, the first target loading aid Z1 loaded with the article(s) of the first order part AT1 and the second target loading aid Z2 loaded with the article(s) of the second order part AT2 are transported either to a second automatic order-picking station KA2 or to a second manual order-picking station KM2. Finally, the article(s) of the second order part AT2 is/are additionally loaded automatically/manually into the first target loading aid Z1 at the second automatic/manual order-picking station KM2/KA2. The first target loading aid Z1 can finally be transported to a dispatch zone of the storage and order-picking system and be dispatched. A reloading of the order-picked content of the first target loading aid Z1 into a (different) dispatch loading aid is possible once again.

Figure 5:
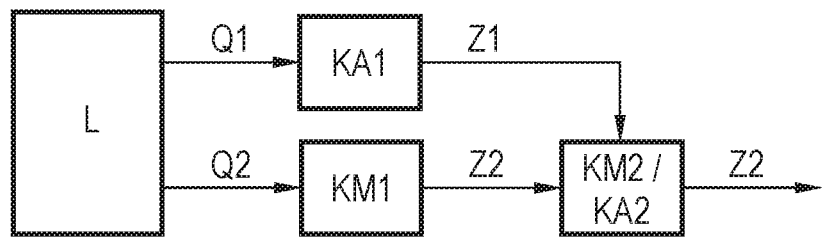
FIG. 5 like FIG. 4, only the articles are consolidated into a second target loading aid.

FIG. 5 schematically shows the procedure during the order-picking of articles in accordance with a fourth variant embodiment, which is very similar to the procedure depicted in FIG. 4. In contrast, the article(s) of the first order part AT1, however, is/are additionally loaded automatically/manually into the second target loading aid Z2 at the second automatic/manual order-picking station KM2/KA2.

Figure 6:
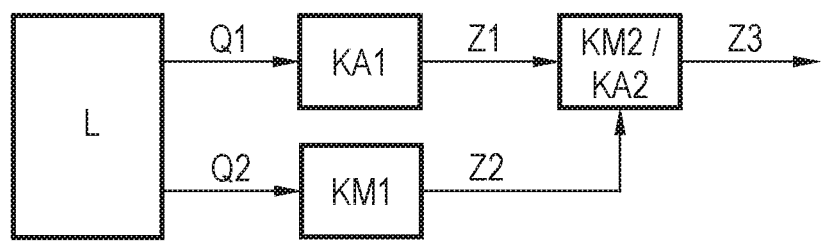
FIG. 6 like FIG. 4, only the articles are consolidated into a third target loading aid.

FIG. 6 schematically shows the procedure during the order-picking of articles in accordance with a fifth variant embodiment, which is very similar to the procedures depicted in FIG. 4 and FIG. 5. In contrast, the articles of the first order part AT1 and of the second order part AT2, however, are loaded automatically/manually into a third target loading aid Z3 at the second automatic/manual order-picking station KM2/KA2.

In all three variants, both the first order part AT1 and the second order part AT2 are first loaded into or onto a first target loading aid Z1 and/or into or onto a second target loading aid Z2. In another step, the at least one article of the second order part AT2 is then additionally loaded into the first target loading aid Z1 (FIG. 4), or, in another step, the at least one article of the first order part AT1 is additionally loaded into the second target loading aid Z2 (FIG. 5), or the articles of the first order part AT1 and of the second order part AT2 are loaded into a third target loading aid Z3 (FIG. 6). This joining of flows of articles is also known as "consolidating."

In an advantageous variant embodiment, the loading at the second automatic order-picking station KA2 takes place automatically and all at once (i.e. in one step).

Accordingly, in the variant embodiment depicted in FIG. 4, all articles of the second order part AT2 loaded in or on the second target loading aid Z2 are then discharged automatically and all at once (i.e. in one step) into or onto the first target loading aid Z1 at the second automatic order-picking station KA2. Specifically, at the second automatic order-picking station KA2, the articles of the second order part AT2 can be tilted from the second target loading aid Z2 into the first target loading aid Z1 with the help of (a) mechanical tilting device(s) or dropped from the second target loading aid Z2 into or onto the first target loading aid Z1 with the help of (a) mechanical dropping device(s) or scraped from the second target loading aid Z2 into or onto the first target loading aid Z1 with the help of (a) mechanical scraper device(s).

In the variant embodiment depicted in FIG. 5, all articles of the first order part AT1 loaded in or on the first target loading aid Z1 are then discharged automatically and all at once (i.e. in one step) into or onto the second target loading aid Z2 at the second automatic order-picking station KA2. Specifically, at the second automatic order-picking station KA2, the articles of the first order part AT1 can then be tilted from the first target loading aid Z1 into the second target loading aid Z2 with the help of (a) mechanical tilting device(s) or dropped from the first target loading aid Z1 into the second target loading aid Z2 with the help of (a) mechanical dropping device(s) or scraped from the first target loading aid Z1 into or onto the second target loading aid Z2 with the help of (a) mechanical scraper device(s).

In the variant embodiment depicted in FIG. 6, all articles of the first order part AT1 loaded in or on the first target loading aid Z1 and all articles of the second order part AT2 loaded in or on the second target loading aid Z2 are then discharged automatically and all at once (i.e. in one step) into or onto the third target loading aid Z3 at the second automatic order-picking station KA2. Specifically, at the second automatic order-picking station KA2, the articles of the first order part AT1/of the second order part AT2 can be tilted from the first target loading aid Z1/from the second target loading aid Z2 into the third target loading aid Z3 with the help of (a) mechanical tilting device(s) or dropped from the first target loading aid Z1/from the second target loading aid Z2 into the third target loading aid Z3 with the help of (a) mechanical dropping device(s) or scraped from the first target loading aid Z1/from the second target loading aid Z2 into or onto the third target loading aid Z3 with the help of (a) mechanical scraper device(s).

In this way, a particularly high degree of automation can be attained in the order-picking method, as the loading at the second automatic order-picking station KA2 takes place automatically and in one step, in contrast to a single-piece order-picking with a gripping robot, which, in this case, removes the articles piece by piece from a source loading aid Q1, Q2 and places them into or onto the target loading aid Z1, Z2, Z3. Thus, even those articles of the second order part AT2 which, strictly speaking, can only be order-picked manually are order-picked automatically at the second automatic order-picking station KA2. This variant embodiment is suited in particular for robust articles, for example articles packaged in foil bags, in particular in the form of so-called "polybags."

Even though a gripping robot, as a rule, order-picks articles piece by piece, it may also be provided that it seizes a source loading aid Q1, Q2 as a whole and tilts its content into a target loading aid Z1, Z2, Z3. It may likewise be provided that a robot scrapes multiple articles all at once from a source loading aid Q1, Q2 into a target loading aid Z1, Z2, Z3 with its arm. It is also conceivable that the robot seizes a source loading aid Q1, Q2 as a whole, moves it above the target loading aid Z1, Z2, Z3 and drops the content of the source loading aid Q1, Q2 into the target loading aid Z1, Z2, Z3 by actuation of a bottom opening. In this way, (a) mechanical tilting device(s), mechanical scraper device(s) or mechanical dropping device(s) may equally be realized.

Figure 7:
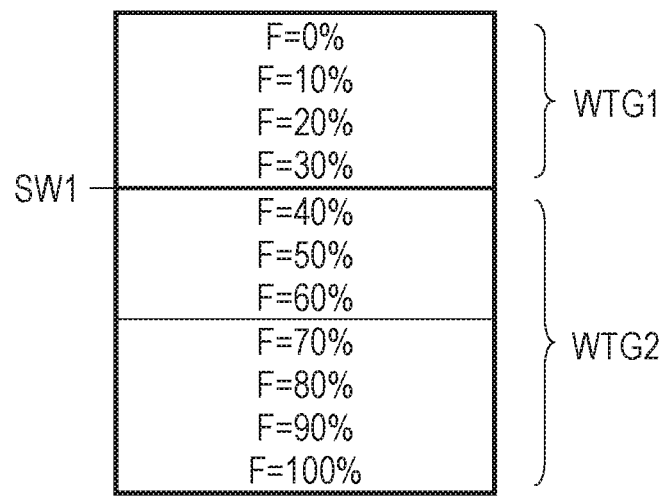
FIG. 7 schematically the segmentation of a range of articles into two groups of types of article on the basis of an error rate.

FIG. 7 now schematically shows the segmentation of a range of articles into groups of types of article WTG1, WTG2 on the basis of an error rate F. Here, types of article WT1 . . . . WT3 in which an error rate F during automatic handling (at the first automatic order-picking station KA1) is smaller than or equal to a first threshold value SW1 are allocated to the first group of types of article WTG1 and types of article WT1 . . . . WT3 in which an error rate F during automatic handling is larger than the first threshold value SW1 are allocated to the second group of types of article WTG2. The types of article WT1 . . . . WT3 are depicted in FIG. 7 in a manner sorted according to their error rate F, starting at 0% to 100%. In the example shown, the first threshold value SW1 is between an error rate F from 30% to 40%.

Figure 8:
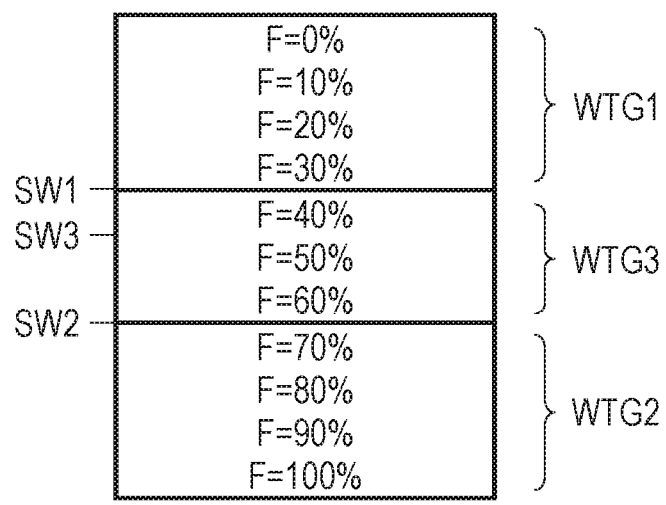
FIG. 8 schematically the segmentation of a range of articles into three groups of types of article on the basis of an error rate.

FIG. 8 shows a segmentation of a range of articles into three groups of types of article WTG1 . . . . WTG3 on the basis of an error rate F. Once again, types of article WT1 . . . . WT3 in which an error rate F during automatic handling (at the first automatic order-picking station KA1) is smaller than a first threshold value SW1 are allocated to the first group of types of article WTG1. Types of article WT1 . . . . WT3 in which an error rate F during automatic handling (at the first automatic order-picking station KA1) is larger than a second threshold value SW2 are allocated to the second group of types of article WTG2. The remaining types of article WT1 . . . . WT3, in which the error rate F is larger than or equal to the first threshold value SW1 and smaller than or equal to the second threshold value SW2, are allocated to a third group of types of article WTG3. The types of article WT1 . . . . WT3, once again, are depicted in FIG. 8 in a manner sorted according to their error rate F, starting at 0% to 100%. In the example shown, the first threshold value SW1 is, again, between an error rate F from 30% to 40%, the second threshold value SW2 between an error rate F from 60% to 70%. In FIG. 8, also a third threshold value SW3 is depicted, whose function will be explained later.

In the variant embodiment according to FIG. 8, it is taken into account that articles can be order-picked both automatically and manually with an acceptable error rate F. Articles of the third group of types of article WTG3 in an order A can be assigned, optionally or as and when needed, to the first order part AT1 or the second order part AT2, as this is symbolically depicted in FIG. 9. The capacity utilization of the first automatic order-picking stations KA1 and the first manual order-picking stations KM1 can thus be influenced in a targeted manner. This is of advantage in particular whenever an order A has a disproportionately large number of articles of the first group of types of article WTG1 but very few articles of the second group of types of article WTG2, or has a disproportionately small number of articles of the first group of types of article WTG1 but a very large number of articles of the second group of types of article WTG2. The proposed measures ensure that an uneven load of the first automatic order-picking stations KA1 and the first manual order-picking stations KM1, which would be expected due to the imbalance mentioned of the first group of types of article WTG1 and of the second group of types of article WTG2, can be balanced, entirely or at least in part, by a corresponding allocation of the articles of the third group of types of article WTG3.

The quotient of the erroneous handling operations occurring during the (automatic) order-picking divided by the total number of the handling operations is generally provided as error rate F. Specifically, the following measures may be provided as error rate F:

the quotient of the number of the failed automatic removals of articles from a source loading aid Q1, Q2 divided by the total number of (failed and successful) automatic removals of articles from a source loading aid Q1, Q2, or the quotient of the number of the failed automatic discharging operations of articles into or onto a target loading aid Z1, Z2, Z3 divided by the total number of (failed and successful) automatic discharging operations of articles into or onto a target loading aid Z1, Z2, Z3, or the quotient of the number of the failed automatic reloading operations of articles from a source loading aid Q1, Q2 into or onto a target loading aid Z1, Z2, Z3 divided by the total number of (failed and successful) automatic reloading operations of articles from a source loading aid Q1, Q2 into or onto a target loading aid Z1, Z2, Z3, or a measure derived from the above quotients.

Accordingly, articles of the first group of types of article WTG1 can most likely be handled automatically in an error-free manner, or only with a low error rate F, whereas articles of the second group of types of article WTG2 could most likely not be handled automatically in an error-free manner, or only with a very high error rate F, and are therefore order-picked manually.

An allocation of the types of article WT1 .... WT3 to the first group of types of article WTG1, to the second group of types of article WTG2 and, if applicable, to the third group of types of article WTG3 can advantageously take place at the following points in time:

I) before or during the executing of the step a), and/or

II) during the executing of one of the steps e) or f) or g), and/or

III) independent of the steps b) to g).

In accordance with the variant embodiment I), the allocation of a type of article WT1 .... WT3 to a group of types of article WTG1 .... WTG3 therefore takes place before or during the storing of (an) article(s) of this type of article WT1 .... WT3, and in any case before the ascertaining of the classification of the articles required for the processing of an order A in groups of types of article WTG1 .... WTG3 in the step c). In this case, the allocation of a type of article WT1 .... WT3 to a group of types of article WTG1 .... WTG3 thus takes place initially and before the actual order-picking operation, for example with the help of empirical trials, due to experience with similar types of article WT1 .... WT3 or also by the supplier of (an) article(s) providing information on the ability of this/these article(s) to be handled automatically.

In accordance with the variant embodiment II), the allocation of a type of article WT1 .... WT3 to a group of types of article WTG1 .... WTG3 takes place during the order-picking operation, i.e. "online." In this case, the allocation of a type of article WT1 .... WT3 to a group of types of article WTG1 .... WTG3 thus takes place adaptively, i.e. a type of article WT2 which was originally able to be handled manually can be classified as being able to be handled automatically, and vice versa.

Specifically, in the case II), the following measures may be provided as error rate F:

the quotient of the number of the failed automatic removals of articles from a source loading aid Q1, Q2 at the first automatic order-picking station KA1 divided by the total number of (failed and successful) automatic removals of articles from a source loading aid Q1, Q2 at the first automatic order-picking station KA1, or the quotient of the number of the failed automatic discharging operations of articles into or onto a target loading aid Z1, Z2, Z3 at the first automatic order-picking station KA1 divided by the total number of (failed and successful) automatic discharging operations of articles into or onto a target loading aid Z1, Z2, Z3 at the first automatic order-picking station KA1, or the quotient of the number of the failed automatic reloading operations of articles from a source loading aid Q1, Q2 into or onto a target loading aid Z1, Z2, Z3 at the first automatic order-picking station KA1 divided by the total number of (failed and successful) automatic reloading operations of articles from a source loading aid Q1, Q2 into or onto a target loading aid Z1, Z2, Z3 at the first automatic order-picking station KA1, or a measure derived from the above quotients.

In accordance with the variant embodiment III), the allocation of a type of article WT1 .... WT3 to a group of types of article WTG1 .... WTG3 takes place in parallel to the order-picking operation, i.e. "offline." Also in this case, the allocation of a type of article WT1 .... WT3 to a group of types of article WTG1 .... WTG3 thus takes place adaptively, i.e. a type of article WT2 which was originally able to be handled manually can be classified as being able to be handled automatically, and vice versa. For example, automatic order-picking stations KA1 which are only used for testing purposes can be installed to that end. Yet it is also conceivable that first automatic order-picking stations KA1 which are currently not needed for the order-picking are used, for example in times of low performance requirement (for instance during the night).

As mentioned, the allocation of a type of article WT1 .... WT3 to a group of types of article WTG1 .... WTG3 as such can be adapted to changing realities, for example because the properties of (an) article(s) have changed (for example due to the storage or because the supplier of the article(s) has changed the kind of a packaging) or because the properties of a gripper of a robot have changed (for example because the gripping surfaces are dirty or because the material of the gripping surfaces has aged).

In particular, a type of article WT1 .... WT3 of at least one article of the first order part AT1, which is first allocated to the first group of types of article WTG1, in the case II), can be reallocated to the second group of types of article WTG2 if the error rate F during the automatic handling of this at least one article exceeds the first threshold value SW1 at the first automatic order-picking station KA1.

Alternatively, it is also conceivable that a type of article WT1 .... WT3 of at least one article of the first order part AT1, which is first allocated to the first group of types of article WTG1, in the case II), is reallocated to the second group of types of article WTG2 if the error rate F during the automatic handling of this at least one article WQ1', WZ1, WZ1' exceeds the second threshold value SW2 at the first automatic order-picking station KA1 and is reallocated to the third group of types of article WTG3 if the error rate F during the automatic handling of this at least one article WQ1', WZ1, WZ1' exceeds the first threshold value SW1, but not the second threshold value SW2, at the first automatic order-picking station KA1.

Furthermore, in particular the following variants are conceivable for the reallocation of types of article WT1 . . . . WT3 to groups of types of article WTG1 . . . . WTG3.

For example, (an) article(s) of the first order part AT1 which causes the reallocation of the type of article WT1 . . . . WT3 of this/these article(s) to the second group of types of article WTG2 can remain with the first order part AT1. In this variant, the reallocation of a type of article WT1 . . . . WT3 of (an) article(s) of the first order part AT1 to the second group of types of article WTG2, therefore, has no effect on the current order-picking operation. The reallocation of the type of article of the article(s) of the first order part AT1 to the second group of types of article WTG2 leads to a change in the procedure of the order-picking method only once the step c) (ascertaining the classification of the articles required for the processing of an order A in groups of types of article WTG1 . . . . WTG3) is executed the next time after said reallocation. Advantageously, the current order-picking operation is not disrupted by said reallocation. In particular, such a procedure is favorable whenever a rerouting of the article(s) of the first order part AT1 which cause(s) said reallocation of the type of article WT1 . . . . WT3 to the second group of types of article WTG2 to a first manual order-picking station KM1 is not possible or has considerable disadvantages.

Yet it is also conceivable that the article(s) of the first order part AT1 which cause(s) the reallocation of the type of article WT1 . . . . WT3 of this/these article(s) to the second group of types of article WTG2 is/are allocated to the second order part AT2 and is/are order-picked accordingly. In this variant, the reallocation of a type of article WT1 . . . . WT3 of (an) article(s) of the first order part AT1 to the second group of types of article WTG2, therefore, has a direct effect on the current order-picking operation. The reallocation of the type of article WT1 . . . . WT3 of the article(s) of the first order part AT1 to the second group of types of article WTG2 immediately leads also to a reallocation of the respective article(s) to the second order part AT2. Advantageously, said reallocation takes immediate effect. In particular, such a procedure is favorable whenever those article(s) which cause(s) said reallocation of the type of article WT1 . . . . WT3 to the second group of types of article WTG2 would lead to a considerable disruption of the procedure of the current order-picking operation if it were to still remain with the first order part AT1.

Generally, it is also conceivable that (an) article(s) of the first order part AT1 is assigned to the second order part AT2 and conveyed to a first manual order-picking station KM1 (and the type of article WT1 . . . . WT3 of this/these article(s), in particular, remains with the first group of types of article WTG1) if the number of erroneous handling operations of (exactly) this/these article(s) exceeds an erroneous-handling threshold value at the first automatic order-picking station KA1. In this way, it is avoided that articles of the first order part AT1 which, in exceptional cases, cannot be handled automatically in an adequate time at the first automatic order-picking station KA1 block the respective first automatic order-picking station KA1. Instead, these articles of the first order part AT1 are conveyed to a first manual order-picking station KM1. An allocation of this/these article(s) to the second group of types of article WTG2 or third group of types of article WTG3 is basically not provided in this variant embodiment. However, it may happen that this/these article(s) also cause(s) the exceeding of the first threshold value SW1 (for example if a large number of other borderline handling operations has already taken place during an observation time period) and therefore a reassignment of the type of article WT1 . . . . WT3 of the respective article(s) occurs.

Generally, also the allocation of (an) article(s) to an order part AT1, AT2 can be flexible. This means that (an) article(s) which is originally part of the first order part AT1 can be reallocated to the second order part AT2, and vice versa.

For example, the first source loading aid Q1 with the article(s) of the first order part AT1 can be allocated to the second order part AT2, transported to a first manual order-picking station KM1 and provisioned there and then the article(s) of the second order part AT2 can be loaded manually into or onto a first or second target loading aid Z1, Z2 if the discharging of multiple articles of the second group of types of article WTG2 of the second order part AT2 into the first or second target loading aid Z1, Z2 at the first manual order-picking station KM1 takes place more swiftly than the discharging of the same number of articles of the first order part AT1 into the first target loading aid Z1 at the first automatic order-picking station KA1, or all articles of the second group of types of article WTG2 of the second order part AT2 have already been loaded into first or second target loading aids Z1, Z2 at the first manual order-picking station KM1.

In this way, the time required for the processing of a picking order A can be kept short, as articles of the first order part AT1 which can be order-picked not only automatically but, in general, also manually are order-picked via the first manual order-picking station KM1 if the order-picking of the second order part AT2 takes place more swiftly than the order-picking of the first order part AT1 or the second order part AT2 has finished being order-picked altogether.

Figure 9:
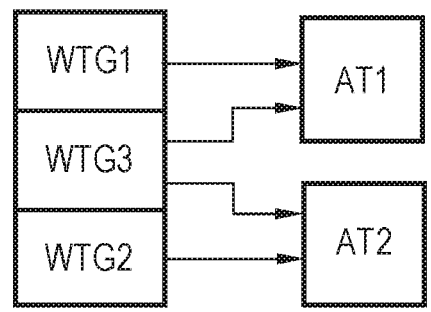
FIG. 9 schematically the allocation of articles of a particular group of types of article to a first or second order part.

As has been mentioned, articles of the third group of types of article WTG3 in an order A can be assigned, optionally or as and when needed, to the first order part AT1 or to the second order part AT2, as this is symbolically depicted in FIG. 9. Also this may serve the flexible allocation of (an) article(s) to an order part AT1, AT2.

Advantageously, (an) article(s) of the third group of types of article WTG3 is/are allocated to the first order part AT1, transported to a first automatic order-picking station KA1 and loaded automatically into first target loading aids Z1 there if the loading of the first target loading aids Z1 with multiple articles of the first group of types of article WTG1 of the first order part AT1 at the first automatic order-picking station KA1 takes place more swiftly than the loading of the first or second target loading aids Z1, Z2 with the same number of articles of the second order part AT2 at the first manual order-picking station KM1, or all articles of the first group of types of article WTG1 of the first order part AT1 have already been loaded into first target loading aids Z1 at the first automatic order-picking station KA1.

In this way, the time required for the processing of a picking order A is kept short, as articles of the third group of types of article WTG3 which have not yet been order-picked are counted among the first order part AT1 if the order-picking of the articles of the first group of types of article WTG1 takes place more swiftly than the order-picking of the articles of the second group of types of article WTG2 or all articles of the first group of types of article WTG1 have already been order-picked. This relieves the load on the first manual order-picking stations KM1, as articles of the third group of types of article WTG3 do not have to be order-picked, or have to be order-picked only in small part, at these first manual order-picking stations KM1.

Conversely, (an) article(s) of the third group of types of article WTG3 can be allocated to the second order part AT2, this/these article(s) can be transported to a first manual order-picking station KM1 and provisioned there and then said article(s) of the second order part AT2 can be loaded manually into first or second target loading aids Z1, Z2 if
- the loading of the first or second target loading aids Z1, Z2 with multiple articles of the second group of types of article WTG2 of the second order part AT2 at the first manual order-picking station KM1 takes place more swiftly than the loading of the first target loading aids Z1 with the same number of articles of the first order part AT1 at the first automatic order-picking station KA1, or
- all articles of the second group of types of article WTG2 of the second order part AT2 have already been loaded into first or second target loading aids Z1, Z2 at the first manual order-picking station KM1.

In this way, the time required for the processing of a picking order A is equally kept short, as articles of the third group of types of article WTG3 which have not yet been order-picked are counted among the second order part AT2 if the order-picking of the articles of the second group of types of article WTG2 takes place more swiftly than the order-picking of the articles of the first group of types of article WTG1 or all articles of the second group of types of article WTG2 have already been order-picked. This relieves the load on the first automatic order-picking stations KA1, as articles of the third group of types of article WTG3 do not have to be order-picked, or have to be order-picked only in small part, at these first automatic order-picking stations KA1.

The load on first automatic order-picking stations KA1 can be relieved particularly easily, provided that the processing of the picking order at the first manual order-picking station KM1 takes place particularly swiftly, if
at least one article of the third group of types of article WTG3 is allocated to the second order part AT2, this at least one article is transported to a first manual order-picking station KM1 and provisioned there and then said at least one article of the second order part AT2 is loaded manually into first or second target loading aids Z1, Z2 as long as articles of the third group of types of article WTG3 are available and if the loading of the first or second target loading aids Z1, Z2 with multiple articles of the second group of types of article WTG2 of the second order part AT2 at the first manual order-picking station KM1 takes place more swiftly than the loading of the first target loading aids Z1 with the same number of articles of the first order part AT1 at the first automatic order-picking station KA1 or if all articles of the second group of types of article WTG2 of the second order part AT2 have already been loaded into first or second target loading aids Z1, Z2 at the first manual order-picking station KM1 and then
at least one article of the first order part AT1 is allocated to the second order part AT2, transported to a first manual order-picking station KM1 and provisioned there and then said at least one article of the second order part AT2 is loaded manually into first or second target loading aids Z1, Z2 if the loading of the first or second target loading aids Z1, Z2 with multiple articles of the second group of types of article WTG2 of the second order part AT2 at the first manual order-picking station KM1 takes place more swiftly than the loading of the first target loading aids Z1 with the same number of articles of the first order part AT1 at the first automatic order-picking station KA1 or if all articles of the second group of types of article WTG2 of the second order part AT2 have already been loaded into first or second target loading aids Z1, Z2 at the first manual order-picking station KM1.

The load on first manual order-picking stations KM1 can be relieved particularly easily, provided that the processing of the picking order at the first automatic order-picking station KA1 takes place particularly swiftly, if
at least one article of the third group of types of article WTG3 is allocated to the first order part AT1, this at least one article is transported to a first automatic order-picking station KA1 and provisioned there and then said at least one article of the first order part AT1 is loaded automatically into first target loading aids Z1 as long as articles of the third group of types of article WTG3 are available and if the loading of the first target loading aids Z1 with multiple articles of the first group of types of article WTG1 of the first order part AT1 at the first automatic order-picking station KA1 takes place more swiftly than the loading of the first or second target loading aids Z1, Z2 with the same number of articles of the second order part AT2 at the first manual order-picking station KM1 or if all articles of the first group of types of article WTG1 of the first order part AT1 have already been loaded into first target loading aids Z1 at the first automatic order-picking station KA1 and then
at least one article of the second order part AT2 is allocated to the first order part AT1, transported to a first automatic order-picking station KA1 and provisioned there and then said at least one article of the first order part AT1 is loaded automatically into first target loading aids Z1 if the loading of the first target loading aids Z1 with multiple articles of the first group of types of article WTG1 of the first order part AT1 at the first automatic order-picking station KA1 takes place more swiftly than the loading of the first or second target loading aids Z1, Z2 with the same number of articles of the second order part AT2 at the first manual order-picking station KM1 or if all articles of the first group of types of article WTG1 of the first order part AT1 have already been loaded into first target loading aids Z1 at the first automatic order-picking station KA1.

During the allocation of articles of the second order part AT2 to the first order part AT1, it is to be ensured that said articles can, in general, be order-picked automatically. Specifically, this is the case if the error rate F of the type of article WT1 . . . . WT3 of the respective articles is below an allocation threshold value, in particular below the first threshold value SW1.

It is further advantageous if the first source loading aid Q1 with the at least one article of the first order part AT1 is allocated to the second order part AT2, transported to a first manual order-picking station KM1 and provisioned there and then said at least one article of the second order part AT2 is loaded manually into or onto a first or second target loading aid Z1, Z2 if a number of pieces n1 ... n3 is specified for the at least one article of the first order part AT1 in the respective order line AZ which exceeds a number-of-pieces threshold value.

In this way, it is avoided that articles of an order line AZ with a high number of pieces n1 ... n3 which can, in general, be order-picked automatically and therefore belong to the first order part AT1 but whose automatic order-picking is unfavorable due to the high number of pieces n1 ... n3 are transported to a first automatic order-picking station KA1 and provisioned there. These articles are assigned to the second order part AT2 and then order-picked manually at the first manual order-picking station KM1.

In this variant, the circumstance that human order-pickers, during the order-picking operation, often manipulate multiple articles at the same time, i.e. reload them from a source loading aid Q2 into or onto a target loading aid Z1, Z2 whereas robots can often manipulate and/or reload only one or only a few articles at the same time is taken advantage of. This constitutes a departure from that principle according to which a robot is to order-pick numbers of pieces n1 ... n3 which are as large as possible. Overall, this departure ensures that the time required for the processing of a picking order A can be kept short, with only a low error rate F.

Figure 10:
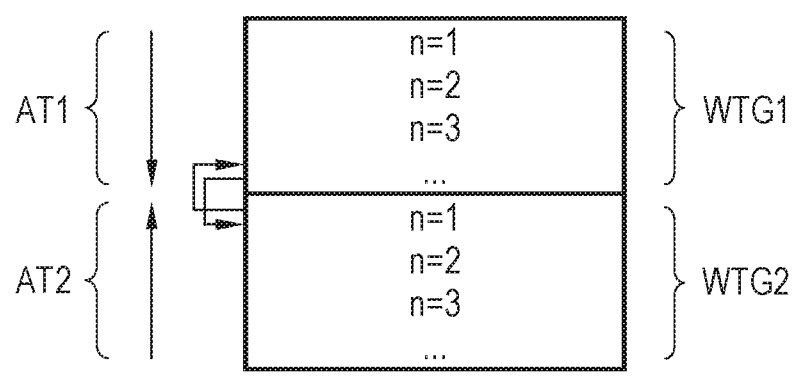
FIG. 10 the two order parts of an order sorted according to the numbers of pieces contained in each of the order lines as well as, symbolically, the optimized order-picking of the articles of the order with regard to the number of pieces contained in the order lines.

FIG. 10 now shows a particular variant embodiment which runs in an optimized manner with regard to the number of pieces n1 ... n3 contained in the order lines AZ. Specifically, the two order parts AT1, AT2 of an order A are depicted, in FIG. 10, in a manner sorted according to the numbers of pieces n contained in each of the order lines AZ. The provisioning of multiple articles of the first order part AT1 at the first automatic order-picking station KA1 (and the retrieving and the transporting of said articles), in this variant embodiment, takes place in a manner sorted according to the number of pieces n specified in the order lines AZ for the articles of the first order part AT1, namely from low toward ascending numbers of pieces n. This is depicted in FIG. 10 with the downward-pointing arrow. The provisioning of multiple articles of the second order part AT2 at the first manual order-picking station KM1 (and the retrieving and the transporting of said articles) takes place in a manner sorted according to the number of pieces n specified in the order lines AZ for the articles of the second order part AT2, namely from high toward descending numbers of pieces n. This is depicted in FIG. 10 with the upward-pointing arrow.

If the order-picking runs faster than expected at the first manual order-picking stations KM1, "leftover" articles of the first order part AT1 can be assigned to the second order part AT2 and then be order-picked manually. This means that there will be a rerouting of the flows of articles from a first automatic order-picking station KA1 to a first manual order-picking station KM1. This operation is visually depicted in the FIG. 10 with the arrow pointing from the first order part AT1 to the second order part AT2. Due to the particular procedure, the reassignment concerns order lines AZ with rather higher numbers of pieces n, which are favorable for the manual order-picking, whereas order lines AZ with a lower number of pieces n have advantageously already been processed at the first automatic order-picking station KA1.

Conversely, "leftover" articles of the second order part AT2 can be assigned to the first order part AT1 and then be automatically order-picked if the order-picking at the first manual order-picking stations KM1 runs more slowly than expected. This operation is visually depicted in FIG. 10 with the arrow pointing from the second order part AT2 to the first order part AT1. Due to the particular procedure, the reassignment then concerns order lines AZ with rather low numbers of pieces n, which are favorable for the automatic order-picking.

This constitutes a departure from that principle according to which a robot is to order-pick numbers of pieces n as large as possible. Overall, this departure ensures that the time required for the processing of a picking order A can be kept short.

During the allocation of articles of the second order part AT2 to the first order part AT1, it is to be ensured that said articles can, in general, be order-picked automatically. Specifically, this is the case if the error rate F of the type of article WT1 .... WT3 of the respective articles is below an allocation threshold value, in particular below the first threshold value SW1.

In a particular variant embodiment, the order lines AZ are sorted in subsequent (deeper) sorting levels according to an additional, different sorting criterion than according to the number of pieces n, according to the weight of (an) article(s) or according to the size or the volume of (an) article(s). If multiple order lines AZ have the same number of pieces n, these order lines can be sorted according to the weight of (an) article(s), for example, and multiple articles with the same number of pieces n and the same weight according to the volume of (an) article(s). This means that the sorting takes place according to the pattern number of pieces→weight→volume. The proposed measures ensure that heavy, large and/or voluminous articles can be placed in the target loading aid Z1, Z2 first and are therefore located further toward the bottom in the target loading aid Z1, Z2, which is of advantage for the conveyance of the target loading aid Z1, Z2. Evidently, also a different segmentation of the sorting levels is possible, for example number of pieces→weight→volume.

The sorting can generally refer to a (single) order A, or to a group of orders A. If the sorting refers to a group of orders A, the sorted provisioning of source containers Q1, Q2 can take place across boundaries of individual orders and/or without taking boundaries of individual orders into account. This means that the orders A are processed not sequentially but in a quasi-parallel manner in accordance with the sorting of the order lines AZ at a first automatic or manual order-picking station KA1, KM1.

In the context of a planning of the order-picking method, the optimized procedure of the order-picking method can in general take place without the determination of a number-of-pieces threshold value. Nevertheless, the determination of a number-of-pieces threshold value disclosed further above may also be of advantage in combination with this variant of the order-picking method. In this case, the segmentation of the articles in the context of a planning takes place on the basis of a number-of-pieces threshold value, during the execution of the plan, the provisioning of articles takes place in a manner sorted according to numbers of pieces n. This ensures that the order-picking method can keep running in an optimal manner even if a deviation from the plan occurs during the execution of the order-picking method.

In the above variant, reference has been made to the provisioning of a source loading aid Q1, Q2 at a first automatic or manual order-picking station KA1, KM1. Yet this is not the only possibility. Rather, it is also conceivable that reference is made to the discharging of the articles as such contained in a source loading aid Q1, Q2, in particular if a source loading aid Q1, Q2 contains articles of different types of article WT1 .... WT3.

In this variant,
the removing of multiple articles of the first order part AT1 from at least one first source loading aid Q1 and the discharging of these articles into or onto at least one first target loading aid Z1 takes place in a manner sorted according to the number of pieces n specified in the order lines AZ for the articles of the first order part AT1, namely from low toward ascending numbers of pieces n, and the removing of multiple articles of the second order part AT2 from at least one second source loading aid Q2 and the discharging of these articles into or onto at least one first or second target loading aid Z1, Z2 takes place in a manner sorted according to the number of pieces n specified in the order lines AZ for the articles of the second order part AT2, namely from high toward descending numbers of pieces n.

Figure 11:
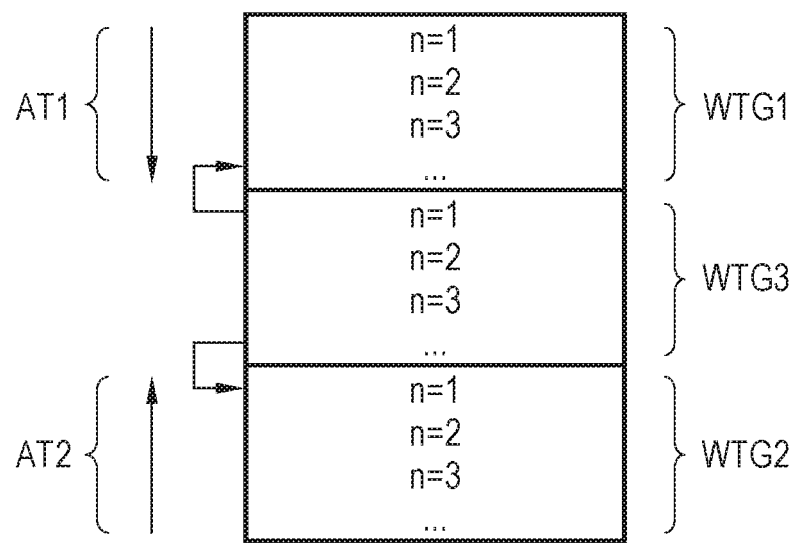
FIG. 11 similar to FIG. 10, but with a third group of types of article.

FIG. 11 shows a particular variant embodiment which is similar to the variant embodiment disclosed in the context of FIG. 10 and equally runs in an optimized manner with regard to the number of pieces n contained in the order lines AZ. In contrast to this, however, also the third group of types of article WTG3 is included in the method in this variant. Specifically, the allocation of multiple articles of the third group of types of article WTG3 to the first order part AT1 or to the second order part AT2 takes place in a manner sorted according to the number of pieces n specified in the order lines for these articles AZ, wherein the allocation of articles of the third group of types of article WTG3 to the first order part AT1 takes place from low toward ascending numbers of pieces n and the allocation of articles of the third group of types of article WTG3 to the second order part AT2 takes place from high toward descending numbers of pieces n. In this variant, the circumstance that human order-pickers, during the order-picking operation, often manipulate multiple articles at the same time whereas robots can often manipulate only one or only a few articles at the same time is taken advantage of once again. To that end, order lines AT of the third group of types of article WTG3 with a comparatively low number of pieces n per order line AZ, which are advantageous for the automatic order-picking (see the arrow pointing from the third group of types of article WTG3 to the first order part AT1), are preferably assigned to the first order part AT1 whereas order lines AZ of the third group of types of article WTG3 with a comparatively high number of pieces n per order line AZ, which are advantageous for the manual order-picking (see the arrow pointing from the third group of types of article WTG3 to the second order part AT2), are preferably assigned to the second order part AT2. The proposed measures ensure, once again, that an advantageous operation of the first automatic order-picking stations KA1 and first manual order-picking stations KM1 can be achieved, in particular if the order-picking of the second order part AT2 takes place more swiftly than the order-picking of the first order part AT1, or vice versa. Overall, the time required for the processing of a picking order A, once again, can be kept short in this way.

Figure 12:
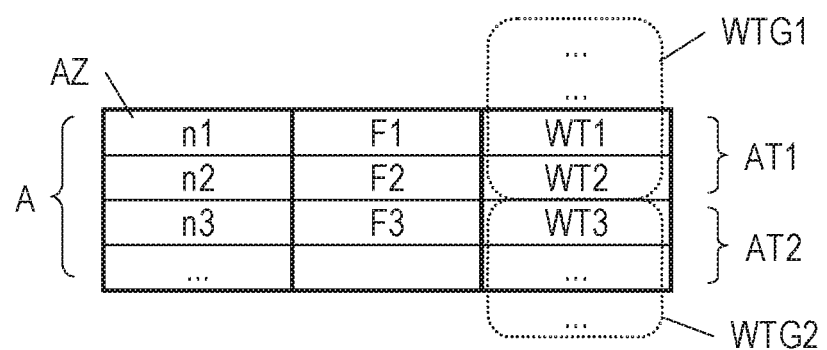
FIG. 12 the possibility to store an error rate for a handling of (an) article(s) in the respective order line.

FIG. 12 shows a data structure of the order lines AZ, which is very similar to the data structure depicted in FIG. 1. In contrast to this, however, also an error rate F is assigned to a type of article WT1 .... WT3. Specifically, an error rate F1 is stored for the type of article WT1, an error rate F2 is stored for the type of article WT2 and an error rate F3 is stored for the type of article WT3. The proposed measures ensure that the planning of the method for order-picking articles can take place in an even more differentiated manner. In particular, order lines AZ can advantageously be sorted on the basis of their error rate F, F1 .... F3.

Figure 13:
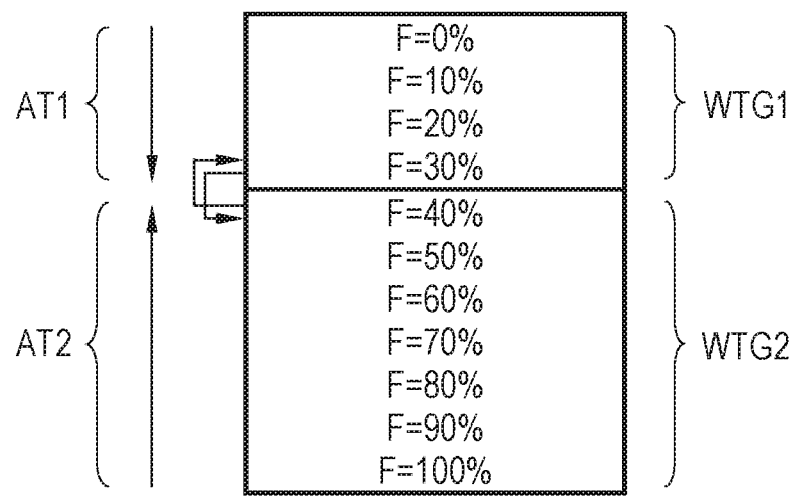
FIG. 13 the two order parts of an order sorted according to the error rates contained in each of the order lines as well as, symbolically, the optimized order-picking of the articles of the order with regard to the error rate contained in the order lines.

FIG. 13 shows a particular variant embodiment which is similar to the variant embodiment disclosed in the context of FIG. 10 but runs in an optimized manner with regard to the error rate F contained in the order lines AZ (in this context, see also FIG. 12). Specifically, the two order parts AT1, AT2 of an order A are depicted, in FIG. 13, in a manner sorted according to the error rates F contained in each of the order lines AZ (see also FIG. 7). The provisioning of multiple articles of the first order part AT1 at the first automatic order-picking station KA1 (and the retrieving and the transporting of said articles), in this variant embodiment, takes place in a manner sorted according to the error rate F specified in the order lines AZ for the articles of the first order part AT1, or sorted according to a parameter which is derived from said error rate F and the number of pieces n, n1 ... n3 specified in the order lines AZ for the articles of the first order part AT1 (cf. FIG. 10). In detail, the provisioning (and the retrieving and the transporting) of the articles of the first order part AT1, in case of a sorting according to the error rate F, takes place from low toward ascending error rates F or, in case of a sorting according to said parameter, takes place from low toward ascending parameters, such as it is symbolized in FIG. 13 by the downward-pointing arrow. Further, the provisioning of multiple articles of the second order part AT2 at the first manual order-picking station KM1 (and the retrieving and the transporting of said articles) takes place in a manner sorted according to the error rate F specified in the order lines AZ for the articles of the second order part AT2, or sorted according to a parameter which is derived from said error rate F and the number of pieces n, n1 ... n3 specified in the order lines AZ for the articles of the second order part AT2. Specifically, the provisioning (and the retrieving and the transporting) of the articles of the second order part AT2, in case of a sorting according to the error rate F, takes place from high toward descending error rates F or, in case of a sorting according to the parameter, takes place from high toward descending parameters, such as it is symbolized in FIG. 13 by the upward-pointing arrow.

The proposed measures ensure that an advantageous operation of the storage and order-picking system is achieved, again, whenever there is a rerouting of the flows of articles from a first automatic order-picking station KA1 to a first manual order-picking station KM1. This means that, if it turns out that the order-picking of the second order part AT2 takes place more swiftly than the order-picking of the first order part AT1, articles of the first order part AT1 are allocated to the second order part AT2 and routed to a first manual order-picking station KM1 (see the arrow pointing from the first order part AT1 to the second order part AT2 in FIG. 13), then there is a strong likelihood that order lines AZ with a higher error rate F, which are disadvantageous for the automatic order-picking, are to be processed at the first manual order-picking station KM1. Order lines AZ with a low error rate F, in contrast, have advantageously already been processed at the first automatic order-picking station KA1. Yet also the reverse case is conceivable, namely that articles of the second order part AT2 are allocated to the first order part AT1 and routed to a first automatic order-picking station KA1 (see the arrow pointing from the second order part AT2 to the first order part AT1 in FIG. 13). Overall, the time required for the processing of a picking order A can be kept short, with only a low error rate F in this way.

The parameter which is derived from said error rate F and the number of pieces n, n1 . . . n3 stored in the order lines AZ for the articles, can be the product of the number of pieces n, n1 . . . n3 and the error rate F, for example, or the (weighted) sum of number of pieces n, n1 . . . n3 and error rate F, for example:

error rate×number of pieces or 0.5×error rate+1.0×number of pieces

Other sorting parameters which may be taken into account in said weighted sum are the (standardized) weight, the (standardized) size and/or the (standardized) volume of (an) article(s). The sorting may be based on the weighted sum 1.0×error rate+0.4×number of pieces+0.2×standardized volume+0.2×standardized weight, for example.

Again, it is also conceivable that the order lines AZ are sorted in subsequent (deeper) sorting levels according to an additional, different sorting criterion than according to the error rate F or said derived parameter, for example according to the weight of (an) article(s) or according to the size or the volume of (an) article(s). If multiple order lines AZ have the same error rate F, these order lines may be sorted according to the weight of (an) article(s), for example, multiple articles with the same error rate F and the same weight according to the volume of (an) article(s). This means that the sorting takes place according to the pattern error rate→weight→volume. Evidently, also a different segmentation of the sorting levels is possible, for example error rate→volume→weight. The proposed measures ensure that heavy, large and/or voluminous articles, once again, are placed in the target loading aid Z1, Z2 first and are therefore located further toward the bottom in the target loading aid Z1, Z2, which is of advantage for the conveyance of the target loading aid Z1, Z2.

The sorting can generally refer to a (single) order A, or to a group of orders A. If the sorting refers to a group of orders A, the sorted provisioning can take place across boundaries of individual orders and/or without taking boundaries of individual orders into account. This means that the orders A are dealt with not sequentially but in a quasi-parallel manner in accordance with the sorting of the order lines AZ at a first automatic or manual order-picking station KA1, KM1.

In the above variant, reference has been made to the provisioning of a source loading aid Q1, Q2 at a first automatic or manual order-picking station KA1, KM1. Yet this is not the only possibility. Rather, it is also conceivable that reference is made to the discharging of the articles as such contained in a source loading aid Q1, Q2, in particular if a source loading aid Q1, Q2 contains articles of different types of article WT1 . . . . WT3. In this variant, the removing of multiple articles of the first order part AT1 from at least one first source loading aid Q1 and the discharging of these articles into or onto at least one first target loading aid Z1 takes place in a manner sorted according to the error rate F specified in the order lines AZ for the articles of the first order part AT1 or sorted according to a parameter which is derived from said error rate F and the number of pieces n, n1 . . . n3 specified in the order lines AZ for the articles of the first order part AT1. Specifically, the removing and discharging of the articles (and/or the reloading), in case of a sorting according to the error rate F, takes place from low toward ascending error rates For, in case of a sorting according to said parameter, takes place from low toward ascending parameters. Further, the removing of multiple articles of the second order part AT2 from at least one second source loading aid Q2 and the discharging of these articles into or onto at least one first or second target loading aid Z1, Z2 takes place in a manner sorted according to the error rate F specified in the order lines AZ for the articles of the second order part AT2 or sorted according to a parameter which is derived from said error rate F and the number of pieces n, n1 . . . n3 specified in the order lines AZ for the articles of the second order part AT2. Specifically, the removing and discharging of the articles (and/or the reloading), in case of a sorting according to the error rate F, takes place from high toward descending error rates F or, in case of a sorting according to the parameter, takes place from high toward descending parameters (in this context, see, once again, FIG. 13). This variant embodiment, once again, is in particular of relevance whenever a source loading aid Q1, Q2 contains articles of different types of article WIT . . . WT3.

Figure 14:
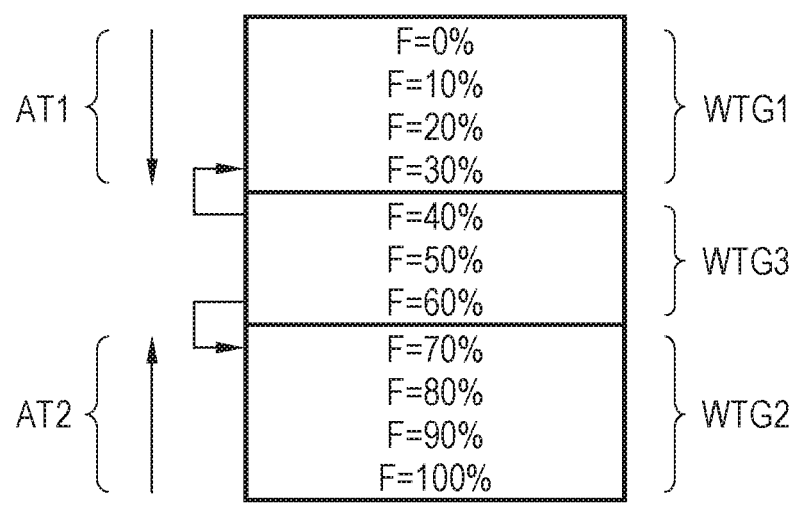
FIG. 14 similar to FIG. 13, but with a third group of types of article.

FIG. 14 shows a particular variant embodiment which is similar to the variant embodiment disclosed in the context of FIG. 13 and equally runs in an optimized manner with regard to the error rate F, or a parameter derived from same, contained in the order lines AZ. In contrast to this, however, also the third group of types of article WTG3 is included in the method in this variant. Here, the allocation of multiple articles of the third group of types of article WTG3 to the first order part AT1 or to the second order part AT2 takes place in a manner sorted according to the error rate F specified in the order lines for these articles AZ or sorted according to a parameter which is derived from said error rate F and the number of pieces n, n1 . . . n3 specified in the order lines for these articles AZ. In detail, the allocation of articles of the third group of types of article WTG3 to the first order part AT1 (see the arrow leading from the third group of types of article WTG3 to the first order part AT1 in FIG. 14), in case of a sorting according to the error rate F, takes place from low toward ascending error rates F or, in case of a sorting according to said parameter, takes place from low toward ascending parameters (see the downward-pointing arrow in FIG. 14). In contrast to this, the allocation of articles of the third group of types of article WTG3 to the second order part AT2 (see the arrow leading from the third group of types of article WTG3 to the second order part AT2 in FIG. 14), in case of a sorting according to the error rate F, takes place from high toward descending error rates F or, in case of a sorting according to said parameter, takes place from high toward descending parameters (see the upward-pointing arrow in FIG. 14).

Figure 15:
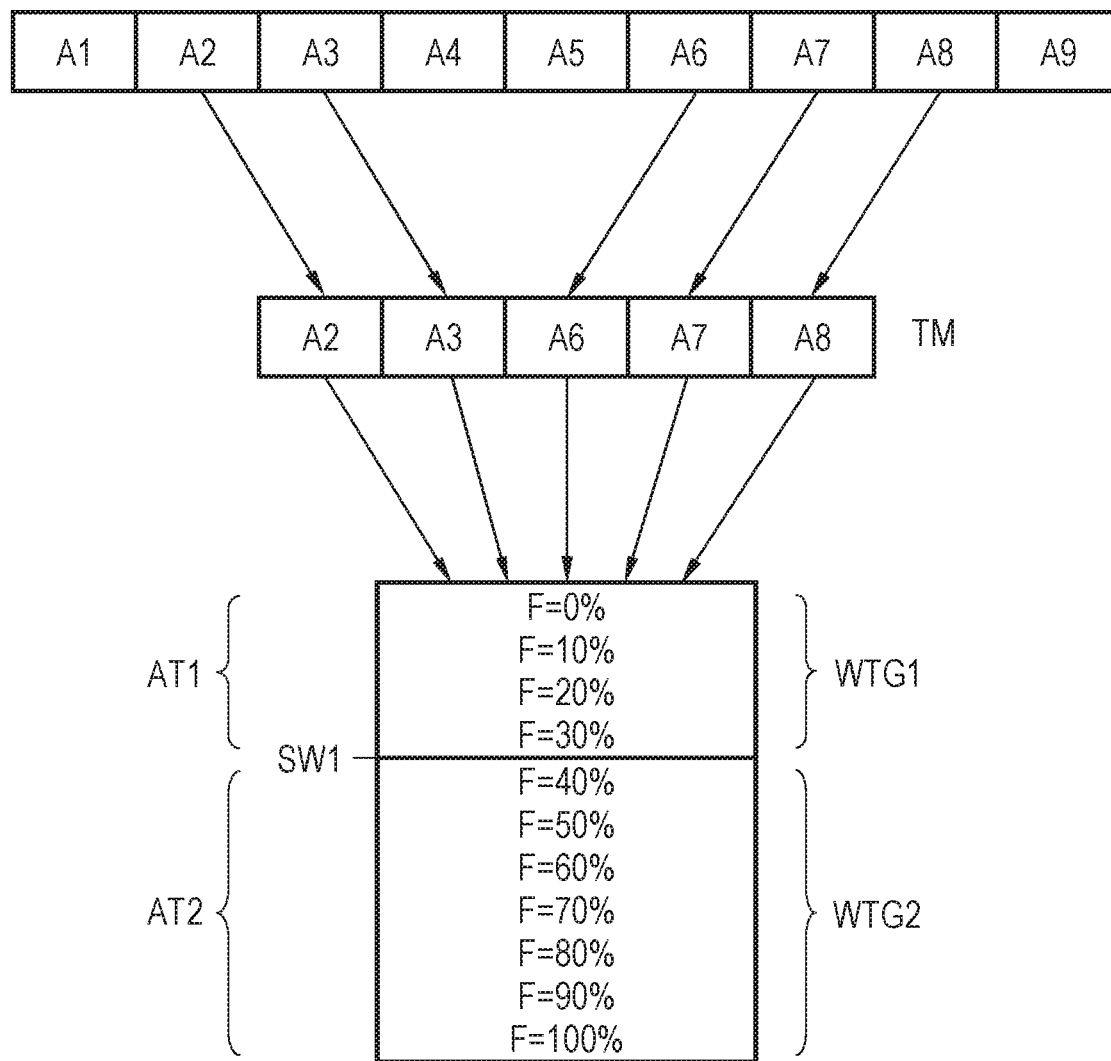
FIG. 15 the ascertainment of a partial quantity of orders which can be executed in the storage and order-picking system in a specifiable time period as well as the ascertainment of a first threshold value, which is adjusted to the efficiency of the automatic and manual order-picking stations.

FIG. 15 now shows a variant embodiment in which a partial quantity TM of orders to be executed A is ascertained on the basis of a capacity of a group of first automatic or manual order-picking stations KA1, KM1 which is available in a specifiable time period for the execution of this partial quantity TM of orders to be executed A. In this variant, therefore, a matching partial quantity TM of orders A is sought, which is selected from the entirety of the orders A pending and to be processed and is expected to, or can substantially, be processed by the group of first automatic or manual order-picking stations KA1, KM1 in a specifiable time period.

For example, for the determination of the partial quantity TM, in a first step, multiple orders A for order-picking articles are acquired and the articles required for these orders A are determined. In another step, a first required capacity of the first automatic order-picking stations KA1 of the group for the order-picking of the articles of the first group of types of article WTG1 (including, if applicable, the articles of the third group of types of article WTG3 with an error rate F smaller than or equal to the third threshold value SW3 expected to be order-picked automatically) for the execution of these orders A and a second required capacity of the first manual order-picking stations KM1 of the group for the order-picking of the articles of the second group of types of article WTG2 (including, if applicable, the articles of the third group of types of article WTG3 with an error rate F larger than the third threshold value SW3 expected to be order-picked manually) required in this time period are computed for various partial quantities TM of said orders A. In particular, this is done with a specified first threshold value SW1 or with a specified third threshold value SW3. Furthermore, a first available capacity of the first automatic order-picking stations KA1 of the group available in a specifiable time period and a second available capacity of the first manual order-picking stations KM1 of the group available in this time period is ascertained. Finally, that partial quantity TM of said orders A for an execution of the order-picking method in the selected time period is selected for which the smallest deviation between the first required capacity and the first available capacity as well as between the second required capacity and the second available capacity is ascertained.

In FIG. 15, the orders A1 .... A9 are to be processed, to that end, in a specifiable time period, for example. The execution of the above-mentioned method reveals that the capacity need for partial quantity TM, which comprises the orders A2, A3, A6, A7 and A8, best matches the available capacity. Then, the orders A2, A3, A6, A7 and A8 of the partial quantity TM can be executed.

Yet it would also be conceivable that, in another step, a matching segmentation of the groups of types of article WTG1 and WTG2, and thus a matching segmentation of the order parts AT1 and AT2, is ascertained for the partial quantity TM. In other words, the first threshold value SW1 (or also the third threshold value SW3) is ascertained, to that end, on the basis of a capacity of a group of first automatic or manual order-picking stations KA1, KM1 which is available in a specifiable time period for the execution of multiple orders A, A1 .... A9.

Advantageously, an imbalance of the (percentage) capacity utilization of the first automatic order-picking stations KA1 and the first manual order-picking stations KM1 of the group can be avoided, in particular if the capacity need of the ascertained partial quantity TM does not match the available capacity one hundred percent.

For example, for the determination of the first threshold value SW1, in a first step, multiple orders A, A1 .... A9 for order-picking articles are acquired and the articles required for these orders A, A1 .... A9 are determined (and advantageously sorted on the basis of their error rate F). In another step, a first required capacity of the first automatic order-picking stations KA1 of the group for the order-picking of the articles of the first group of types of article WTG1 for the execution of these orders A, A1 .... A9 in a specifiable time period and a second required capacity of the first manual order-picking stations KM1 of the group for the order-picking of the articles of the second group of types of article WTG2 required in this time period is computed for various first threshold values SW1 (or for various third threshold values SW3). Furthermore, a first available capacity of the first automatic order-picking stations KA1 of the group available in this time period and a second available capacity of the first manual order-picking stations KM1 of the group available in this time period is ascertained. Finally, that first threshold value SW1 for the execution of said orders A, A1 .... A9 is selected for which the smallest deviation between the first required capacity and the first available capacity as well as between the second required capacity and the second available capacity is ascertained.

For the ascertainment of the smallest deviation between the first required capacity and the first available capacity as well as between the second required capacity and the second available capacity, the sum of the deviation between the first available capacity and the first required capacity and the deviation between the second available capacity and the second required capacity can be computed in both cases (i.e. both when determining the partial quantity TM and when determining the first threshold value SW1 or the third threshold value SW3). The smallest deviation is then the smallest of said sums which have been computed for various first threshold values SW1 (or for various third threshold values SW3).

Smallest deviation=minimum(first available capacity−first required capacity+second available capacity−second required capacity)

It is also conceivable that the product of the deviation between the first available capacity and the first required capacity and the deviation between the second available capacity and the second required capacity is computed. The smallest deviation is then the smallest of said products which have been computed for various first threshold values SW1 (or for various third threshold values SW3).

Smallest deviation=minimum((first available capacity−first required capacity)×(second available capacity−second required capacity))

In FIG. 15, only that case is depicted in which a first group of types of article WTG1 and a second group of types of article WTG2 are provided. Yet the procedure presented on the basis of FIG. 15 can also be applied analogously if a third group of types of article WTG3 is additionally provided for the order-picking method. Here, the first threshold value SW1 is set in a selected first reserve distance below the third threshold value SW3 and the second threshold value SW2 is set in a selected second reserve distance above the third threshold value SW3.

In this case, the first reserve distance defines the size of the part of the third group of types of article WTG3 which comprises the articles expected to be order-picked automatically, and thus the reserve for being able to respond to unplanned and unexpected deviations from the computation of the actual running of the execution of said orders at the first automatic order-picking stations KA1.

The second reserve distance defines the size of the part of the third group of types of article WTG3 which comprises the articles expected to be order-picked manually, and thus the reserve for being able to respond to unplanned and unexpected deviations from the computation of the actual running of the execution of said orders at the first manual order-picking stations KM1.

It is generally conceivable that a partial quantity TM of said orders A, A1 .... A9 is determined by random selection of some of the multiple orders A, A1 .... A9. This is to avoid that only orders A, A1 .... A9 with a large portion of articles to be order-picked automatically or only orders A, A1 .... A9 with a large portion of articles to be order-picked manually are selected for the partial quantities TM and that it might then come to a load unbalance in the storage and order-picking system.

It is also conceivable for the determination of a partial quantity TM that
an availability portion of the first available capacity is
computed by division of the first available capacity by
the sum of the first and the second available capacity,
a need portion for the first required capacity for each of
the multiple orders A, A1 .... A9 is computed by division of the first required capacity by the sum of the first and the second required capacity, and the portion of orders A, A1 . . . . A9 with a need portion above the availability portion deviates from the portion of orders A, A1 . . . . A9 with a need portion below the availability portion by a maximum of 10%.

This is to ensure that as fitting a selection of orders A, A1 . . . . A9 as possible is achieved. In particular, an inequality between the first available capacity of the first automatic order-picking stations KA1 and the second available capacity of the first manual order-picking stations KM1 can easily be taken into account in this way.

It is further conceivable that said multiple orders A, A1 . . . . A9 are sorted on the basis of a sorting parameter and an even distribution with regard to the sorting parameter is aimed at when determining a partial quantity TM, wherein a number of pieces n, n1 . . . n3 of articles of the first group of types of article WTG1 in an order (including, if applicable, the articles of the third group of types of article WTG3 with an error rate F smaller than or equal to the third threshold value SW3 expected to be order-picked automatically) is provided as sorting parameter, or a relative portion of articles of the first group of types of article WTG1 in an order (including, if applicable, the articles of the third group of types of article WTG3 with an error rate F smaller than or equal to the third threshold value SW3 expected to be order-picked automatically) is provided as sorting parameter, which is computed by division of the number of pieces n, n1 . . . n3 of articles of the first group of types of article WTG1 of an order A, A1 . . . . A9 by the number of pieces n, n1 . . . n3 of all articles of this order A, A1 . . . . A9. This is to avoid, once again, that only orders A, A1 . . . . A9 with a high number of pieces n, n1 . . . n3 or only orders A, A1 . . . . A9 with a low number of pieces n, n1 . . . n3 are selected for the partial quantities TM and that it might then come to an unfavorable capacity utilization in the storage and order-picking system.

It may finally also be provided that orders A, A1 . . . . A9 with a higher priority are preferentially selected for a partial quantity TM. This is to avoid that orders A, A1 . . . . A9 which must be executed swiftly will be order-picked with a delay due to other selection criteria.

It should generally also be noted that the determination of a partial quantity TM and the computation of a first threshold value SW1 (and, if applicable, of a second threshold value SW2) do not necessarily have to be executed in combination, such as this is depicted in FIG. 15. Rather, it is possible to determine a partial quantity TM without subsequent computation of a threshold value SW1, SW2 or to compute a threshold value SW1, SW2 without preceding determination of a partial quantity TM.

In the preceding examples, a range of articles was divided into a first group of types of article WTG1, whose types of article WT1, WT2 can be order-picked automatically and are therefore assigned to a first order part AT1, and into a second group of types of article WTG2, whose types of article WT3 can be order-picked manually and are therefore assigned to a second order part AT2. If applicable, also a third group of types of article WTG3 was provided, whose types of article WT1 . . . . WT3 can be order-picked both automatically and manually and are therefore assigned optionally to the first order part AT1 or to the second order part AT2.

The procedures described in the FIGS. 1 to 15, however, are not limited to the above-mentioned constellation, but they can also be applied recursively to another subdivision of the first group of types of article WTG1 and/or of the first order part AT1.

To that end, it is assumed that the first group of types of article WTG1 comprises a first subgroup of types of article WTUG1, which contains types of article WT1 . . . . WT3 which can be handled automatically with a gripper of a first kind, and comprises a second subgroup of types of article WTUG2, which contains types of article WT1 . . . . WT3 which cannot, or only to a limited extent, be handled automatically with the gripper of the first kind but can be handled automatically with a gripper of a different, second kind. The boundary between the first subgroup of types of article WTUG1 and the second subgroup of types of article WTUG2 is determined here by a first subgroup threshold value SWU1.

Figure 16:
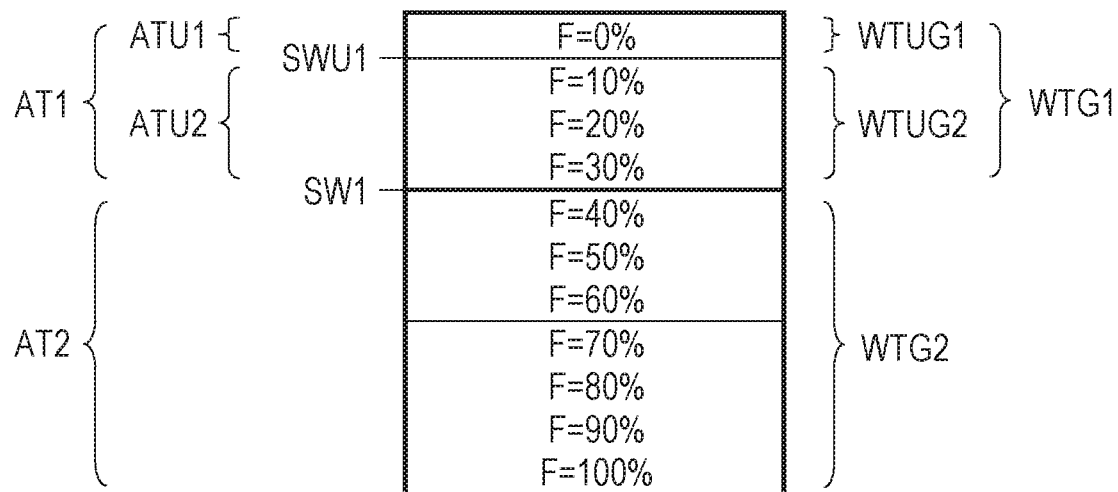
FIG. 16 a subdivision of the first group of types of article into two subgroups of types of article whose articles can be handled automatically by grippers of different kinds, based on the error rate occurring in this process.

In this variant embodiment, the first group of types of article WTG1 and the first order part AT1 (i.e. the types of article WT1, WT2 or articles which can be handled automatically) is thus subdivided into subgroups of types of article WTUG1 . . . . WTUG3 and order subparts ATU1, ATU2, such as it is depicted in FIG. 16, with reference to FIG. 13. For example, the first automatic order-picking station KA1 can be equipped with the gripper of the first kind and the gripper of the second kind and alternate between the two grippers as and when needed. The gripper of the first kind may be configured as a suction gripper, and the gripper of the second kind may be configured as a mechanical gripper (e.g. as gripping pliers or as a robotic hand).

It is further conceivable that a third subgroup of types of article WTUG3 is provided whose types of article WT1 . . . . WT3 can be handled automatically both with the gripper of the first kind and with the gripper of the second kind. The articles of the third subgroup of types of article WTUG3 in an order A, A1 . . . . A9 can then be assigned optionally to the first order subpart ATU1 or to the second order subpart ATU2. Both order subparts ATU1, ATU2, once again, belong to the first order part AT1. Here, the boundary between the first subgroup of types of article WTUG1 and the third subgroup of types of article WTUG3 is determined by the first subgroup threshold value SWU1, the boundary between the second subgroup of types of article WTUG2 and the third subgroup of types of article WTUG3 by the second subgroup threshold value SWU2. The third subgroup of types of article WTUG3 itself, at a third subgroup threshold value SWU3, can be subdivided into articles expected to be order-picked automatically with the gripper of the first kind and into articles expected to be order-picked automatically with the gripper of the second kind, such as it is depicted in FIG. 17, with reference to FIG. 14.

Figure 17:
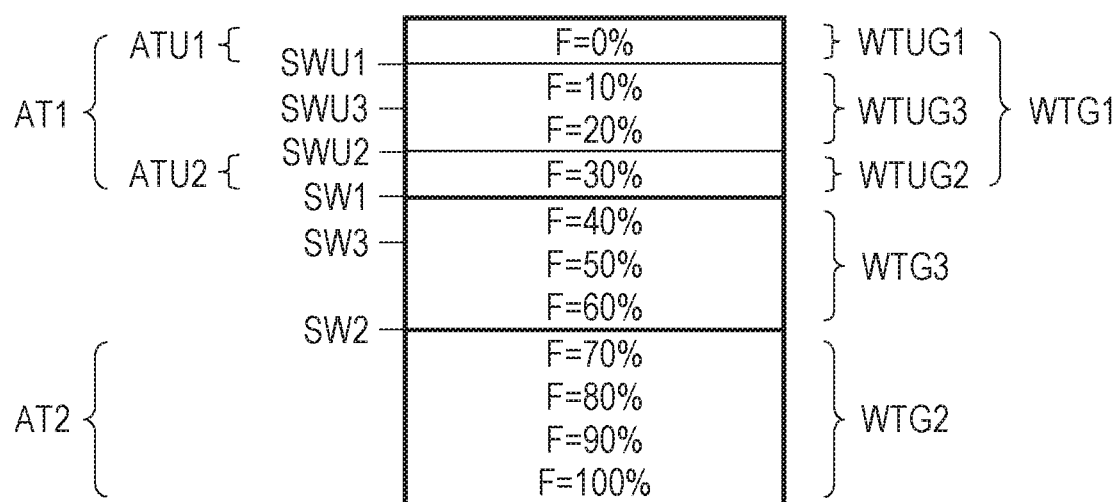
FIG. 17 like FIG. 16, but with a third subgroup of types of article.

Both in FIG. 16 and in FIG. 17, the types of article WT1 . . . . WT3, like in FIGS. 13 and 14, are sorted in accordance with their error rate F. Yet this error rate F now refers to the automatic handling of the articles with the gripper of the first kind.

In summary, the following substitutions are effected in said recursive application of the method disclosed in FIGS. 1 to 15:

the first order subpart ATU1 takes the place of the first order part AT1, the second order subpart ATU2 takes the place of the second order part AT2, the first subgroup of types of article WTUG1 takes the place of the first group of types of article WTG1, the second subgroup of types of article WTUG2 takes the place of the second group of types of article WTG2, the third subgroup of types of article WTUG3 takes the place of the third group of types of article WTG3, a first subgroup threshold value SWU1 takes the place of the first threshold value SW1, a second subgroup threshold value SWU2 takes the place of the second threshold value SW2, a third subgroup threshold value SWU3 takes the place of the third threshold value SW3, and an error rate F, F1 .... F3 for the handling of articles with the gripper of the first kind takes the place of the error rate F, F1 .... F3 for the automatic handling of articles.

Generally, it is conceivable that the first automatic order-picking station KA1 is equipped with the gripper of the first kind and the gripper of the second kind. Yet it is also conceivable that the first automatic order-picking station KA1 comprises a first automatic order-picking substation KAU1 and a second automatic order-picking substation KAU2, wherein the first automatic order-picking substation KAU1 is equipped with a gripper of a first kind and the second automatic order-picking substation KAU2 is equipped with a gripper of a different, second kind.

Figure 18:
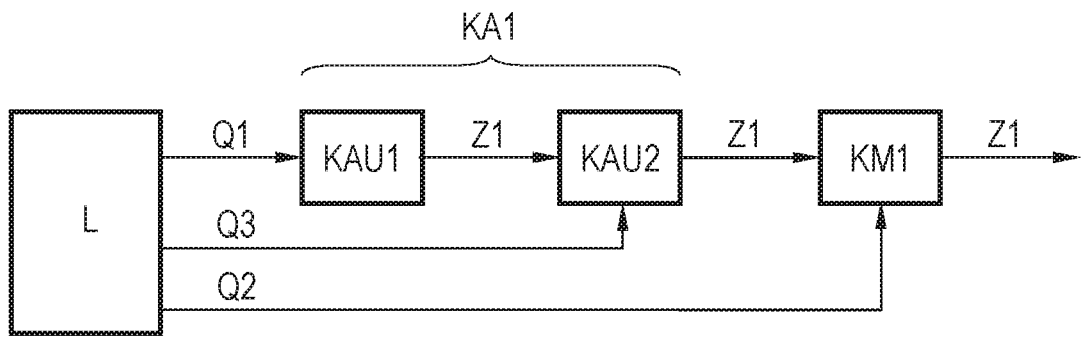
FIG. 18 schematically the procedure during the order-picking of articles in accordance with a variant embodiment with two automatic order-picking substations, in which articles are first loaded into a target loading aid with a gripper of a first kind, then articles are loaded into a target loading aid with a gripper of a second kind and then articles are loaded manually into a target loading aid.

With reference to FIG. 2, FIG. 18 shows, in this context, another variant embodiment for the procedure during the order-picking of articles. Here, a first source loading aid Q1 with the article(s) of the first order subpart ATU1 is retrieved from the storage zone L of the storage and order-picking system and transported to the first automatic order-picking substation KAU1 and provisioned there. Then, the article(s) of the first order subpart ATU1 is/are removed automatically from the first source loading aid Q1 with the gripper of the first kind and discharged into or onto a first target loading aid Z1 at the first automatic order-picking substation KAU1. Then, the first target loading aid Z1 loaded with the article(s) of the first order subpart ATU1 is transported to the second automatic order-picking substation KAU2 and provisioned there. Moreover, a third source loading aid Q3 with the article(s) of the second order subpart ATU2 is retrieved from the storage zone L of the storage and order-picking system and transported to the second automatic order-picking substation KAU2 and provisioned there. Then, the article(s) of the second order subpart ATU2 is/are removed automatically from the third source loading aid Q3 at the second automatic order-picking substation KAU2 with the gripper of the second kind and additionally loaded into or onto the first target loading aid Z1. Then, the first target loading aid Z1 loaded with the article(s) of the first order subpart ATU1 and with the article(s) of the second order subpart ATU2 is transported to the first manual order-picking station KM1 and provisioned there. Moreover, a second source loading aid Q2 with the at least one article of the second order part AT2 is retrieved from the storage zone L of the storage and order-picking system and the second source loading aid Q2 is transported to a first manual order-picking station KM1 and provisioned there. Then, the article(s) of the second order part AT2 is/are removed manually from the second source loading aid Q2 at the first manual order-picking station KM1 and additionally loaded into or onto the first target loading aid Z1. The first target loading aid Z1 can finally be transported to a dispatch zone of the storage and order-picking system and be dispatched. Alternatively, the order-picked content of the first target loading aid Z1 can be reloaded into a (different) dispatch loading aid.

In summary, the following steps are executed during the order-picking of articles according to said variant method:

a) provisioning the articles into or onto source loading aids Q1, Q2 in the storage zone L, b) acquiring orders A, A1 .... A9 for order-picking articles and determining the articles required for these orders A, A1 .... A9, wherein at least one order A, A1 .... A9 of the orders A, A1 .... A9 comprises multiple order lines AZ and wherein each order line AZ specifies at least one article according to its type of article WT1 .... WT3 and its number of pieces n, n1 ... n3 to be order-picked, c) ascertaining the classification of the articles required for the processing of said order in groups of types of article WTG1 .... WTG3, each of which comprises multiple types of article WT1 .... WT3, wherein a first group of types of article WTG1 contains types of article WT1 .... WT3 which can be handled automatically and a second group of types of article WTG2 contains types of article WT1 .... WT3 which cannot, or only to a limited extent, be handled automatically but can be handled manually, and additionally ascertaining the classification of the articles required for the processing of said order in the first subgroup of types of article WTUG1 and in the second subgroup of types of article WTUG2, d) determining a first order part AT1, whose at least one article belongs to the first group of types of article WTG1 and can accordingly be handled automatically, and a second order part AT2, whose at least one article belongs to the second group of types of article WTG2 and can accordingly not, or only to a limited extent, be handled automatically but can be handled manually, and additionally determining a first order subpart ATU1 of the first order part AT1, whose at least one article belongs to the first subgroup of types of article WTUG1 and can accordingly be handled automatically with a gripper of the first kind, and a second order subpart ATU2 of the first order part AT1, whose at least one article belongs to the second subgroup of types of article WTUG2 and can accordingly not, or only to a limited extent, be handled automatically with the gripper of the first kind but can be handled automatically with the gripper of the second kind, e1) retrieving a first source loading aid Q1 with the at least one article of the first order subpart ATU1 from the storage zone L of the storage and order-picking system, transporting the first source loading aid Q1 to the first automatic order-picking substation KAU1, provisioning the first source loading aid Q1 at the first automatic order-picking substation KAU1 and removing automatically the at least one article of the first order subpart ATU1 from the first source loading aid Q1 at the first automatic order-picking substation KAU1 with the gripper of the first kind, e2) retrieving a third source loading aid Q3 with the at least one article of the second order subpart ATU2 from the storage zone L of the storage and order-picking system, transporting the third source loading aid Q3 to the second automatic order-picking substation KAU2, provisioning the third source loading aid Q3 at the second automatic order-picking substation KAU2 and removing automatically the at least one article of the second order subpart ATU2 from the third source loading aid Q3 at the second automatic order-picking substation KAU2 with the gripper of the second kind, f) retrieving a second source loading aid Q2 with the at least one article of the second order part AT2 from the storage zone L of the storage and order-picking system, transporting the second source loading aid Q2 to a first manual order-picking station KM1, provisioning the second source loading aid Q2 at the first manual order-picking station KM1 and removing manually the at least one article of the second order part AT2 from the second source loading aid Q2 at the first manual order-picking station KM1, and g) discharging the at least one article of the first order subpart ATU1, the at least one article of the second order subpart ATU2 and the at least one article of the second order part AT2 into or onto a target loading aid Z1.

A storage zone L of the storage and order-picking system is provided for the step a). In particular, a control system of the storage and order-picking system is provided for the execution of the steps b) to d), and a conveying system of the storage and order-picking system is provided for the steps e1), e2) and f). The execution of the steps e1) to g), in addition, involves the first automatic order-picking substation KAU1, the second automatic order-picking substation KAU2 and the first manual order-picking station KM1.

In summary, the following substitutions are thus also effected in said recursive application of the method disclosed in FIGS. 1 to 15:

the first automatic order-picking substation KAU1 takes the place of the first automatic order-picking station KA1, the second automatic order-picking substation KAU2 takes the place of the first manual order-picking station KM1, an automatic handling of the articles with the gripper of the first kind (at the first automatic order-picking substation KAU1) takes the place of an automatic handling of the articles at the first automatic order-picking station KA1, an automatic handling of the articles with the gripper of the second kind (at the second automatic order-picking substation KAU2) takes the place of a manual handling of the articles at the first manual order-picking station KM1, and the third source loading aid Q3 takes the place of the second source loading aid Q2.

In the variant provided in FIG. 18, the first automatic order-picking station KA1 comprises a first automatic order-picking substation KAU1 and a second automatic order-picking substation KAU2. Yet it is also conceivable that the first automatic order-picking station KA1 itself is equipped with the gripper of the first kind and the gripper of the second kind. If this is the case, a first source loading aid Q1 with the at least one article of the first order subpart ATU1 is retrieved, in the step e1), from the storage zone L of the storage and order-picking system and transported to the first automatic order-picking station KA1 and provisioned there. Then, the article(s) of the first order subpart ATU1 is/are removed automatically from the first source loading aid Q1 at the first automatic order-picking station KA1 with the gripper of the first kind.

Further, in the step e2), a third source loading aid Q3 with the at least one article of the second order subpart ATU2 is retrieved from the storage zone L of the storage and order-picking system and transported to the first automatic order-picking station KA1 and provisioned there. Then, the article(s) of the second order subpart ATU2 is/are removed automatically from the third source loading aid Q3 at the first automatic order-picking station KA1 with the gripper of the second kind.

Finally, the at least one article of the first order subpart ATU1 and the at least one article of the second order subpart ATU2 is discharged (and/or loaded) into or onto a target loading aid Z1.

Figure 19:
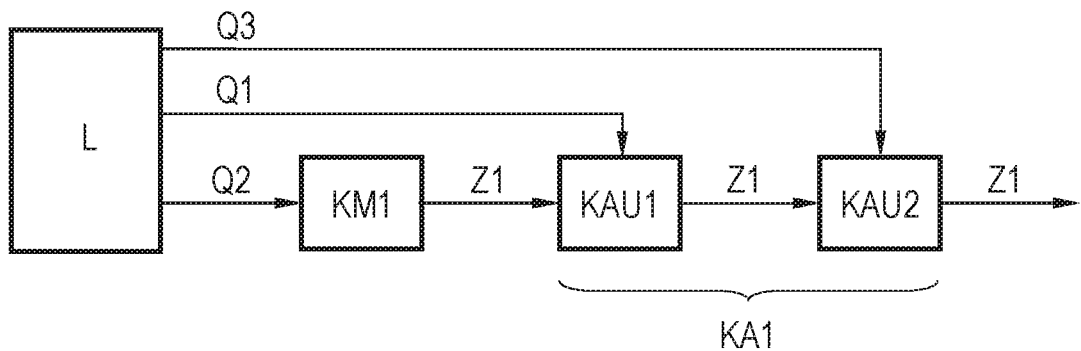
FIG. 19 schematically the procedure during the order-picking of articles in accordance with another variant embodiment with two automatic order-picking substations, in which articles are first loaded manually into a target loading aid, then articles are loaded into a target loading aid with a gripper of a first kind and then articles are loaded into a target loading aid with a gripper of a second kind.

With reference to FIG. 3, FIG. 19 now shows another variant embodiment for the procedure during the order-picking of articles, which is very similar to the procedure depicted in FIG. 18. Here, a second source loading aid Q2 with (an) article(s) of the second order part AT2 is first retrieved from the storage zone L of a storage and order-picking system and the second source loading aid Q2 is transported to a first manual order-picking station KM1 and provisioned there. Then, the article(s) of the second order part AT2 is/are removed manually from the second source loading aid Q2 at the first manual order-picking station KM1 and discharged into or onto a first target loading aid Z1. Then, the first target loading aid Z1 loaded with the article(s) of the second order part AT2 is transported to the first automatic order-picking substation KAU1 and provisioned there. Then, the article(s) of the first order subpart ATU1 is/are additionally loaded automatically into the first target loading aid Z1 at the first automatic order-picking substation KAU1. Then, the first target loading aid Z1 loaded with the article(s) of the second order part AT2 and with the article(s) of the first order subpart ATU1 is transported to the second automatic order-picking substation KAU2 and provisioned there. Then, the article(s) of the second order subpart ATU2 is/are additionally loaded automatically into the first target loading aid Z1 at the second automatic order-picking substation KAU2. The first target loading aid Z1 can finally be transported to a dispatch zone of the storage and order-picking system and be dispatched. Alternatively, the order-picked content of the first target loading aid Z1 can be reloaded into a (different) dispatch loading aid.

Figure 20:
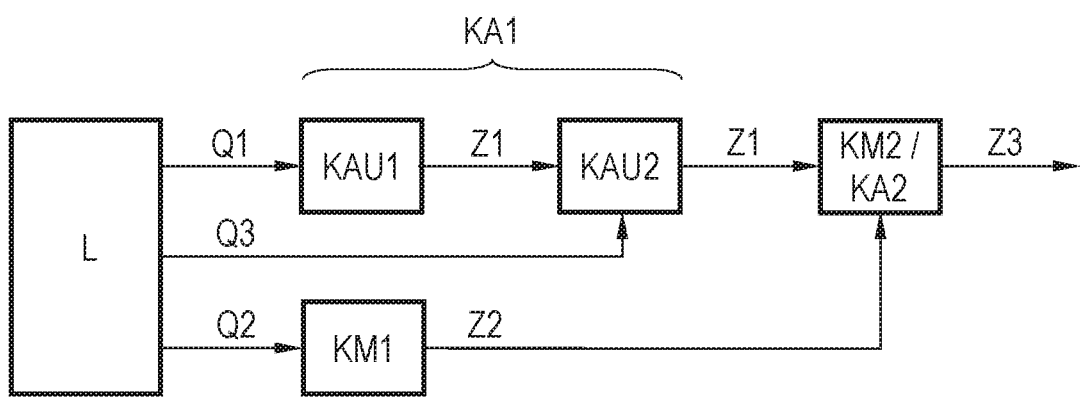
FIG. 20 schematically the procedure during the order-picking of articles in which articles are loaded into a first target loading aid with grippers of different kinds, articles are loaded manually into a second target loading aid and all said articles are consolidated into a third target loading aid.

Further, with reference to FIG. 6, FIG. 20 shows another variant embodiment for the procedure during the order-picking of articles. Here, a first source loading aid Q1 with the article(s) of the first order subpart ATU1 is retrieved from the storage zone L of the storage and order-picking system and transported to the first automatic order-picking substation KAU1 and provisioned there. Then, the article(s) of the first order subpart ATU1 is/are removed automatically from the first source loading aid Q1 at the first automatic order-picking substation KAU1 with the gripper of the first kind and discharged into or onto a first target loading aid Z1. Then, the first target loading aid Z1 loaded with the article(s) of the first order subpart ATU1 is transported to the second automatic order-picking substation KAU2 and provisioned there. Moreover, a third source loading aid Q3 with the article(s) of the second order subpart ATU2 is retrieved from the storage zone L of the storage and order-picking system and transported to the second automatic order-picking substation KAU2 and provisioned there. Then, the article(s) of the second order subpart ATU2 is/are removed automatically from the third source loading aid Q3 at the second automatic order-picking substation KAU2 with the gripper of the second kind and additionally loaded into or onto the first target loading aid Z1. Then, the first target loading aid Z1 loaded with the article(s) of the first order subpart ATU1 and with the article(s) of the second order subpart ATU2 is transported either to a second automatic order-picking station KA2 or to a second manual order-picking station KM2. There, the article(s) of the first order subpart ATU1 and the article(s) of the second order subpart ATU2 is/are reloaded into the third target loading aid Z3. Finally, the article(s) of the second order part AT2 is/are loaded automatically/manually into the third target loading aid Z3 at the second automatic/manual order-picking station KM2/KA2. The third target loading aid Z3 can finally be transported to a dispatch zone of the storage and order-picking system and be dispatched. A reloading of the order-picked content of the third target loading aid Z3 into a (different) dispatch loading aid is possible once again.

FIGS. 18 to 20 show merely selected examples of the execution of the order-picking method in connection with a first automatic order-picking substation KAU1 and a second automatic order-picking substation KAU2, and also other variants are possible, in particular those which are equivalent to the ones in FIGS. 4 and 5.

Figure 21:
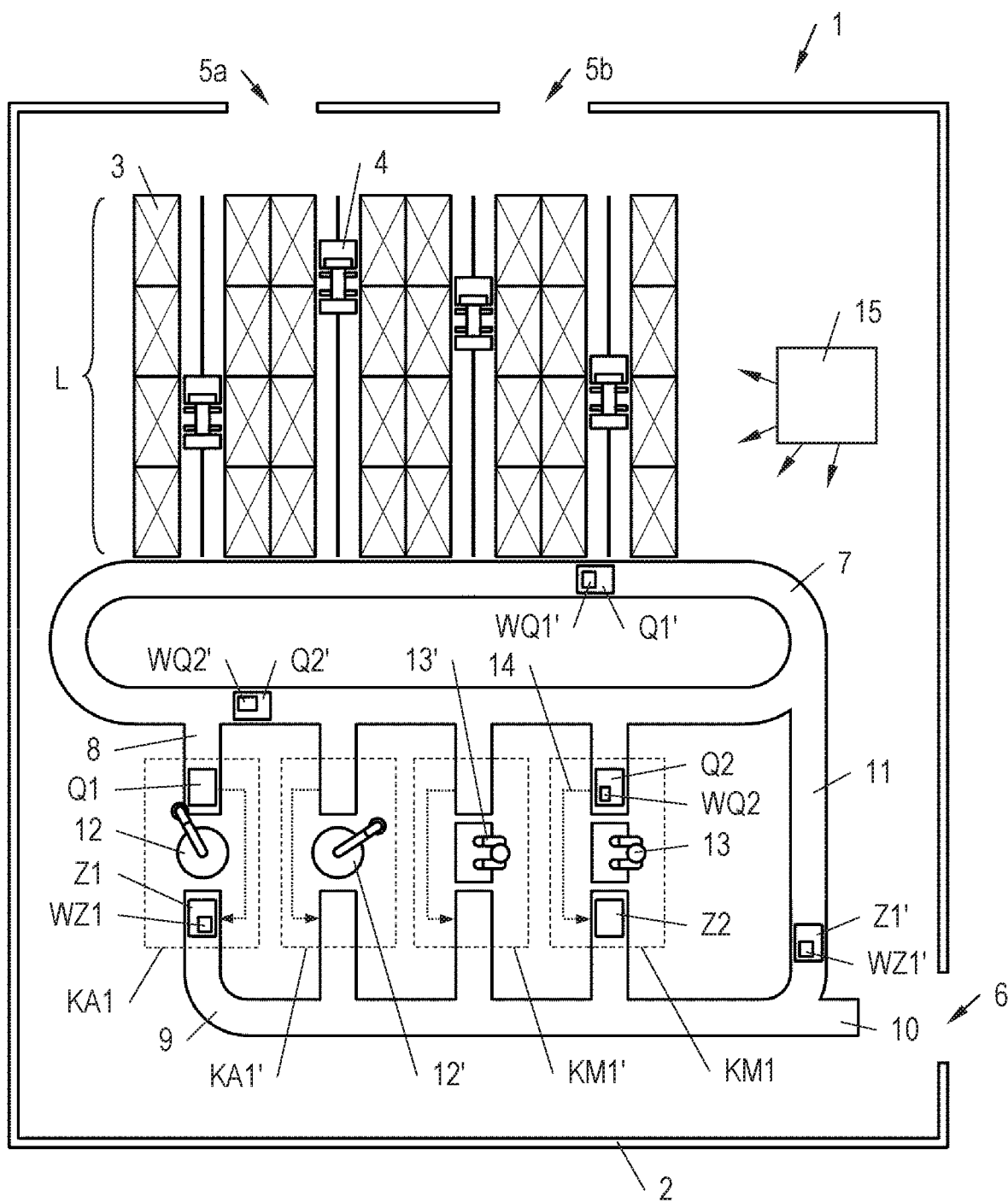
FIG. 21 a top view onto an exemplary and schematically-depicted storage and order-picking system with a loop conveyor and multiple automatic and manual order-picking stations.

FIG. 21 now shows a somewhat more detailed depiction of an exemplary storage and order-picking system 1 for order-picking articles in a schematic top view. The storage and order-picking system 1 has a building 2, a storage zone L with storage racks 3 as well as storage and retrieval units 4 which travel in rack aisles running between the storage racks 3. Such a storage zone L is known, for example, from WO 2016/033628 A1. Furthermore, the storage and order-picking system 1 comprises gates at article takeover zones 5a, 5b and at an article handover zone 6.

Downstream, in terms of conveyor technology, of the storage racks 3 and of the storage and retrieval units 4, the storage and order-picking system 1 comprises a loop conveyor 7, which connects the storage and retrieval units 4 via supply conveyors 8 with first automatic order-picking stations KA1, KA1' and with first manual order-picking stations KM1, KM1'. The first automatic order-picking stations KA1, KA1' and the first manual order-picking stations KM1, KM1' are connected via discharge conveyors 9 with a retrieval conveyor 10, which leads to the article handover zone 6. Additionally, a return conveyor 11 branches off of the retrieval conveyor 10, which ends at the loop conveyor 7 again.

Robots 12, 12' are located at the first automatic order-picking stations KA1, KA1', which robots 12, 12' are, in this example, configured as jointed-arm robots with a gripper. Such an automatic order-picking station KA1, KA1' is known, for example, from WO 2018/132855 A1 or from the Austrian patent applications AT 50207/2018 or AT 50217/2018. Yet this is not mandatory, and the robots 12, 12' could also be configured as gantry robots with a gripper, for example. Such an automatic order-picking station KA1, KA1' is known, for example, from the Austrian patent application AT 50886/2018. Working areas for workers 13, 13' are located at the first manual order-picking stations KM1, KM1'. Such a manual order-picking station KM1, KM1' is known, for example, from WO 2013/090969 A1. The first automatic order-picking stations KA1, KA1' and the first manual order-picking stations KM1, KM1' are furthermore equipped with optional bypass lines 14, which connect, in each case directly, a supply conveyor 8 and a discharge conveyor 9.

Finally, the storage and order-picking system 1 comprises a control system 15.

The functioning of the storage and order-picking system 1 depicted in FIG. 21 is as follows:

Articles WQ1', WQ2, WQ2', WZ1, WZ1', WZ2 are delivered at the article takeover zones 5a, 5b and stored into one of the storage racks 3 in source loading aids Q1, Q1', Q2, Q2', Q3 with the help of the storage and retrieval units 4. If the articles WQ1', WQ2, WQ2', WZ1, WZ1', WZ2 are not delivered directly in source loading aids Q1, Q1', Q2, Q2', Q3, the articles can be repacked into source loading aids Q1, Q1', Q2, Q2', Q3 before being stored into the storage racks 3 with the help of the storage and retrieval units 4. In particular, the articles WQ1', WQ2, WQ2', WZ1, WZ1', WZ2 can be separated before being repacked into source loading aids Q1, Q1', Q2, Q2', Q3.

The source loading aids Q1, Q1', Q2, Q2', Q3 receive in particular a plurality of articles WQ1', WQ2, WQ2', WZ1, WZ1', WZ2 and are configured as a container, cardboard box, tray, pallet, bag (in particular a "polybag"), pouch, sack or hanging bag, for example. In particular, the articles WQ1', WQ2, WQ2', WZ1, WZ1', WZ2 are stored in the source loading aids Q1, Q1', Q2, Q2', Q3 so as to be homogeneous. To that end, the source loading aids Q1, Q1', Q2, Q2', Q3 may also have multiple compartments for receiving the articles WQ1', WQ2, WQ2', WZ1, WZ1', WZ2.

In the storage zone L, generally, articles WQ1', WQ2, WQ2', WZ1, WZ1', WZ2 of different types of article WT1 . . . . WT3 are stored. The entirety of the stored types of article WT1 . . . . WT3 corresponds to an available range of articles.

When a picking order A, A1 . . . . A9 for order-picking articles WQ1', WQ2, WQ2', WZ1,WZ1', WZ2 is received, the first order part AT1 required for this picking order A, A1 . . . . A9 and the second order part AT2 required for this picking order A, A1 . . . . A9 are determined. Then, the pertaining articles WQ1', WQ2, WQ2', WZ1, WZ1', WZ2 and/or source loading aids Q1, Q2 are retrieved from the storage racks 3 with the help of the storage and retrieval units 4 and handed over onto the conveying system. In the exemplary embodiment shown, the articles WQ1', WQ2, WQ2', WZ1, WZ1', WZ2 and/or source loading aids Q1, Q2 are handed over onto the loop conveyor 7, which may be comprised by the conveying system.

In the example specifically depicted, a first source loading aid Q1 has been transported to a first supply position of the first automatic order-picking stations KA1 and provisioned (supplied) there. Likewise, a first target loading aid Z1 has been provisioned (supplied) at a second supply position of the first automatic order-picking stations KA1. (An) article(s) WZ1 has/have already been removed from the first source loading aid Q1 and discharged into the first target loading aid Z1 with the help of the robot 12.

In an entirely similar way, in the example depicted in FIG. 21, a second source loading aid Q2 has been transported to a first supply position of the first manual order-picking stations KM1 and provisioned (supplied) there. Likewise, a second target loading aid Z2 has been provisioned (supplied) at a second supply position of the first manual order-picking stations KM1. (An) article(s) WQ2 is/are then removed from the second source loading aid Q2 and discharged into in the second target loading aid Z2 by the worker 13.

Further, a first target loading aid Z1' with (an) article(s) WZ1' on the return conveyor 11, a first source loading aid Q1' with (an) article(s) WQ1' on the loop conveyor 7 in the region of the storage and retrieval units 4 and a second source loading aid Q2' with (an) article(s) WQ2' on the loop conveyor 7 in the region of a supply conveyor 8 are depicted in FIG. 21. For example, the first source loading aid Q1' may just have been handed over onto the loop conveyor 7 by the storage and retrieval unit 4, the second source loading aid Q2' may be on the way to the first manual order-picking station KM1' and the first target loading aid Z1' may be on the way back from the first automatic order-picking station KA1' to the loop conveyor 7.

The procedure schematically depicted in FIG. 2 is explained below on the basis of the storage and order-picking system 1 depicted in FIG. 21.

In a first step, the first source loading aid Q1 with (an) article(s) WZ1 of the first order part AT1 is retrieved from a storage rack 3 and handed over onto the conveying system (loop conveyor 7) with the help of a storage and retrieval unit 4. Then, the first source loading aid Q1 is transported to the first supply position of the first automatic order-picking stations KA1 and provisioned (supplied) there. Likewise, the first target loading aid Z1 is provisioned (supplied) at the second supply position of the first automatic order-picking stations KA1. Then, the article(s) WZ1 of the first order part AT1 is/are removed from the first source loading aid Q1 and discharged into the first target loading aid Z1 with the help of the robot 12.

Then, the first target loading aid Z1 is transported to the first automatic order-picking station KM1' via the conveying system. Specifically, the first target loading aid Z1 is transported back to the loop conveyor 7 via the return conveyor 11 and then to the first automatic order-picking station KM1' via the supply conveyor 8. There, it reaches the second (lower) supply position of the first manual order-picking stations KM1' via the bypass line 14 and is provisioned there.

In another step, the second source loading aid Q2 with (an) article(s) WQ2 of the second order part AT2 is retrieved from a storage rack 3 and handed over onto the conveying system (loop conveyor 7) with the help of a storage and retrieval unit 4. Then, the second source loading aid Q2 is transported to the first supply position of the first manual order-picking stations KM1 and provisioned (supplied) there. Then, the article(s) WQ2' of the second order part AT2 is/are removed from the second source loading aid Q2' by the worker 13' and discharged into the first target loading aid Z1, which is already provisioned at the second supply position of the first manual order-picking stations KM1.

The first target loading aid Z1, which now contains the article(s) WZ1 of the first order part AT1 and the article(s) WQ2' of the second order part AT2, can then be transported to the article handover zone 6 and dispatched. Before this, the content of the first target loading aid Z1 can be reloaded into a dispatch loading aid.

In an entirely similar way, the procedure schematically depicted in FIG. 3 can be represented in the storage and order-picking system 1 depicted in FIG. 21. To that end, the first target loading aid Z1 need only be loaded first with the article(s) WQ2' of the second order part AT2 at the first manual order-picking stations KM1' before it is loaded, in another step, with the article(s) WZ1 of the first order part AT1 at the first automatic order-picking stations KA1.

Also the procedures schematically depicted in FIGS. 4 to 6 can be represented, in an entirely similar way, in the storage and order-picking system 1 depicted in FIG. 21.

For example, the procedure schematically depicted in FIG. 4 can take place in the storage and order-picking system 1 depicted in FIG. 21 by retrieving, in a first step, the first source loading aid Q1 with (an) article(s) WZ1 of the first order part AT1 from a storage rack 3 and handing it over onto the conveying system (loop conveyor 7) with the help of a storage and retrieval unit 4. Then, the first source loading aid Q1 is transported to the first supply position of the first automatic order-picking stations KA1 and provisioned (supplied) there. Likewise, the first target loading aid Z1 is provisioned (supplied) at the second supply position of the first automatic order-picking stations KA1. Then, the article(s) WZ1 of the first order part AT1 is/are removed from the first source loading aid Q1 and discharged into the first target loading aid Z1 with the help of the robot 12.

In another step, the second source loading aid Q2 with (an) article(s) WQ2 of the second order part AT2 is retrieved from a storage rack 3 and handed over onto the loop conveyor 7 with the help of a storage and retrieval unit 4. Then, the second source loading aid Q2 is transported to the first supply position of the first manual order-picking stations KM1 and provisioned (supplied) there. Then, the article(s) WQ2' of the second order part AT2 is/are removed from the second source loading aid Q2' by the worker 13' and discharged into a second target loading aid Z2 provisioned at the second supply position of the first manual order-picking stations KM1.

The first target loading aid Z1, which now contains the article(s) WZ1 of the first order part AT1, and the second target loading aid Z2, which contains the article(s) WQ2 of the second order part AT2, are now transported to a second manual/automatic order-picking station KM2/KA2, where the article(s) WQ2 of the second order part AT2 is/are additionally loaded from the second target loading aid Z2 to the article(s) WZ1 of the first order part AT1 into the first target loading aid Z1. This second manual/automatic order-picking station KM2/KA2 can be a special order-picking station, or one of the first automatic order-picking stations KA1, KA1' or first manual order-picking stations KM1, KM1' depicted in FIG. 21 is used for this purpose.

For example, the first target loading aid Z1 can be transported to the second (lower) supply position of the first manual order-picking station KM1' via the bypass line 14 and provisioned there, and the second target loading aid Z2 is transported to the first (upper) supply position of the first manual order-picking station KM1' and provisioned there. Then, the article(s) WQ2 of the second order part AT2 can be removed from the second target loading aid Z2 by the worker 13' and be additionally loaded into the first target loading aids Z1 to the article(s) WZ1 of the first order part AT1.

In the same way, also the first target loading aid Z1 could, of course, be transported to the second (lower) supply position of the first automatic order-picking station KA1' via the bypass line 14 and provisioned there, and the second target loading aid Z2 is transported to the first (upper) supply position of the first automatic order-picking station KA1' and provisioned there. Then, the article(s) WQ2 of the second order part AT2 can be removed from the second target loading aid Z2 by the robot 12' and be additionally loaded to the article(s) WZ1 of the first order part AT1, in particular by simply tilting the entire content of the second target loading aid Z2 into the first target loading aid Z1. In this case, the robot 12' seizes not individual articles WQ2 of the second order part AT2 but the second target loading aid Z2 directly.

In an alternative variant embodiment, the first target loading aid Z1 can remain at the second order-picking supply position of the first automatic order-picking station KA1 after the loading with the article(s) WZ1 of the first order part AT1, the second target loading aid Z2 can be transported to the first order-picking supply position of the first automatic order-picking station KA1 via the conveying system (specifically the return conveyor 11 and the loop conveyor 7) after the loading with the article(s) WQ2 of the second order part AT2 at the first manual order-picking station KM1 and then the content of the second target loading aid Z2 can be loaded into the first target loading aid Z1 with the robot 12.

In another alternative variant embodiment, the second target loading aid Z2 can remain at the second order-picking supply position of the first manual order-picking station KM1 after the loading with the WQ2 of the second order part AT2, the first target loading aid Z1 can be transported to the first order-picking supply position of the first manual order-picking station KM1 via the conveying system (specifically the return conveyor 11 and the loop conveyor 7) after the loading with the article(s) WZ1 of the first order part AT1 at the first automatic order-picking station KA1 and then the content of the first target loading aid Z1 can be loaded into the second target loading aid Z2 by the worker 13. This procedure then corresponds to the procedure schematically depicted in FIG. 5.

Finally, it is also conceivable that the first target loading aid Z1 loaded with the article(s) WZ1 of the first order part AT1 and the second target loading aid Z2 loaded with the article(s) WQ2 of the second order part AT2 are provisioned at order-picking supply positions of a first automatic order-picking station KA1 or a first manual order-picking station KM1 and the respective articles WZ1, WQ2 are loaded into a third target loading aid Z3 there. This procedure then corresponds to the procedure schematically depicted in FIG. 6.

It becomes clear from what has been said that the second manual/automatic order-picking station KM2/KA2 can not only structurally correspond to a first automatic order-picking station KA1, KA1' or a first manual order-picking station KM1, KM1' but be altogether identical to same. This means that a first automatic order-picking station KA1, KA1' or a first manual order-picking station KM1, KM1' can take over the role of a second manual/automatic order-picking station KM2/KA2 at a later point in time.

Analogously, the procedures described above can be applied to the procedures schematically depicted in FIGS. 18 to 20. For example, a first automatic order-picking substation KAU1 with a gripper of a first kind in the FIG. 21 can take the place of the first automatic order-picking station KA1, and a second automatic order-picking substation KAU2 with a gripper of a second kind can take the place of the first automatic order-picking station KA1'. It is also conceivable that the first automatic order-picking station KA1 and/or the first automatic order-picking station KA1' are equipped with grippers of different kinds.

Source loading aids Q1, Q1', Q2, Q2', Q3 and target loading aids Z1, Z1', Z2, Z3 can be transported to the first automatic order-picking station KA1, KA1', the first manual order-picking station KM1, KM1', the second manual/automatic order-picking stations KM2/KA2, the first automatic order-picking substations KAU1 as well as to the second automatic order-picking substations KAU2 by the conveying system (specifically the loop conveyor 7 and the return conveyor 11) in almost any order and be provisioned there for a partial step in the order-picking operation. The storage and order-picking system 1 depicted in FIG. 21 can therefore be operated in a particularly flexible manner. In particular, the particular structure enables, in a particularly simple manner, a restructuring or an extension of the storage and order-picking system 1, for example by adding additional first automatic order-picking stations KA1, KA1' or additional first manual order-picking stations KM1, KM1' or by replacing first automatic order-picking stations KA1, KA1' with first manual order-picking stations KM1, KM1' or first manual order-picking stations KM1, KM1' with first automatic order-picking stations KA1, KA1'. This ensures that the ratio between the number of the first automatic order-picking stations KA1, KA1' and the number of the first manual order-picking stations KM1, KM1' can be adjusted easily.

Generally, it is of advantage if the ratio between the number of the first automatic order-picking stations KA1, KA1' and the number of the first manual order-picking stations KM1, KM1' is smaller than or equal to 1. In this way, a plurality of different articles WQ1', WQ2, WQ2', WZ1, WZ1', WZ2 can be order-picked, as the first manual order-picking stations KM1, KM1' are able to respond well to changes. This means that this variant is particularly suited whenever a large number of different types of article WT1 . . . . WT3 is stored in the storage zone L.

Yet it is also conceivable that the ratio between the number of the first automatic order-picking stations KA1, KA1' and the number of the first manual order-picking stations KM1, KM1' is larger than or equal to 1. In this way, the order-picking operation can take place in a highly-automated manner, as a plurality of first automatic order-picking stations KA1, KA1' is available. This variant is particularly suited whenever a rather small number of different types of article WT1 . . . . WT3 is stored in the storage zone L.

As can be seen from FIG. 21, the conveying system 4, 7 . . . 11 of the storage and order-picking system 1 is configured in particular for the following tasks:

for the transport of the first source loading aids Q1, Q1' between the storage zone L and the first automatic order-picking stations KA1, KA1', for the transport of the second source loading aids Q2, Q2' between the storage zone L and the first manual order-picking stations KM1, KM1', for the transport of the first target loading aids Z1, Z1' between the first automatic order-picking stations KA1, KA1' and the first manual order-picking stations KM1, KM1' or between the first automatic order-picking stations KA1, KA1' and the second automatic or manual order-picking stations KA2, KM2, for the transport of the second target loading aids Z2 between the first manual order-picking stations KM1, KM1' and the second automatic or manual order-picking stations KA2, KM2, for the transport of the first target loading aids Z1, Z1' from the first automatic order-picking station KA1, KA1', from the first manual order-picking stations KM1, KM1' or from the second automatic or manual order-picking stations KA2, KM2, for the transport of the second target loading aids Z2 from the second automatic or manual order-picking stations KA2, KM2, and for the transport of the third target loading aids Z3 from the second automatic or manual order-picking stations KA2, KM2.

The robots 12, 12' may be configured for reloading the content of the first target loading aid Z1, Z1' into the second target loading aid Z2 all at once (i.e. in one step), and/or reloading the content of the first target loading aid Z1, Z1' into the third target loading aid Z3 all at once (i.e. in one step), and/or reloading the content of the second target loading aid Z2 into the first target loading aid Z1, Z1' all at once (i.e. in one step), and/or reloading the content of the second target loading aid Z2 into the third target loading aid Z3 all at once (i.e. in one step).

Of course, it is also conceivable that special devices are provided in the storage and order-picking system 1 for the purpose described.

Generally, the procedures at the first automatic order-picking station KA1, KA1' and, if applicable, the procedures at the automatic order-picking substations KAU1, KAU2 can be monitored by a checking system and a handling of (an) article(s) WQ1', WQ2, WQ2', WZ1, WZ1', WZ2 be classified as erroneous handling by the checking system if the handling is executed in an unplanned manner or is aborted and fails. The monitoring system may in particular have optical sensors (e.g. a camera), tactile sensors (e.g. pressure sensors on a robotic gripper) and an evaluation unit connected to the sensors (e.g. a microcontroller), wherein the latter evaluates the sensor signals and carries out the actual classification of the handling operations. In the same way, also the operations at the first manual order-picking stations KM1, KM1' can, of course, be monitored and classified.

It is also conceivable that the storage and order-picking system 1 comprises an optional sorting means (not depicted), with the help of which articles WQ1', WQ2, WQ2', WZ1, WZ1',WZ2 can be brought into in a specifiable sequence, unless such a sequence can already be produced during the retrieving of the articles WQ1', WQ2, WQ2', WZ1, WZ1', WZ2 and/or the source loading aids Q1, Q1', Q2, Q2' from the second storage zone L and/or by the conveying system 4, 7 . . . 11. In particular, this sorting means may be arranged along the route of the retrieval conveyor 10, but also a coupling to the loop conveyor 7, the supply conveyor 8, the discharge conveyor 9 or the return conveyor 11 would be possible, of course.

For the control of the above-mentioned processes, the control system 15 is provided in FIG. 21, such as it is indicated with the arrows in FIG. 21. In particular, the control system 15 is provided for the control of the storage and retrieval units 4 and of the conveying system (specifically of the loop conveyor 7, of the supply conveyors 8, of the discharge conveyors 9, of the retrieval conveyor 10 and of the return conveyor 11). In addition, the control system 15 may be provided for the control of the first automatic order-picking station KA1, KA1', the first manual order-picking station KM1, KM1' the second manual/automatic order-picking stations KM2/KA2 as well as the automatic order-picking substations KAU1, KAU2, in particular for the control of the robots 12, 12' and for the control of an output unit, an input unit and/or a capturing unit of the first manual order-picking station KM1, KM1'.

The control system 15 may also be provided
  for acquiring orders A and determining the articles WQ1', WQ2, WQ2', WZ1, WZ1', WZ2 required for these orders A,
  for ascertaining the classification of the articles required for the processing of said order WQ1', WQ2, WQ2', WZ1, WZ1', WZ2 in groups of types of article WTG1 . . . . WTG3, and
  for determining a first order part AT1 and a second order part AT2. Yet these tasks can, in general, also be taken over by a separate order-processing computer which is connected, in terms of control engineering, to the control system 15.

In the storage and order-picking system 1, the transport of the source loading aids Q1, Q1', Q2, Q2', Q3 and of the target loading aids Z1, Z1', Z2, Z3, in the example depicted in FIG. 21, is done by the stationary conveying system 4, 7 . . . 11 of the storage and order-picking system 1. Yet it is also conceivable that the conveying system 4, 7 . . . 11 is replaced, fully or partially, by autonomous industrial trucks (Automated Guided Vehicles-"AGVs" in short). The autonomous industrial trucks (AGVs) traveling on a travel surface then take the place of a stationary conveying system 4, 7 . . . 11.

Further, the conveying system 4, 7 . . . 11 of the storage and order-picking system 1 in FIG. 21 serves the transport of container-shaped source loading aids Q1, Q1', Q2, Q2', Q3 and target loading aids Z1, Z1', Z2, Z3. Yet it is also conceivable that (alternatively or additionally) hanging articles and/or hanging bags are used (as source loading aids Q1, Q1', Q2, Q2', Q3 and/or target loading aids Z1, Z1', Z2, Z3) in the storage and order-picking system 1. In the storage and order-picking system 1, also overhead storage conveyors and in the order-picking zone also overhead transport conveyors may accordingly be provided in the storage zone L. If autonomous industrial trucks (AGVs) are used, these may also be configured for the transport of hanging articles and/or hanging bags.

It is further conceivable that the source loading aids Q1, Q1', Q2, Q2', Q3 and/or target loading aids Z1, Z1', Z2, Z3 are configured as mobile racks with receiving locations for articles WQ1', WQ2, WQ2', WZ1, WZ1', WZ2 in storage levels located on top of one another. The mobile racks can be self-propelled (and thus basically form autonomous conveying vehicles) or be moved by autonomous industrial trucks.

It should also be noted in this context that a separate conveying system (only) for empty source loading aids Q1, Q1', Q2, Q2', Q3 and/or (only) for empty target loading aids Z1, Z1', Z2, Z3 is not depicted in the storage and order-picking system 1 depicted in FIG. 21. Nevertheless, it would be possible for the storage and order-picking system 1 depicted in FIG. 21 to have a conveying system for this purpose. Also storage zones (only) for empty source loading aids Q1, Q1', Q2, Q2', Q3 and/or (only) for empty target loading aids Z1, Z1', Z2, Z3 could be provided.

It should further be noted that, while the storage and order-picking system 1 shown comprises two automatic order-picking stations KA1, KA1' and two manual order-picking station KM1, KM1', a storage and order-picking system 1 can also have a different number of automatic order-picking stations KA1, KA1' and a different number of manual order-picking stations KM1, KM1'. For example, the storage and order-picking system 1 may have one (single) automatic order-picking station KA1, KA1' and/or one (single) manual order-picking station KM1, KM1', or the storage and order-picking system 1 may also comprise more than two automatic order-picking stations KA1, KA1' and/or more than two manual order-picking stations KM1, KM1'.

In the same way, a storage and order-picking system 1 can comprise a (single) first automatic order-picking substation or multiple first automatic order-picking substations KAU1 as well as a (single) second automatic order-picking substation KAU2 or multiple second automatic order-picking substations KAU2.

Finally, it should be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted the devices depicted may, in reality, also comprise more, or also fewer, components than depicted. In some cases, the shown devices and/or their components may not be depicted to scale and/or be enlarged and/or reduced in size.

| List of reference numbers | |
|---|---|
| 1 | storage and order-picking system |
| 2 | building |
| 3 | storage rack |
| 4 | storage and retrieval unit |
| 5a, 5b | goods takeover zone |
| 6 | goods handover zone |
| 7 | loop conveyor |
| 8 | supply conveyor |
| 9 | discharge conveyor |
| 10 | retrieval conveyor |
| 11 | return conveyor |
| 12, 12' | robot |
| 13, 13' | worker |
| 14 | bypass line |
| 15 | control system |
| A, A1 ... A9 | order |
| AT1, AT2 | order part |
| ATU1, ATU2 | order subpart |
| AZ | order line |
| F, F1 ... F3 | error rate |
| KA1, KA1', KA2 | automatic order-picking station |
| KAU1, KAU2 | automatic order-picking substation |
| KM1, KM1', KM2 | manual order-picking station |
| L | storage zone |
| n, n1 ... n3 | number of pieces |
| Q1, Q1', Q2, Q2', Q3 | source loading aid |
| SW1 ... SW3 | threshold value |
| SWU1 ... SWU3 | subgroup threshold value |
| TM | partial quantity of orders |
| WQ1', WQ2, WQ2' | article(s) (in/on source loading aid) |
| WT1 ... WT3 | type of article |
| WTG1 ... WTG3 | group of types of article |
| WTUG1 ... WTUG3 | subgroup of types of article |
| WZ1, WZ1', WZ2 | article(s) (in/on target loading aid) |
| Z1, Z1', Z2, Z3 | target loading aid |

What is claimed is:

1. A method for order-picking articles from source loading aids into or onto target loading aids in a storage and order-picking system, comprising the steps:
   a) provisioning the articles in or on source loading aids in a storage zone;
   b) acquiring orders for order-picking articles and determining the articles required for these orders, wherein at least one order of the orders comprises multiple order lines and wherein each order line specifies at least one article according to its type of article and its number of pieces to be order-picked;
   c) ascertaining the classification of the articles required for the processing of said order in groups of types of article, each of which comprises multiple types of article, wherein a first group of types of article contains types of article which can be handled automatically and a second group of types of article contains types of article which cannot, or only to a limited extent, be handled automatically but can be handled manually;
   d) determining a first order part, whose at least one article belongs to the first group of types of article and can accordingly be handled automatically, and a second order part, whose at least one article belongs to the second group of types of article and can accordingly not, or only to a limited extent, be handled automatically but can be handled manually;
   e) retrieving a first source loading aid with the at least one article of the first order part from the storage zone of the storage and order-picking system, transporting the first source loading aid to a first automatic order-picking station, provisioning the first source loading aid at the first automatic order-picking station and removing automatically the at least one article of the first order part from the first source loading aid at the first automatic order-picking station;
   f) retrieving a second source loading aid with the at least one article of the second order part from the storage zone of the storage and order-picking system, transporting the second source loading aid to a first manual order-picking station, provisioning the second source loading aid at the first manual order-picking station and removing manually the at least one article of the second order part from the second source loading aid at the first manual order-picking station; and
   g) discharging the at least one article of the first order part and the at least one article of the second order part into or onto a target loading aid.

2. The method according to claim 1, wherein the at least one article of the first order part, in the step g), is loaded automatically into or onto a first target loading aid at the first automatic order-picking station, the first target loading aid loaded with the at least one article of the first order part is transported to the first manual order-picking station and the at least one article of the second order part is additionally loaded manually into the first target loading aid at the first manual order-picking station.

3. The method according to claim 1, wherein the at least one article of the second order part, in the step g), is loaded manually into or onto a first target loading aid at the first manual order-picking station, the first target loading aid loaded with the at least one article of the second order part is transported to the first automatic order-picking station and the at least one article of the first order part is additionally loaded automatically into the first target loading aid at the first automatic order-picking station.

4. The method according to claim 1, wherein the at least one article of the first order part, in the step g), is loaded automatically into or onto a first target loading aid at the first automatic order-picking station, the at least one article of the second order part is loaded manually into or onto a second target loading aid at the first manual order-picking station, the first target loading aid loaded with the at least one article of the first order part and the second target loading aid loaded with the at least one article of the second order part are transported either to a second automatic order-picking station or to a second manual order-picking station; and
   i) the at least one article of the second order part is loaded automatically/manually into the first target loading aid at the second automatic/manual order-picking station; or
   ii) the at least one article of the first order part is loaded automatically/manually into the second target loading aid at the second automatic/manual order-picking station.

5. The method according to claim 4, wherein
   in the case i), all articles of the second order part loaded in or on the second target loading aid are discharged automatically and all at once into or onto the first target loading aid at the second automatic order-picking station; or
   in the case ii), all articles of the first order part loaded in or on the first target loading aid are discharged automatically and all at once into or onto the second target loading aid at the second automatic order-picking station.

6. The method according to claim 1, wherein the at least one article of the first order part, in the step g), is loaded automatically into or onto a first target loading aid at the first automatic order-picking station, the at least one article of the second order part is loaded manually into or onto a second target loading aid at the first manual order-picking station, the first target loading aid loaded with the at least one article of the first order part and the second target loading aid loaded with the at least one article of the second order part are transported either to a second automatic order-picking station or to a second manual order-picking station and the at least one article of the first order part as well as the at least one article of the second order part are loaded automatically/manually into or onto a third target loading aid at the second automatic/manual order-picking station.

7. The method according to claim 6, wherein all articles of the second order part loaded in or on the second target loading aid are discharged automatically and all at once into or onto the third target loading aid at the second automatic order-picking station; and/or all articles of the first order part loaded in or on the first target loading aid are discharged automatically and all at once into or onto the third target loading aid at the second automatic order-picking station.

8. The method according to claim 1, wherein types of article in which an error rate during automatic handling is smaller than or equal to a first threshold value are allocated to the first group of types of article;

types of article in which an error rate during automatic handling is larger than the first threshold value are allocated to the second group of types of article; and the quotient of the erroneous handling operations occurring during the order-picking divided by the total number of the handling operations is provided as error rate.

9. The method according to claim 8, wherein the quotient of the number of the failed automatic removals of articles from a first source loading aid divided by the total number of automatic removals of articles from a first source loading aid;

the quotient of the number of the failed automatic discharging operations of articles into or onto a target loading aid divided by the total number of automatic discharging operations of articles into or onto a target loading aid;

the quotient of the number of the failed automatic reloading operations of articles from a source loading aid into or onto a target loading aid divided by the total number of automatic reloading operations of articles from a source loading aid into or onto a target loading aid; or a measure derived from the above quotients is provided as error rate.

10. The method according to claim 8, wherein procedures at the first automatic order-picking station are monitored by a checking system, and a handling is classified as erroneous handling by the checking system if the handling is executed in an unplanned manner or is aborted and fails.

11. The method according to claim 8, wherein the first threshold value is ascertained on the basis of a capacity of a group of order-picking stations which comprises at least one first automatic order-picking station and at least one first manual order-picking station and which is available in a specifiable time period for the execution of multiple orders.

12. The method according to claim 11, wherein multiple orders for order-picking articles are acquired and the articles required for these orders are determined;

for the execution of these orders in a specifiable time period, a first required capacity of the first automatic order-picking stations of the group for the order-picking of the articles of the first group of types of article and a second required capacity of the first manual order-picking stations of the group for the order-picking of the articles of the second group of types of article required in this time period is computed for various first threshold values;

a first available capacity of the first automatic order-picking stations of the group available in this time period and a second available capacity of the first manual order-picking stations of the group available in this time period is ascertained; and that first threshold value for the execution of said orders is selected for which the smallest deviation between the first required capacity and the first available capacity as well as between the second required capacity and the second available capacity is ascertained.

13. The method according to claim 12, wherein multiple orders for order-picking articles are acquired and the articles required for these orders are determined;

a first required capacity of the first automatic order-picking stations of the group for the order-picking of the articles of the first group of types of article for the execution of these orders in a specifiable time period and a second required capacity of the first manual order-picking stations of the group for the order-picking of the articles of the second group of types of article in this time period is computed for various partial quantities of said orders;

a first available capacity of the first automatic order-picking stations of the group in a specifiable time period and a second available capacity of the first manual order-picking stations of the group in this time period is ascertained;

that partial quantity of said orders is executed in the selected time period for which the smallest deviation between the first required capacity and the first available capacity as well as between the second required capacity and the second available capacity is ascertained;

a first required capacity of the first automatic order-picking stations of the group for the order-picking of the articles of the first group of types of article for the execution of the ascertained partial quantity of orders to be executed in the selected time period and a second required capacity of the first manual order-picking stations of the group for the order-picking of the articles of the second group of types of article in this time period is computed for various first threshold values;

a first available capacity of the first automatic order-picking stations of the group in this time period and a second available capacity of the first manual order-picking stations of the group in this time period is ascertained; and that first threshold value for the execution of the ascertained partial quantity of orders to be executed is selected for which the smallest deviation between the first required capacity and the first available capacity as well as between the second required capacity and the second available capacity is ascertained.

14. The method according to claim 11, wherein
a partial quantity of orders to be executed is ascertained on the basis of a capacity of a group of order-picking stations which comprises at least one first automatic order-picking station and at least one first manual order-picking station and which is available in a specifiable time period for the execution of this partial quantity of orders to be executed; and
the first threshold value for this partial quantity of orders to be executed is ascertained on the basis of the capacity of the group of order-picking stations.

15. The method according to claim 1, wherein an error rate is assigned to a type of article.

16. The method according to claim 1, wherein
an allocation of the types of article to the first group of types of article and to the second group of types of article
I) takes place before or during the executing of the step a);
II) takes place during the executing of one of the steps e) or f) or g); and/or
III) takes place independent of the steps b) to g).

17. The method according to claim 16, wherein
a type of article of at least one article of the first order part which is first allocated to the first group of types of article, in the case II), is reallocated to the second group of types of article if the error rate during the automatic handling of this at least one article at the first automatic order-picking station exceeds the first threshold value.

18. The method according to claim 17, wherein
the at least one article of the first order part which causes the reallocation of the type of article of the at least one article to the second group of types of article remains with the first order part.

19. The method according to claim 17, wherein
the at least one article of the first order part which causes the reallocation of the type of article of the at least one article to the second group of types of article is allocated to the second order part and order-picked accordingly.

20. The method according to claim 1, wherein
a third group of types of article is provided;
types of article in which an error rate during automatic handling is smaller than a first threshold value are allocated to the first group of types of article;
types of article in which an error rate during automatic handling is larger than a second threshold value are allocated to the second group of types of article;
the remaining types of article, in which the error rate is larger than or equal to the first threshold value and smaller than or equal to the second threshold value, are allocated to a third group of types of article; and
articles of the third group of types of article in an order can be assigned optionally to the first order part or to the second order part.

21. The method according to claim 20, wherein
an allocation of the types of article to the first group of types of article and to the second group of types of article and to the third group of types of article
I) takes place before or during the executing of the step a);
II) takes place during the executing of one of the steps e) or f) or g); and/or
III) takes place independent of the steps b) to g).

22. The method according to claim 21, wherein
a type of article of at least one article of the first order part which is first allocated to the first group of types of article, in the case II), is reallocated to the second group of types of article if the error rate during the automatic handling of this at least one article at the first automatic order-picking station exceeds the second threshold value and is reallocated to the third group of types of article if the error rate during the automatic handling of this at least one article at the first automatic order-picking station exceeds the first threshold value but not the second threshold value.

23. The method according to claim 20, wherein
the first threshold value and the second threshold value are ascertained on the basis of a capacity of a group of order-picking stations which comprises at least one first automatic order-picking station and at least one first manual order-picking station and which is available in a specifiable time period for the execution of multiple orders.

24. The method according to claim 23, wherein
multiple orders for order-picking articles are acquired and the articles required for these orders are determined;
the third group of types of article, at a third threshold value, is segmented into articles with an error rate smaller than or equal to the third threshold value expected to be order-picked automatically and articles with an error rate larger than the third threshold value expected to be order-picked manually;
for the execution of these orders in a specifiable time period, a first required capacity of the first automatic order-picking stations of the group for the order-picking of the articles of the first group of types of article, including the articles of the third group of types of article expected to be order-picked automatically, and a second required capacity of the first manual order-picking stations of the group for the order-picking of the articles of the second group of types of article, including the articles of the third group of types of article expected to be order-picked manually, required in this time period is computed for various third threshold values;
a first available capacity of the first automatic order-picking stations of the group available in this time period and a second available capacity of the first manual order-picking stations of the group available in this time period is ascertained;
that third threshold value is selected for the execution of said orders for which the smallest deviation between the first required capacity and the first available capacity as well as the between the second required capacity and the second available capacity is ascertained; and
the first threshold value is set in a selected first reserve distance below the third threshold value and the second threshold value is set in a selected second reserve distance above the third threshold value.

25. The method according to claim 24, wherein
multiple orders for order-picking articles are acquired and the articles required for these orders are determined;
a first required capacity of the first automatic order-picking stations of the group for the order-picking of the articles of the first group of types of article for the execution of these orders in a specifiable time period and a second required capacity of the first manual order-picking stations of the group for the order-picking of the articles of the second group of types of article in this time period is computed for various partial quantities of said orders;
a first available capacity of the first automatic order-picking stations of the group in a specifiable time period and a second available capacity of the first manual order-picking stations of the group in this time period is ascertained;

that partial quantity of said orders is executed in the selected time period for which the smallest deviation between the first required capacity and the first available capacity as well as between the second required capacity and the second available capacity is ascertained;

the third group of types of article, upon reaching a third threshold value, is segmented into articles with an error rate smaller than or equal to the third threshold value expected to be order-picked automatically and articles with an error rate larger than the third threshold value expected to be order-picked manually;

a first required capacity of the first automatic order-picking stations of the group for the order-picking of the articles of the first group of types of article, including the articles of the third group of types of article expected to be order-picked automatically, for the execution of the ascertained partial quantity of orders to be executed in the selected time period and a second required capacity of the first manual order-picking stations of the group for the order-picking of the articles of the second group of types of article, including the articles of the third group of types of article expected to be order-picked manually, in this time period is computed for various third threshold values;

a first available capacity of the first automatic order-picking stations of the group in this time period and a second available capacity of the first manual order-picking stations of the group in this time period is ascertained;

that third threshold value for the execution of the ascertained partial quantity of orders to be executed is selected for which the smallest deviation between the first required capacity and the first available capacity as well as the one between the second required capacity and the second available capacity is ascertained; and the first threshold value is set in a selected first reserve distance below the third threshold value and the second threshold value is set in a selected second reserve distance above the third threshold value.

26. The method according to claim 23, wherein
a partial quantity of orders to be executed is ascertained on the basis of a capacity of a group of order-picking stations which comprises at least one first automatic order-picking station and at least one first manual order-picking station and which is available in a specifiable time period for the execution of this partial quantity of orders to be executed; and
the first threshold value and the second threshold value for this partial quantity of orders to be executed are ascertained on the basis of the capacity of the group of order-picking stations.

27. The method according to claim 20, wherein
at least one article of the third group of types of article is allocated to the first order part, transported to the first automatic order-picking station and loaded automatically into first target loading aids if
the loading of the first target loading aids with multiple articles of the first group of types of article of the first order part at the first automatic order-picking station takes place more swiftly than the loading of the first or second target loading aids with the same number of articles of the second order part at the first manual order-picking station; or
all articles of the first group of types of article of the first order part have already been loaded into first target loading aids at the first automatic order-picking station.

28. The method according to claim 27, wherein
the allocation of multiple articles of the third group of types of article to the first order part or to the second order part takes place in a manner sorted according to the number of pieces specified in the order lines for these articles; and
the allocation of articles of the third group of types of article to the first order part takes place from low toward ascending numbers of pieces and the allocation of articles of the third group of types of article to the second order part takes place from high toward descending numbers of pieces.

29. The method according to claim 27, wherein
an error rate is assigned a type of article; and
the allocation of multiple articles of the third group of types of article to the first order part or to the second order part takes place in a manner sorted according to the error rate specified in the order lines for these articles or sorted according to a parameter which is derived from said error rate and the number of pieces specified in the order lines for these articles, wherein the allocation of articles of the third group of types of article to the first order part, in case of a sorting according to the error rate, takes place from low toward ascending error rates or, in case of a sorting according to said parameter, takes place from low toward ascending parameters and the allocation of articles of the third group of types of article to the second order part, in case of a sorting according to the error rate, takes place from high toward descending error rates or, in case of a sorting according to said parameter, takes place from high toward descending parameters.

30. The method according to claim 20, wherein
at least one article of the third group of types of article is allocated to the second order part, transported to the first manual order-picking station and provisioned at the first manual order-picking station and then said at least one article of the second order part is loaded manually into first or second target loading aids if
the loading of the first or second target loading aids with multiple articles of the second group of types of article of the second order part at the first manual order-picking station takes place more swiftly than the loading of the first target loading aids with the same number of articles of the first order part at the first automatic order-picking station; or
all articles of the second group of types of article of the second order part have already been loaded into first or second target loading aids at the first manual order-picking station.

31. The method according to claim 1, wherein
an article of the first order part is assigned to the second order part and conveyed to a first manual order-picking station if the number of erroneous handling operations of the article at the first automatic order-picking station exceeds an erroneous-handling threshold value.

32. The method according to claim 1, wherein
a partial quantity of orders to be executed is ascertained on the basis of a capacity of a group of order-picking stations which comprises at least one first automatic order-picking station and at least one first manual order-picking station and which is available in a specifiable time period for the execution of this partial quantity of orders to be executed.

33. The method according to claim 32, wherein
the partial quantity of orders to be executed is ascertained with a specified first threshold value.

34. The method according to claim 32, wherein
multiple orders for order-picking articles are acquired and the articles required for these orders are determined;

for the execution of these orders, a first required capacity of the first automatic order-picking stations of the group for the order-picking of the articles of the first group of types of article and a second required capacity of the first manual order-picking stations of the group for the order-picking of the articles of the second group of types of article required in this time period is computed for various partial quantities of said orders;

a first available capacity of the first automatic order-picking stations of the group available in a specifiable time period and a second available capacity of the first manual order-picking stations of the group available in this time period is ascertained; and that partial quantity of said orders is executed in the selected time period for which the smallest deviation between the first required capacity and the first available capacity as well as between the second required capacity and the second available capacity is ascertained.

35. The method according to claim 34, wherein
an availability portion of the first available capacity is computed by division of the first available capacity by the sum of the first and the second available capacity;

a need portion for the first required capacity for each of the multiple orders is computed by division of the first required capacity by the sum of the first and the second required capacity; and the portion of orders with a need portion above the availability portion deviates by a maximum of 10% from the portion of orders with a need portion below the availability portion.

36. The method according to claim 32, wherein
a partial quantity of said orders is determined by random selection of some of the multiple orders.

37. The method according to claim 32, wherein
the multiple orders are sorted on the basis of a sorting parameter and an even distribution with regard to the sorting parameter is aimed at when determining a partial quantity;

a number of pieces of articles of the first group of types of article in an order is provided as sorting parameter; or a relative portion of articles of the first group of types of article in an order is provided as sorting parameter, which is computed by division of the number of pieces of articles of the first group of types of article of an order by the number of pieces of all articles of this order.

38. The method according to claim 32, wherein
orders with a higher priority are preferentially selected for a partial quantity.

39. The method according to claim 1, wherein
the first source loading aid with the at least one article of the first order part is allocated to the second order part, transported to the first manual order-picking station and provisioned at the first manual order-picking station and then said at least one article of the second order part is loaded manually into or onto a first or second target loading aid if the discharging of multiple articles of the second group of types of article of the second order part into the first or second target loading aid at the first manual order-picking station takes place more swiftly than the discharging of the same number of articles of the first order part into the first target loading aid at the first automatic order-picking station; or all articles of the second group of types of article of the second order part have already been loaded into first or second target loading aids at the first manual order-picking station.

40. The method according to claim 39, wherein
at least one article of the third group of types of article is allocated to the second order part, transported to the first manual order-picking station and provisioned at the first manual order-picking station and then said at least one article of the second order part is loaded manually into first or second target loading aids as long as articles of the third group of types of article are available and if the loading of the first or second target loading aids with multiple articles of the second group of types of article of the second order part at the first manual order-picking station takes place more swiftly than the loading of the first target loading aids with the same number of articles of the first order part at the first automatic order-picking station or if all articles of the second group of types of article of the second order part have already been loaded into first or second target loading aids at the first manual order-picking station and then at least one article of the first order part is allocated to the second order part, transported to a first manual order-picking station and provisioned at the first manual order-picking station and then said at least one article of the second order part is loaded manually into first or second target loading aids if the loading of the first or second target loading aids with multiple articles of the second group of types of article of the second order part at the first manual order-picking station takes place more swiftly than the loading of the first target loading aids with the same number of articles of the first order part at the first automatic order-picking station or if all articles of the second group of types of article of the second order part have already been loaded into first or second target loading aids at the first manual order-picking station.

41. The method according to claim 1, wherein
the provisioning of multiple articles of the first order part at the first automatic order-picking station takes place in a manner sorted according to the number of pieces specified in the order lines for the articles of the first order part, wherein the provisioning of the articles of the first order part takes place from low toward ascending numbers of pieces; and the provisioning of multiple articles of the second order part at the first manual order-picking station takes place in a manner sorted according to the number of pieces specified in the order lines for the articles of the second order part, wherein the provisioning of the articles of the second order part takes place from high toward descending numbers of pieces.

42. The method according to claim 1, wherein
the removing of multiple articles of the first order part from at least one first source loading aid and the discharging of these articles into or onto at least one first target loading aid takes place in a manner sorted according to the number of pieces specified in the order lines for the articles of the first order part, wherein the removing and discharging takes place from low toward ascending numbers of pieces; and the removing of multiple articles of the second order part from at least one second source loading aid and the discharging of these articles into or onto at least one first or second target loading aid takes place in a manner sorted according to the number of pieces specified in the order lines for the articles of the second order part, wherein the removing and discharging takes place from high toward descending numbers of pieces.

43. The method according to claim 1, wherein
an error rate is assigned to a type of article;
the provisioning of multiple articles of the first order part at the first automatic order-picking station takes place in a manner sorted according to the error rate specified in the order lines for the articles of the first order part or sorted according to a parameter which is derived from said error rate and the number of pieces specified in the order lines for the articles of the first order part, wherein the provisioning of the articles of the first order part, in case of a sorting according to the error rate, takes place from low toward ascending error rates or, in case of a sorting according to said parameter, takes place from low toward ascending parameters; and
the provisioning of multiple articles of the second order part at the first manual order-picking station takes place in a manner sorted according to the error rate specified in the order lines for the articles of the second order part or sorted according to a parameter which is derived from said error rate and the number of pieces specified in the order lines for the articles of the second order part, wherein the provisioning of the articles of the second order part, in case of a sorting according to the error rate, takes place from high toward descending error rates or, in case of a sorting according to the parameter, takes place from high toward descending parameters.

44. The method according to claim 1, wherein
an error rate is assigned to a type of article;
the removing of multiple articles of the first order part from at least one first source loading aid and the discharging of these articles into or onto at least one first target loading aid takes place in a manner sorted according to the error rate specified in the order lines for the articles of the first order part or sorted according to a parameter which is derived from said error rate and the number of pieces specified in the order lines for the articles of the first order part, wherein the removing and discharging, in case of a sorting according to the error rate, takes place from low toward ascending error rates or, in case of a sorting according to said parameter, takes place from low toward ascending parameters; and
the removing of multiple articles of the second order part from at least one second source loading aid and the discharging of these articles into or onto at least one first or second target loading aid takes place in a manner sorted according to the error rate specified in the order lines for the articles of the second order part or sorted according to a parameter which is derived from said error rate and the number of pieces specified in the order lines for the articles of the second order part, wherein the removing and discharging, in case of a sorting according to the error rate, takes place from high toward descending error rates or, in case of a sorting according to the parameter, takes place from high toward descending parameters.

45. The method according to claim 1, wherein
the articles of the first group of types of article are stored in the first source loading aids so that the first source loading aid contains articles of only one identical type.

46. The method according to claim 1, wherein
the first group of types of article comprises a first subgroup of types of article which contains types of article which can be handled automatically with a gripper of a first kind and comprises a second subgroup of types of article which contains types of article which cannot, or only to a limited extent, be handled automatically with the gripper of the first kind but can be handled automatically with a gripper of a different, second kind;
in the step c), the classification of the articles required for the processing of said order in the first subgroup of types of article and in the second subgroup of types of article is additionally ascertained; and
in the step d), a first order subpart of the first order part is additionally determined whose at least one article belongs to the first subgroup of types of article and can accordingly be handled automatically with a gripper of the first kind and a second order subpart of the first order part is determined whose at least one article belongs to the second subgroup of types of article and can accordingly not, or only to a limited extent, be handled automatically with the gripper of the first kind but can be handled automatically with the gripper of the second kind.

47. The method according to claim 46, wherein
the first automatic order-picking station is equipped with the gripper of the first kind and the gripper of the second kind;
instead of the step e), a first source loading aid with the at least one article of the first order subpart is retrieved from the storage zone of the storage and order-picking system, the first source loading aid is transported to the first automatic order-picking station, the first source loading aid is provisioned at the first automatic order-picking station and the at least one article of the first order subpart is removed automatically from the first source loading aid at the first automatic order-picking station with the gripper of the first kind;
a third source loading aid with the at least one article of the second order subpart is retrieved from the storage zone of the storage and order-picking system, the third source loading aid is transported to the first automatic order-picking station, the third source loading aid is provisioned at the first automatic order-picking station and the at least one article of the second order subpart is removed automatically from the third source loading aid at the first automatic order-picking station with the gripper of the second kind; and
the at least one article of the first order subpart and the at least one article of the second order subpart is discharged into or onto a target loading aid.

48. The method according to claim 46, wherein
the first automatic order-picking station comprises a first automatic order-picking substation and a second automatic order-picking substation, wherein the first automatic order-picking substation is equipped with a gripper of a first kind and the second automatic order-picking substation is equipped with a gripper of a different, second kind;
instead of the step e), a first source loading aid with the at least one article of the first order subpart is retrieved from the storage zone of the storage and order-picking system, the first source loading aid is transported to the first automatic order-picking substation, the first source loading aid is provisioned at the first automatic order-picking substation and the at least one article of the first order subpart is removed automatically from the first source loading aid at the first automatic order-picking substation with the gripper of the first kind;

a third source loading aid with the at least one article of the second order subpart is retrieved from the storage zone of the storage and order-picking system, the third source loading aid is transported to the second automatic order-picking substation, the third source loading aid is provisioned at the second automatic order-picking substation and the at least one article of the second order subpart is removed automatically from the third source loading aid at the second automatic order-picking substation with the gripper of the second kind; and the at least one article of the first order subpart and the at least one article of the second order subpart is discharged into or onto a target loading aid.

49. A storage and order-picking system for order-picking articles from source loading aids into or onto target loading aids, comprising:

a storage zone for provisioning the articles in or on source loading aids;

a control system configured for acquiring orders for order-picking articles and determining the articles required for these orders, wherein at least one order of the orders comprises multiple order lines and wherein each order line specifies at least one article according to its type of article and its number of pieces to be order-picked;

ascertaining the classification of the articles required for the processing of said order in groups of types of article, each of which comprises multiple types of article, wherein a first group of types of article contains types of article which can be handled automatically and a second group of types of article contains types of article which cannot, or only to a limited extent, be handled automatically but can be handled manually; and determining a first order part, whose at least one article belongs to the first group of types of article and can accordingly be handled automatically, and a second order part, whose at least one article belongs to the second group of types of article and can accordingly not, or only to a limited extent, be handled automatically but can be handled manually; and a conveying system configured for retrieving a first source loading aid with the at least one article of the first order part from the storage zone of the storage and order-picking system, transporting the first source loading aid to a first automatic order-picking station and provisioning the first source loading aid at the first automatic order-picking station, at which the at least one article of the first order part is removable automatically from the first source loading aid; and retrieving a second source loading aid with the at least one article of the second order part from the storage zone of the storage and order-picking system, transporting the second source loading aid to a first manual order-picking station and provisioning the second source loading aid at the first manual order-picking station, at which the at least one article of the second order part is removable manually from the second source loading aid;

wherein the first automatic order-picking station is configured for discharging automatically the at least one article of the first order part and the first manual order-picking station is configured for discharging manually the at least one article of the second order part into or onto a target loading aid.

50. The storage and order-picking system according to claim 49, wherein the conveying system is additionally configured for the transport of the first source loading aids between the storage zone and the first automatic order-picking station;

for the transport of the second source loading aids between the storage zone and the first manual order-picking station;

for the transport of the first target loading aids between the first automatic order-picking station and the first manual order-picking station or between the first automatic order-picking station and the second automatic or manual order-picking station;

for the transport of the second target loading aids between the first manual order-picking station and the second automatic or manual order-picking station;

for the transport of the first target loading aids from the first automatic order-picking station, from the first manual order-picking station or from the second automatic or manual order-picking station;

for the transport of the second target loading aids from the second automatic or manual order-picking station; and/or for the transport of the third target loading aids from the second automatic or manual order-picking station.

51. The storage and order-picking system according to claim 49, wherein a jointed-arm robot or a gantry robot with a gripper is provided at the first automatic order-picking station.

52. The storage and order-picking system according to claim 49, wherein a mechanical device for the automatic discharging of the entire content:

of the first target loading aid into the second target loading aid;

of the first target loading aid into the third target loading aid;

of the second target loading aid into the first target loading aid; and/or of the second target loading aid into the third target loading aid all at once is provided at the second automatic order-picking station.

53. The storage and order-picking system according to claim 49, wherein the ratio between the number of the first automatic order-picking stations and the number of the first manual order-picking stations is smaller than or equal to 1.

54. The storage and order-picking system according to claim 49, wherein the ratio between the number of the first automatic order-picking stations and the number of the first manual order-picking stations is larger than or equal to 1.

55. The storage and order-picking system according to claim 49, wherein the first group of types of article comprises a first subgroup of types of article, which contains types of article which can be handled automatically with a gripper of a first kind, and comprises a second subgroup of types of article, which contains types of article which cannot, or only to a limited extent, be handled automatically with the gripper of the first kind but can be handled automatically with a gripper of a different, second kind; and the control system is additionally configured for ascertaining the classification of the articles required for the processing of said order in the first subgroup of types of article and in the second group of types of article, and is additionally configured for determining a first order subpart of the first order part, whose at least one article belongs to the first subgroup of types of article and can accordingly be handled automatically with a gripper of the first kind, and is additionally configured for determining a second order subpart of the first order part, whose at least one article belongs to the second subgroup of types of article and can accordingly not, or only to a limited extent, be handled automatically with the gripper of the first kind but can be handled automatically with the gripper of the second kind.

56. The storage and order-picking system according to claim 55, wherein the first automatic order-picking station is equipped with the gripper of the first kind and the gripper of the second kind;

the conveying system is additionally configured for retrieving a first source loading aid with the at least one article of the first order subpart from the storage zone of the storage and order-picking system, transporting the first source loading aid to the first automatic order-picking station and provisioning the first source loading aid at the first automatic order-picking station, at which the at least one article of the first order subpart is removable automatically from the first source loading aid with the gripper of the first kind; and retrieving a third source loading aid with the at least one article of the second order subpart from the storage zone of the storage and order-picking system, transporting the third source loading aid to first automatic order-picking station and provisioning the third source loading aid at the first automatic order-picking station, at which the at least one article of the second order subpart is removable automatically from the third source loading aid with the gripper of the second kind; and wherein the first automatic order-picking station is configured for discharging automatically the at least one article of the first order subpart into or onto a target loading aid with the gripper of the first kind and for discharging automatically the at least one article of the second order subpart into or onto a target loading aid with the gripper of the second kind.

57. The storage and order-picking system according to claim 55, wherein the first automatic order-picking station comprises a first automatic order-picking substation and a second automatic order-picking substation, wherein the first automatic order-picking substation is equipped with a gripper of a first kind and the second automatic order-picking substation is equipped with a gripper of a different, second kind;

the conveying system is additionally configured for retrieving a first source loading aid with the at least one article of the first order subpart from the storage zone of the storage and order-picking system, transporting the first source loading aid to the first automatic order-picking substation and provisioning the first source loading aid at the first automatic order-picking substation, at which the at least one article of the first order subpart is removable automatically from the first source loading aid with the gripper of the first kind; and retrieving a third source loading aid with the at least one article of the second order subpart from the storage zone of the storage and order-picking system, transporting the third source loading aid to the second automatic order-picking substation and provisioning the third source loading aid at the second automatic order-picking substation, at which the at least one article of the second order subpart is removable automatically from the third source loading aid with the gripper of the second kind; and wherein the first automatic order-picking substation is configured for discharging automatically the at least one article of the first order subpart into or onto a target loading aid with the gripper of the first kind and the second automatic order-picking substation is configured for discharging automatically the at least one article of the second order subpart into or onto a target loading aid with the gripper of the second kind.

* * * * *